United States Patent
King et al.

(10) Patent No.: US 9,685,295 B2
(45) Date of Patent: Jun. 20, 2017

(54) ELECTRON EMISSION DEVICE

(75) Inventors: William P. King, Champaign, IL (US); Lane W. Martin, Champaign, IL (US); Patrick C. Fletcher, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 460 days.

(21) Appl. No.: 14/235,380

(22) PCT Filed: Jul. 26, 2012

(86) PCT No.: PCT/US2012/048326
§ 371 (c)(1),
(2), (4) Date: Mar. 24, 2014

(87) PCT Pub. No.: WO2013/016528
PCT Pub. Date: Jan. 31, 2013

(65) Prior Publication Data
US 2014/0203707 A1    Jul. 24, 2014

Related U.S. Application Data

(60) Provisional application No. 61/512,581, filed on Jul. 28, 2011.

(51) Int. Cl.
*H01J 1/02* (2006.01)
*H01J 1/30* (2006.01)
(Continued)

(52) U.S. Cl.
CPC ........ *H01J 1/02* (2013.01); *H01J 1/30* (2013.01); *H01J 9/02* (2013.01); *B82Y 35/00* (2013.01); *G01Q 60/30* (2013.01); *H01J 2235/06* (2013.01)

(58) Field of Classification Search
None
See application file for complete search history.

(56) References Cited

U.S. PATENT DOCUMENTS 2,175,696 A    10/1939   Lederer
3,610,986 A *  10/1971   King .................... H01J 37/06
                                                         313/231.01
(Continued)

OTHER PUBLICATIONS

Rosenman et al "Electron emission from ferroelectrics" 88 (2000) 6109. J. Appl. Physics AIP.*

(Continued)

*Primary Examiner* — Douglas W Owens
*Assistant Examiner* — Srinivas Sathiraju
(74) *Attorney, Agent, or Firm* — Lathrop & Gage LLP

(57) ABSTRACT

Provided herein are electron emission devices and device components for optical, electronic and optoelectronic devices, including cantilever-based MEMS and NEMS instrumentation. Devices of certain aspects of the invention integrate a dielectric, pyroelectric, piezoelectric or ferroelectric film on the receiving surface of a substrate having an integrated actuator, such as a temperature controller or mechanical actuator, optionally in the form of a cantilever device having an integrated heater-thermometer. Also provided are methods of making and using electron emission devices for a range of applications including sensing and imaging technology.

24 Claims, 44 Drawing Sheets

(51) Int. Cl.
*H01J 9/02* (2006.01)
*B82Y 35/00* (2011.01)
*G01Q 60/30* (2010.01)

(56) References Cited

U.S. PATENT DOCUMENTS

| | | | | |
|---|---|---|---|---|
| 4,933,108 A | | 6/1990 | Soredal | |
| 5,122,663 A | * | 6/1992 | Chang | B82Y 10/00 250/310 |
| 5,463,277 A | * | 10/1995 | Kimura | H01J 21/105 313/306 |
| 5,818,166 A | * | 10/1998 | Karpov | H01J 1/3042 313/309 |
| 5,841,219 A | * | 11/1998 | Sadwick | H01J 21/105 313/15 |
| 5,844,251 A | * | 12/1998 | MacDonald | B82Y 35/00 257/10 |
| 5,955,828 A | * | 9/1999 | Sadwick | H01J 1/15 313/310 |
| 6,027,951 A | * | 2/2000 | MacDonald | B82Y 35/00 257/10 |
| 6,239,538 B1 | * | 5/2001 | Konuma | H01J 1/304 313/309 |
| 6,261,469 B1 | | 7/2001 | Zakhidov et al. | |
| 6,331,074 B1 | * | 12/2001 | Kimura | G01N 5/04 219/209 |
| 6,507,328 B1 | | 1/2003 | Lee | |
| 6,720,704 B1 | * | 4/2004 | Tavkhelidze | F25B 21/00 136/200 |
| 6,853,143 B2 | * | 2/2005 | Nakasuji | G01N 23/04 251/310 |
| 6,995,502 B2 | * | 2/2006 | Hwu | H01J 1/13 313/293 |
| 7,005,783 B2 | * | 2/2006 | Hwu | H01J 21/105 313/293 |
| 7,036,906 B2 | * | 5/2006 | Takano | G02F 1/1341 347/37 |
| 7,088,049 B2 | * | 8/2006 | Takeuchi | H01J 1/304 310/321 |
| 7,336,474 B2 | * | 2/2008 | Lerche | B82Y 10/00 361/120 |
| 7,677,088 B2 | * | 3/2010 | King | G01Q 60/58 73/105 |
| 7,723,909 B2 | | 5/2010 | Yamaguchi et al. | |
| 7,741,615 B2 | | 6/2010 | Putterman et al. | |
| 7,928,343 B2 | * | 4/2011 | King | G01B 7/18 219/444.1 |
| 8,294,351 B2 | * | 10/2012 | Yamamoto | H01J 29/467 313/483 |
| 8,383,498 B2 | * | 2/2013 | Severi | B82Y 10/00 257/E21.221 |
| 8,387,443 B2 | * | 3/2013 | King | G01Q 60/38 73/105 |
| 8,533,861 B2 | * | 9/2013 | King | B82Y 35/00 73/105 |
| 8,580,130 B2 | * | 11/2013 | Mao | B82Y 10/00 156/712 |
| 8,719,960 B2 | * | 5/2014 | King | G01K 1/143 850/12 |
| 8,931,950 B2 | * | 1/2015 | King | G01K 17/006 374/121 |
| 2002/0105080 A1 | * | 8/2002 | Speakman | B41J 2/01 257/749 |
| 2004/0007680 A1 | | 1/2004 | Kim et al. | |
| 2005/0017624 A1 | | 1/2005 | Novet et al. | |
| 2006/0012279 A1 | | 1/2006 | Nanataki et al. | |
| 2007/0023621 A1 | * | 2/2007 | Blick | B82Y 15/00 250/251 |
| 2007/0087564 A1 | * | 4/2007 | Speakman | H01G 9/2031 438/674 |
| 2007/0154354 A1 | * | 7/2007 | Faris | B82Y 35/00 850/60 |
| 2008/0150656 A1 | | 6/2008 | Hagelin et al. | |
| 2009/0056428 A1 | | 3/2009 | King | |
| 2009/0056928 A1 | * | 3/2009 | Jiang | F28D 15/0233 165/182 |
| 2009/0139340 A1 | | 6/2009 | King et al. | |
| 2010/0071100 A1 | * | 3/2010 | Faris | B81B 1/006 850/57 |
| 2010/0127170 A1 | * | 5/2010 | Fujita | H01J 35/06 250/310 |
| 2011/0061452 A1 | * | 3/2011 | King | G01Q 60/32 73/105 |
| 2011/0074293 A1 | | 3/2011 | Hagman | |
| 2011/0078834 A1 | | 3/2011 | King | |
| 2012/0000293 A1 | * | 1/2012 | Baughman | H02N 11/006 73/861.08 |

OTHER PUBLICATIONS

K Yamashita "An RF MEMS device with a lateral field emission detector" COnference proceedings.*
Rozhko Acoustoelectron emission from the piezoelectric LiNbO3.*
Asano et al. (1992) "Field-excited electron emission from ferroelectric ceramic in vacuum," *Jpn. J. Appl. Phys.* 31:3098-3101.
Auciello et al. (1995) "Low voltage electron emission from $Pb(Zr_xTi_{1-x})O_3$-based thin film cathodes," *Appl. Phys. Lett.* 66:2183-2185.
Bao et al. (2001) "Abnormal ferroelectric properties of compositionally graded $Pb(Zr,Ti)O_3$ thin films with $LaNiO_3$ bottom electrodes," *J. Appl. Phys.* 90:506.
Bhatia et al. (Oct. 24, 2011) "High-temperature piezoresponse force microscopy," *Appl. Phys. Lett.* 99:173103.
Bian et al. (2007) "Electron emission from $SrTiO_3$-coated silicon-tip arrays," *J. Vac. Sci. Technol. B* 25:817-821.
Bian et al. (Jan. 12, 2009) "Field emission properties of Si tip arrays coated with N-doped $SrTiO_3$ thin films at different substrate temperature," *J. Appl. Phys.* 105:013312.
Binnig et al. (1986) "Atomic Force Microscope," *Phys. Rev. Lett.* 56:930-933.
Byer et al. (1972) "Pyroelectric coefficient direct measurement technique and application to a nsec response time detector," *Ferroelectrics* 3:333-338.
Cahill (1990) "Thermal conductivity measurement from 30 to 750 K: the 3ω method," *Rev. Sci. Instrum.* 61:802.
Chandra et al. (2007) "A Landau Primer for Ferroelectrics" In; *Physics of Ferroelectrics. Springer Topics in Applied Physics.* pp. 69-105.
Chen et al. (2008) "Si Field Emitter Arrays Coated with Thin Ferroelectric Films," *Ceram. Int.* 34:971-977.
Choi et al. (2004) "Enhancement of ferroelectricity in strained $BaTiO_3$ thin films," *Science.* 306:1005-1009.
Choudhury et al. (Feb. 9, 2011) "Geometric frustration in compositionally modulated ferroelectrics," *Nature.* 470:514-517.
Chu et al. (2006) "Nanoscale Domain Control in Multiferroic $BiFeO_3$ Thin Films," *Adv. Mater.* 18:2307-2311.
Chu et al. (2007) "Domain Control in Multiferroic $BiFeO_3$ Through Substrate Vicinality," *Adv. Mater.* 19:2662-2666.
Chu et al. (2008) "Electric-field control of local ferromagnetism using a magnetoelectric multiferroic," *Nature Mater.* 7:478-482.
Chu et al. (Mar. 23, 2009) "Nanoscale Control of Domain Architectures in $BiFeO_3$ Thin Films," *Nano Lett.* 9:1726-1730.
Dadykin et al. (2003) "Low-Macroscopic-Field Electron Emission from Piezoelectric Thin Films and Crystals," *Mater. Sci. Engr. A.* 353:12-21.
Damodaran et al. (May 24, 2011) "Nanoscale structure and mechanism for enhanced electromechanical response of highly-strained $BiFeO_3$ thin films," *Adv. Mater.* 23:3170-3175.
Dekkers et al. (Jul. 2009) "Ferroelectric properties of epitaxial $Pb(Zr,Ti)O_3$ thin films on silicon by control of crystal orientation," *Appl. Phys. Lett.* 95:012902.
Dunaevsky et al. (1999) "Electron/ion emission from the plasma formed on the surface of ferroelectrics. I. studies of plasma parameters without applying an extracting voltage," *J. Appl. Phys.* 85:8464-8473.

(56) References Cited

OTHER PUBLICATIONS

Fletcher et al. (Aug. 8-10, 2011) "Ferroelectric Nanoprobe Top Emitter with Heater-Thermometer," In; Technologies for Future Micro and Nano Manufacturing. Napa, California.
Gundel et al. (1989) "Copious electron emission from PLZT ceramics with high zirconium concentration," *Ferroelectrics*. 100:1-16.
Gundel et al. (1990) "Electric field-excited electron emission from PLZT-X/65/35 ceramics," *Ferroelectrics*. 110:183-192.
Gundel et al. (1991) "Time-dependent electron emission from ferroelectrics by external pulsed electric fields," *J. Appl. Phys.* 69:975-982.
Higa et al. (1998) "Gated Si field emitter array prepared by using anodization," *J. Vac. Sci. Technol. B* 16:651-653.
Hii et al. (2006) "Characterizing field emission from individual carbon nanotubes at small distances," *J. Vac. Sci. Technol. B* 24:1081-1087.
Huijben et al. (2008) "Critical thickness and orbital ordering in ultrathin $La_{0.7}Sr_{0.3}MnO_3$ films," *Phys. Rev. B* 78:094413.
International Search Report with Written Opinion corresponding to International Patent Application No. PCT/US2012/48326, mailed Oct. 4, 2012.
Ivers et al. (1993) "Electron-beam diodes using ferroelectric cathodes," *J. Appl. Phys.* 73:2667-2671.
Jensen et al. (Jan. 5, 2010) "Emittance of a field emission electron source," *J. Appl. Phys.* 107:014903.
Jin et al. (1998) "Giant effective pyroelectric coefficients from graded ferroelectric devices," *Appl. Phys. Lett.* 73:2838.
Kang et al. (2001) "Electron emission from silicon tips coated with sol-gel $(Ba_{0.6}Sr_{0.33})TiO_3$ ferroelectric thin film," *J. Vac. Sci. Technol. B.* 19:1073-1076.
Kang et al. (2003) "Effect of annealing temperature on the electron emission characteristics of silicon tips coated with $Ba_{0.67}Sr_{0.33}TiO_3$ thin film," *J. Vac. Sci. Technol. B.* 21:453-457.
Karthik et al. (Jul. 1, 2011) "Pyroelectric properties of polydomain epitaxial $Pb(Zr_{1-x},Ti_x)O_3$ thin films," *Phys. Rev. B.* 84:024102.
Karthik et al. (Jul. 2011) "Effect of domain walls on the electrocaloric properties of $Pb(Zr_{1-x},Ti_x)O_3$ thin films," *Appl. Phys. Lett.* 99:032904.
Krasik et al. (2003) "Ferroelectric plasma sources and their applications," *IEEE Trans. Plasma Sci.* 31:49-59.
Lang (Aug. 2005) "Pyroelectricity: From Ancient Curiosity to Modern Imaging Tool," *Physics Today.* pp. 31-36.
Lee et al. (1998) "Fabrication and characterization of silicon field emitter arrays by spin-on-glass etch back," *J. Vac. Sci. Technol. B.* 16:238-241.
Lee et al. (2006) "Electrical, Thermal, and Mechanical Characterization of Silicon Microcantilever Heaters," *J. Microelectromech. Syst.* 15:1644-1655.
Lu et al. (2007) "Field emission of silicon emitter arrays coated with sol-gel $(Ba_{0.65}Sr_{0.35})_{1-x}La_xTiO_3$ thin films," *J. Appl. Phys.* 102:014113.
Mahjoub et al. (2008) "Ferroelastic domains in bilayered ferroelectric thin films," *J. Appl. Phys.* 104:124103.
Martin et al. (2008) "Nanoscale control of exchange bias with $BiFeO_3$ thin films," *Nano Lett.* 8:2050-2055.
Martin et al. (Apr. 2012) "Nano-scale Pyro-Electro-Mechanical Electron Source, Extensible X-Ray Systems and Algorithms for Computed Tomography (EXACT)," In; DARPA/MTO Workshop. San Diego, CA.
Mi et al. (2008) "Atomic structure of the interface between $SrTiO_3$ thin films and Si (001) substrates," *Appl. Phys. Lett.* 93:101913.
Pabst et al. (2007) "Leakage mechanisms in $BiFeO_3$ thin films," *Appl. Phys. Lett.* 90:072902.
Pantel et al. (Apr. 27, 2010) "Switching kinetics in epitaxial $BiFeO_3$ thin films," *Appl. Phys. Lett.* 107:084111.
Pavlyk et al. (2001) "Evolution of Metastable Centers on the CdS Surface Stimulated by Temperature Decrease," In; The $9^{th}$ International Conference on Defects—Recognition, Imaging and Physics in Semiconductors. Rimini, Italy.
Pintilie et al. (Jun. 10, 2009) "Orientation-dependent potential barriers in case of epitaxial $Pt-BiFeO_3-SrRuO_3$ capacitors," *Appl. Phys. Lett.* 94:232902.
Pogorelov et al. (Aug. 17, 2010) "Corrected field enhancement factor for the floating sphere model of carbon nanotube emitter," *J. Appl. Phys.* 108:044502.
Riege (1994) "Electron Emission from Ferroelectrics—A Review," *Nucl. Instrum. Meth. A.* 340:80-89.
Rosenblum et al. (1974) "Thermally stimulated field emission from pyroelectric $LiNbO_3$," *App. Phys. Lett.* 25:17-19.
Rosenman et al. (2000) "Electron emission from ferroelectrics," *J. Appl. Phys.* 88:6109-6161.
Rozenman et al. (1980) "Exoelectron Emission Accompanying the Transverse Piezoelectric Effect in Lithium Niobate," *Sov. Tech. Phys. Lett.* 6:661-662.
Rozenman et al. (1984) "Electron emission during the switching of ferroelectric lead germanate," *J. Exp. Theor. Phys. Lett.* 39:477-480.
Rozhko (Sep. 18, 2012) "Acoustoelectron Emission from the Piezoelectric $LiNbO_3$," *Soviet Technical Physics Letters.* 10:475-476.—Abstract Only.
Schubring et al. (1992) "Charge pumping and pseudopyroelectric Effect in Active Ferroelectric Relaxor-Type Films," *Phys. Rev. Lett.* 68:1778.
Seidel et al. (Jan. 25, 2009) "Conduction at domain walls in oxide multiferroics," *Nature Mater.* 8:229-234.
Shannon et al. (1997) "Dual mode electron emission from ferroelectric ceramics," *Appl. Phys. Lett.* 70:1625-1627.
Sharp et al. (1982) "Use of low-frequency sinusoidal temperature waves to separate pyroelectric currents from nonpyroelectric currents. Part II: experiment," *J. Appl. Phys.* 53:8980-8987.
Shur et al. (1996) "Figures of merit for ferroelectric electron emission cathodes," *J. Appl. Phys.* 80:3445.
Shur et al. (1996) "Plasma-assisted electron emission from $(Pb,La)(Zr,Ti)O_3$ ceramic cathodes," *J. Appl. Phys.* 79:3669-3674.
Shur et al. (1998) "A high-perveance ferroelectric cathode with a narrowed electron energy spread," *J. Phys. D: Appl. Phys.* 31:1375-1382.
Shur et al. (1999) "Surface discharge plasma induced by spontaneous polarization switching," *Appl. Phys. Lett.* 70:574-576.
Shur et al. (1999) "Two modes of plasma-assisted electron emission from ferroelectric ceramics," *J. Phys. D: Appl. Phys.* 32:L29-L33.
Wang et al. (2007) "Epitaxial growth of lead zirconium titanate thin films on Ag buffered Si substrates using rf sputtering," *Appl. Phys. Lett.* 90:172903.
Xiao et al. (2008) "Large pyroelectric effect in undoped epitaxial $Pb(Zr, Ti)O_3$ thin films on $SrTiO_3$ substrates," *Appl. Phys. Lett.* 93:052913.
Yamashita et al. (2005) "An RF-MEMS Device with Lateral Field-Emission Detector," In; *Technical Digest of the 18th International Vacuum Nanoelectronics Conference*, 2005. IVNC 2005. pp. 29-30.
Yang et al. (Jan. 10, 2010) "Above-bandgap voltages from ferroelectric photovoltaic devices," *Nature Nanotechnol.* 5:143-147.
Yu et al. (Jul. 6, 2010) "Interface ferromagnetism and orbital reconstruction in $BiFeO_3-La_{0.7}Sr_{0.3}MnO_3$ heterostructures," *Phys. Rev. Lett.* 105:027201.
Zeches et al. (2009) "A strain-driven morphotropic phase boundary in $BiFeO_3$," *Science.* 326:977-980.
Zhang et al. (Jan. 16, 2011) "Large field-induced strains in a lead-free piezoelectric material," *Nature Nanotechnol.* 6:98-102.
Fletcher et al. (Feb. 2013) "Field emission from nanometer-scale tips of crystalline $Pb(Zr_xTi_{1-x})O_3$," *J. Vac. Sci. Technol. B* 31(2), 021805-1-021805-6.
Fletcher et al. (May 2013) Pyroelectric electron emission from nanometer-thick fims of $Pb(Zr_xTi_{1-x})O_3$, *Appl. Phys. Lett.* 102. 192908.

\* cited by examiner

| Structure | LiNbO$_3$ Trigonal | LiTaO$_3$ Trigonal | BaTiO$_3$ Tetragonal | (Ba$_{0.6}$Sr$_{0.4}$)TiO$_3$ Cubic ↔ Tet. | PZT (20:80) Tetragonal | PZT (95:5) Rhombo. | BiFeO$_3$ Rhombo. |
|---|---|---|---|---|---|---|---|
| T$_c$, °C | 1210 | 605 | 120 | 5 ↔ <RT | 460 | 225 | 830 |
| ε$_r$ | 31 | 45 | ~400 | 720 | 90-150 | 150 | 100 |
| P, μC/cm$^2$ | 50 | 50 | 26 | 0 ↔ 50 | ~70 | 35 | 90 |
| π μC/m$^2$K | -83 | -176 | -200 | Not measured | -(100-400) | -268 | -(800-1200) |
| FoM (π/ε$_r$)* | 2.7 | 3.9 | 0.5 | ? | 1-3 | 1.8 | 8-12 |

*D. Stur, G. Rosenman, J. Appl. Phys. 80, 3445 (1996).

32B (Metal film anode not shown)

36A

36B (A)

(B)

ELECTRON EMISSION DEVICE

CROSS-REFERENCE TO RELATED APPLICATIONS

This application is a U.S. National Stage Application under 35 U.S.C. §371 of International Application No. PCT/US2012/048326, filed Jul. 26, 2012, which claims the benefit of priority of U.S. Provisional Patent Application No. 61/512,581, filed Jul. 28, 2011, each of which is hereby incorporated by reference in its entirety.

BACKGROUND

Electron emission devices are components of a large number of optical, electronic and optoelectronic devices including the rapidly developing class microelectromechanical (MEMS) and nanoelectromechanical (NEMS) devices. Cantilever based technologies, for example, often include an electron emitter device component to access a range of important device functionalities including sensing, microscopy, information memory storage and micro- or nano-scale actuation. The following patents and patent publications are hereby incorporated by reference and relate generally to cantilever-based MEMS and NEMS systems for sensing, imaging and actuation applications: U.S. Pat. Nos. 7,677,088 and 7,928,343 and US Patent Publication Nos. 20090056428, 20090139340, 20110061452, and 20110078834.

Important to the continued advancement of MEMS and NEMS-based technologies is the development of electron emission devices capable of providing emission having accurately controlled spatial, temporal and energetic characteristics over a dynamic range useful for important device applications. Electron emission devices are needed, for example, having enhanced emission attributes to enable the next generation of electron microscopy and nano-characterization instrumentation. More specifically, electron emission devices and components are currently needed, for example, that are capable of providing useful electron packet sizes (e.g., <1 pC), electron source emittances (e.g., <0.05 mm-mrad), pulse lengths (e.g., <1 ps), and pulse repetition rate (less than 10 MHz). Also needed are electron emission systems compatible with useful MEMS and NEMS device form factors (e.g., device size <100 $\mu m^2$ and power consumptions (e.g., <10 mW).

As will be generally recognized from the foregoing, advanced electron emission devices and components are needed for the continued development of a wide range of electronic devices, including MEMS and NEMS-based systems. Specifically, electron emission devices having enhanced emission characteristics and capable of implementation in useful device formats, such as cantilever-based systems, are needed. In addition, electron emission devices and device components are needed that are compatible with efficient device integration in miniaturized form factors and in array formats.

SUMMARY

Provided herein are electron emission devices and device components for optical, electronic and optoelectronic devices, including cantilever-based MEMS and NEMS instrumentation. Systems and methods of some embodiments of the invention, for example, are capable of selective modulation of the temperature, state of mechanical strain and/or applied electric field of a dielectric, pyroelectric, piezoelectric or ferroelectric film so as to access enhanced electron emission functionality and characteristics. Devices of certain aspects of the invention integrate a dielectric, pyroelectric, piezoelectric or ferroelectric film on, or supported by, the receiving surface of a substrate having an integrated actuator, such as a temperature controller or mechanical actuator, optionally in the form of a cantilever device having an integrated heater-thermometer. Also provided are methods of making and using electron emission devices for a range of applications including sensing and imaging technology.

In an embodiment, the invention provides an electron emission device comprising: (i) a substrate having a receiving surface; (ii) a dielectric, pyroelectric, piezoelectric or ferroelectric thin film provided on at least a portion of the receiving surface or provided on one or more intermediate structures supported by the receiving surface; wherein the dielectric, pyroelectric, piezoelectric or ferroelectric thin film has a thickness less than or equal to 10 µm; and (iii) an actuator operationally coupled to the dielectric, pyroelectric, piezoelectric or ferroelectric thin film for selectively modulating a state of mechanical strain, a temperature, an applied electric field or a combination of these in the dielectric, pyroelectric, piezoelectric or ferroelectric thin film so as to generate electron emission from an external surface of the dielectric, pyroelectric, piezoelectric or ferroelectric thin film. In an aspect, at least one of the one or more intermediate structures supported by the substrate comprises the actuator component itself. The invention includes, for example, device and methods wherein the dielectric, pyroelectric, piezoelectric or ferroelectric thin film is provided directly on the actuator or on one or more intermediate structures supported by the actuator. In an embodiment, for example, the dielectric, pyroelectric, piezoelectric or ferroelectric thin film is provided on one or more probe tips supported by the actuator or the actuator.

In an embodiment, electron emission from the dielectric, pyroelectric, piezoelectric or ferroelectric thin film occurs via pyroelectric emission, field emission or both. In an embodiment, the actuator is an integrated component of the substrate. In an embodiment, the dielectric, pyroelectric, piezoelectric or ferroelectric thin film is optionally electrically biased, for example, wherein the device further comprises one or more electrodes, such as an extraction electrode(s), rings electrodes, aperture electrodes, or the like, positioned sufficiently close to the dielectric, pyroelectric, piezoelectric or ferroelectric thin film so as to establish a selected applied electric field on a surface of the dielectric, pyroelectric, piezoelectric or ferroelectric thin film, for example, so as to modulate the electron emission from the external surface of the dielectric, pyroelectric, piezoelectric or ferroelectric thin film.

In an embodiment, the electron emission device, or a component thereof, is provided at a pressure low enough so as to achieve efficient electron emission via pyroelectric emission, field emission or both. In an embodiment, for example, the external surface of the dielectric, pyroelectric, piezoelectric or ferroelectric thin film is provided at a pressure less than or equal to 100 Torr, optionally for some applications less than or equal to 1 Torr and optionally for some applications less than or equal to $1 \times 10^{-2}$ Torr. In an embodiment, for example, the external surface of the dielectric, pyroelectric, piezoelectric or ferroelectric thin film is provided at a pressure selected over the range of 100 Torr–$1 \times 10^{-7}$ Torr, optionally for some applications selected over the range of 1 Torr–$1 \times 10^{-6}$ Torr and optionally for some applications selected over the range of $1 \times 10^{-2}$ Torr–

1×10⁻⁶ Torr. Achieving pressures useful to access efficient electron emission may be achieved by a variety of methods well known in the art, including the use of vacuum technologies, such as low pressure chambers or housing in combination with one or more vacuum pumps.

In an embodiment, the substrate is optionally a bulk substrate or bulk film. Alternatively, the invention includes embodiments, wherein the substrate is a cantilever device, such as a resonator beam cantilever having a clamped end and a free end or having clamped-clamped cantilever bridge configuration. In an embodiment, the substrate and the dielectric, pyroelectric, piezoelectric or ferroelectric thin film are provided in physical contact. In an embodiment, the actuator and the dielectric, pyroelectric, piezoelectric or ferroelectric thin film are provided in physical contact. In an embodiment, for example, the dielectric, pyroelectric, piezoelectric or ferroelectric thin film coats at least a portion of the receiving surface of the substrate or actuator. In an embodiment, for example, the dielectric, pyroelectric, piezoelectric or ferroelectric thin film is a thin film structure that is deposited onto, or grown on, least a portion of the receiving surface of the substrate or actuator, for example using epitaxial growth, atomic layer deposition, molecular beam epitaxy (MBE), pulsed laser deposition (PLD) growth, metal organic chemical vapor deposition (MOCVD), sputtering, annealing, chemical vapor deposition, physical vapor deposition, sol-gel techniques and/or lithographic techniques.

In an embodiment, the dielectric, pyroelectric, piezoelectric or ferroelectric thin film, the substrate and/or actuator is provided in a probe tip geometry useful for spatially concentrating electron emission and/or enhancing the efficiency of electron emission, for example, by lowering the work function for pyroelectric emission and/or field emission. A probe tip geometry refers to a device configuration wherein the dielectric, pyroelectric, piezoelectric or ferroelectric thin film is provide on, or otherwise supported by, one or more relief feature, such as one or more tapered, conical or cylindrical relief features having lateral dimensions useful for generating electron emission. In an embodiment, the invention includes probe tip geometries wherein the dielectric, pyroelectric, piezoelectric or ferroelectric thin film is provide on, or otherwise supported by, one or more probe tip relief features of the substrate or actuator. In another embodiment, the invention includes probe tip geometries wherein the dielectric, pyroelectric, piezoelectric or ferroelectric thin film is provide on, or otherwise supported by, one or more probe tip relief features which are independent device components that are supported by the substrate or actuator, for example, probe tip relief features that are integrated, or otherwise accommodated, by the receiving surface of the substrate or actuator, for example, by gluing or use of one or more adhesion layers. In yet another embodiment, the invention includes probe tip geometries wherein the dielectric, pyroelectric, piezoelectric or ferroelectric thin film is provide on, or otherwise supported by, one or more probe tip relief features which are a component of an actuator that is an integrated component of the substrate (e.g., heater, cooler, mechanical actuator, etc.). In an embodiment, for example, the external surface of the dielectric, pyroelectric, piezoelectric or ferroelectric thin film is characterized by one or more relief features each independently terminating at a distal end having lateral cross sectional dimensions less than or equal to 250 nm. In an embodiment, for example, the substrate comprises one or more probe tips on the receiving surface, wherein each probe tip independently terminates at a distal end having lateral cross sectional dimensions less than or equal to 250 nm; wherein the dielectric, pyroelectric, piezoelectric or ferroelectric thin film is provided on at least a portion of the one or more probe tips or provided on one or more intermediate structures supported by probe tips, thereby forming the relief features of the dielectric, pyroelectric, piezoelectric or ferroelectric thin film. In an embodiment, for example, the dielectric, pyroelectric, piezoelectric or ferroelectric thin film and substrate comprises an array of emitting probe tips components.

In an aspect of the invention, electron emission is generated, at least in part, via thermal actuation, for example, by increasing and/or decreasing the temperature of the dielectric, pyroelectric, piezoelectric or ferroelectric thin film. In an embodiment, the substrate and the dielectric, pyroelectric, piezoelectric or ferroelectric thin film are thermally conducting and provided in thermal contact. In an embodiment, the substrate, the dielectric, pyroelectric, piezoelectric or ferroelectric thin film and the actuator are provided in thermal contact with each other. In an embodiment, the actuator is a temperature controller in thermal contact with the dielectric, pyroelectric, piezoelectric or ferroelectric thin film; for example, wherein the temperature controller selectively modulates the temperature of the dielectric, pyroelectric, piezoelectric or ferroelectric thin film so as to generate the electron emission from the external surface of the dielectric, pyroelectric, piezoelectric or ferroelectric thin film. In an embodiment, for example, the temperature controller comprises a heating component, cooling component or a combination of a heating component and cooling component for selectively increasing, decreasing or both increasing and decreasing the temperature of the dielectric, pyroelectric, piezoelectric or ferroelectric thin film. In an embodiment, for example, temperature controller provides heating of the dielectric, pyroelectric, piezoelectric or ferroelectric thin film at a rate equal to or greater than $1\times10^{5\circ}$ C. $s^{-1}$, optionally for some applications equal to or greater than $1\times10^{9\circ}$ C. $s^{-1}$. In an embodiment, for example, temperature controller provides cooling of the dielectric, pyroelectric, piezoelectric or ferroelectric thin film at a rate equal to or greater than $-1\times10^{5\circ}$ C. $s^{-1}$, optionally for some applications equal to or greater than $-1\times10^{9\circ}$ C. $5^{-1}$; wherein in this context greater than the specified rate refers to an absolute value greater than $1\times10^{5\circ}$ C. $s^{-1}$ or $1\times10^{9\circ}$ C. $s^{-1}$ but retains the negative sign so as to indicate a change in temperature providing cooling. In an embodiment, temperature controller provides cooling of the dielectric, pyroelectric, piezoelectric or ferroelectric thin film to a temperature equal to or less than −150° C. In an embodiment, for example, the temperature controller comprises a heater-thermometer in thermal contact with the dielectric, pyroelectric, piezoelectric or ferroelectric thin film, such as a resistive heater, a thermistor or both a resistive heater and thermistor. In an embodiment, for example, the heater-thermometer comprises a doped semiconductor material, such as a material selected from the group consisting of doped diamond or doped silicon. In an embodiment, for example, the heater-thermometer comprises a material having a melting point temperature equal to or greater than 1250° C. In an embodiment, for example, the temperature controller comprises one or more passive or active cooling structures in thermal contact with the dielectric, pyroelectric, piezoelectric or ferroelectric thin film, such as a heat sink, Peltier structure, a microfluidic structure or a cryogenic structure in thermal contact with the dielectric, pyroelectric, piezoelectric or ferroelectric thin film.

In an aspect of the invention, electron emission is generated, at least in part, via mechanical actuation, for example, wherein the actuator is a mechanical resonator for selectively modulating the state of mechanical strain of the dielectric, pyroelectric, piezoelectric or ferroelectric thin film so as to generate the electron emission from the external surface of the dielectric, pyroelectric, piezoelectric or ferroelectric thin film. In an embodiment, for example, the actuator is a mechanical resonator that compresses, expands, bends or flexes the dielectric, pyroelectric, piezoelectric or ferroelectric thin film so as to generate the electron emission from the external surface of the dielectric, pyroelectric, piezoelectric or ferroelectric thin film. In an embodiment, for example, the actuator is a mechanical resonator that changes the state of mechanical strain of the dielectric, pyroelectric, piezoelectric or ferroelectric thin film by a value selected from the range of −4% to 4%. In an embodiment, for example, the actuator is a mechanical resonator that changes the state of mechanical strain of the dielectric, pyroelectric, piezoelectric or ferroelectric thin film by a value selected from the range of 0.01% to 5% in a time period less than or equal to 2 milliseconds. In an embodiment, for example, the actuator is a mechanical resonator comprising a piezoelectric element, a cantilever, metal element, or a silicon element.

The shape, physical dimensions and morphology of the dielectric, pyroelectric, piezoelectric or ferroelectric film of emission devices of the invention are aspects important for accessing useful performance attributes and device functionalities. In an embodiment, for example, the dielectric, pyroelectric, piezoelectric or ferroelectric film has a thickness selected over the range of 0.1 nm to 10 µm, optionally for some device applications, a thickness selected over the range of 0.1 nm to 1 µm, optionally for some device applications, a thickness selected over the range of 0.1 nm to 500 nm, and optionally for some device applications, a thickness selected over the range of 0.1 nm to 100 nm. In an embodiment, for example, the dielectric, pyroelectric, piezoelectric or ferroelectric film has a thickness less than or equal to 1 µm, optionally for some device applications a thickness less than or equal to 500 nm, optionally for some device applications a thickness less than or equal to 100 nm, and optionally for some device applications a thickness less than or equal to 50 nm. In an embodiment, for example, the dielectric, pyroelectric, piezoelectric or ferroelectric film has lateral dimensions (e.g., length, width, diameter, radius etc.) selected over the range of 100 nm to 10,000 µm, and optionally for some embodiments lateral dimensions less than or equal to 10 µm. In an embodiment, for example, the dielectric, pyroelectric, piezoelectric or ferroelectric film has a root mean square roughness selected over the range of 0.1 nm to 250 nm.

In an embodiment, for example, the pyroelectric, piezoelectric or ferroelectric thin film terminates a distal end of the external surface having a cylindrical or conical shape. In an embodiment, the dielectric, pyroelectric, piezoelectric or ferroelectric film terminates at a distal end characterized by small physical dimensions, for example, terminating at an end having one or more, or optionally all, cross sectional dimensions that are less than or equal to 50 nm, and optionally less than or equal to 10 nm. This aspect of the invention is useful for providing a tip for which electron emission is confined to a spatially localized area.

In an embodiment, for example, the dielectric, pyroelectric, piezoelectric or ferroelectric film is provided on a probe tip in thermal contact with the actuator, wherein optionally the probe tip is an integrated and/or unitary component of the substrate or an integrated and/or unitary component of the actuator. Optionally, one or more adhesion layers, such as metal layers, are provided between the dielectric, pyroelectric, piezoelectric or ferroelectric film and the probe tip, for example, adhesion layers having a thickness selected over the range of 0.1 nm to 1000 nm. In an embodiment, for example, the one or more adhesion layers comprise one or more titanium layers, platinum layers or any combination thereof.

The composition of the dielectric, pyroelectric, piezoelectric or ferroelectric film of the devices of the invention is another aspect important for accessing useful performance attributes and device functionalities. In an embodiment, for example, the dielectric, pyroelectric, piezoelectric or ferroelectric film comprises a crystalline material, for example, a single crystalline material, polycrystalline material or doped crystalline material. In an embodiment, for example, the dielectric, pyroelectric, piezoelectric or ferroelectric film comprises a pyroelectric material, a piezoelectric material, a ferroelectric material, a dielectric material and/or an antiferroelectric material. In an embodiment, the dielectric, pyroelectric, piezoelectric or ferroelectric film comprises a ferroelectric material. In an embodiment, the dielectric, pyroelectric, piezoelectric or ferroelectric film comprises a material that exhibits both pyroelectric and piezoelectric properties. In an embodiment, for example, the dielectric, pyroelectric, piezoelectric or ferroelectric film has a pyroelectric coefficient greater than or equal to 0.000005 $C/m^2$ K, and optionally for some applications greater than or equal to 0.00005 $C/m^2$ K, and optionally for some applications optionally for some applications greater than or equal to 0.0005 $C/m^2$ K, and optionally for some applications greater than or equal to 0.005 $C/m^2$ K.

In an aspect of the invention, the dielectric, pyroelectric, piezoelectric or ferroelectric thin film is deposited or grown directly on the receiving surface of the substrate or actuator, or is deposited or grown on one or more intermediate layers supported by the receiving surface of the substrate or actuator. In an embodiment, for example, the dielectric, pyroelectric, piezoelectric or ferroelectric thin film is an epitaxial film. In an embodiment, for example, the dielectric, pyroelectric, piezoelectric or ferroelectric thin film is epitaxially grown directly on the receiving surface of the substrate or actuator, or epitaxially grown on one or more intermediate structure supported by the receiving surface of the substrate or actuator, such as one or more buffer layers, adhesion layers or growth template layers.

A range of materials are useful for the dielectric, pyroelectric, piezoelectric or ferroelectric film of the devices of the invention. In an embodiment, the dielectric, pyroelectric, piezoelectric or ferroelectric film is a doped material, such as a material including one or more metal atom dopants. In an embodiment, for example, the dielectric, pyroelectric, piezoelectric or ferroelectric film comprises a perovskite or a perovskite-based compound. In an embodiment, for example, the dielectric, pyroelectric, piezoelectric or ferroelectric film comprises a tungsten-bronze type oxide. In an embodiment, for example, the dielectric, pyroelectric, piezoelectric or ferroelectric film comprises a pyrochlore-type compound. In an embodiment, for example, the dielectric, pyroelectric, piezoelectric or ferroelectric film comprises a layered-structure oxide. In an embodiment, for example, the dielectric, pyroelectric, piezoelectric or ferroelectric film comprises a barium-fluoride type compound. In an embodiment, for example, the dielectric, pyroelectric, piezoelectric or ferroelectric film comprises a molybdate compound. In an embodiment, for example, the dielectric, pyroelectric, piezoelectric or ferroelectric film comprises a boracite compound.

In an embodiment, for example, the dielectric, pyroelectric, piezoelectric or ferroelectric film comprises a halide compound. In an embodiment, for example, the dielectric, pyroelectric, piezoelectric or ferroelectric film comprises an antimony sulphide iodide compound. In an embodiment, for example, the dielectric, pyroelectric, piezoelectric or ferroelectric film comprises a potassium dihydrogen phosphate type compound. In an embodiment, for example, the dielectric, pyroelectric, piezoelectric or ferroelectric film comprises a sulphate compound. In an embodiment, for example, the dielectric, pyroelectric, piezoelectric or ferroelectric film comprises a polymer ferroelectric material.

Table 1 provides a list of example materials useful for the dielectric, pyroelectric, piezoelectric or ferroelectric film of the devices of the invention. As used in the formulas provided in Table 1, wherein x is greater than or equal to 0 and less than or equal to 1. In a specific embodiment, for example, the dielectric, pyroelectric, piezoelectric or ferroelectric film comprises $Ba_{1-x}Sr_xTiO_3$ or $PbZr_xTi_{1-x}O_3$, wherein x is greater than or equal to 0 and less than or equal to 1. In a specific embodiment, for example, the dielectric, pyroelectric, piezoelectric or ferroelectric film comprises $PbZr_{0.2}Ti_{0.8}O_3$, $Ba_{0.87}Sr_{0.33}TiO_3$, $SrTiO_3$, N-doped $SrTiO_3$ or $(Ba_{0.85}Sr_{0.35})_{1-x}La_xTiO_3$, wherein x is greater than or equal to 0 and less than or equal to 1. In a specific embodiment, for example, the dielectric, pyroelectric, piezoelectric or ferroelectric film comprises $PbZr_{0.2}Ti_{0.8}O_3$ (PZT) having a (001) orientation. In a specific embodiment, for example, the dielectric, pyroelectric, piezoelectric or ferroelectric film is generated using molecular beam epitaxy (MBE), pulsed laser deposition (PLD) growth, metal organic chemical vapor deposition (MOCVD), sputtering, annealing, chemical vapor deposition, physical vapor deposition and/or sol-gel techniques, and other synthesis techniques know in the art.

TABLE 1

A List of Useful Dielectric, Pyroelectric, Piezoelectric or Ferroelectric Materials

| Item No. | List of Dielectric, Pyroelectric, Piezoelectric, (anti-)Ferroelectric Materials |
|---|---|
| 1 | Perovskites and Perovskite-based Compounds<br>$BaTiO_3$, $Ba_{1-x}A_xTiO_3$, doped varieties including, but not limited to A = Sr, Ce, La, Dy, Y, Sc, Nd, Sm, Bi, Ca, $BaTi_{1-x}B_xO_3$, doped varieties including, but not limited to B = Fe, Nb, Co, Cr, Zr, Mn, others; wherein x is greater than or equal to 0 and less than or equal to 1.<br>$Ba(B'_xB''_{1-x})O_3$ where B' and B'' = Cu, W, Ta, Nb, Bi, V, Mo, Zr; wherein x is greater than or equal to 0 and less than or equal to 1<br>$BiFeO_3$, $Bi_{1-x}A_xFeO_3$, doped varieties including, but not limited to A = Sr, Ce, La, Dy, Y, Sc, Nd, Sm, Bi, Ca, $BiTi_{1-x}B_xO_3$, doped varieties including, but not limited to B = Ti, Ni, Nb, Co, Cr, Zr, Mn, others; wherein x is greater than or equal to 0 and less than or equal to 1.<br>$BiCoO_3$ and doped variations.<br>$BiCrO_3$ and doped variations.<br>$BiMnO_3$ and doped variations.<br>$BiNiO_3$ and doped variations.<br>$BiTiO_3$ and doped variations.<br>$CdTiO_3$ and doped variations.<br>$CsGeCl_3$<br>$KTaO_3$<br>$KIO_3$<br>$KTiO_3$ and doped variations.<br>$KNbO_3$ and doped variations.<br>$KTaO_3$ and doped variations.<br>$LiNbO_3$ and doped variations.<br>$LiTaO_3$ and doped variations.<br>$NaNbO_3$ and doped variations.<br>$PbTiO_3$, $PbZr_{1-x}Ti_xO_3$, wherein x is greater than or equal to 0 and less than or equal to 1, Doped varieties, see above for $BaTiO_3$; wherein x is greater than or equal to 0 and less than or equal to 1.<br>$Pb(B'_xB''_{1-x})O_3$ where B' and B'' = Co, W, Sc, Nb, Fe, Ta, Mg, Nb, Cd, Cu, $Pb(B'_{1-x}, Nb_x)O_3$ where B' = Mg, Zn, Co, Ni, Cd, Li-doped varieties; wherein x is greater than or equal to 0 and less than or equal to 1.<br>$Pb(B'_{1-x-y}B''_xB'''_y)O_3$ where B', B'', and/or B''' = Li, Fe, W, Co, In, Y, Tb, Yb, Ho, Gd, Pr, La, Sm, Na, Ho, Zr, Cd, Nb, Sc, Mn, Ni, Co, Cr, Fe, etc.; wherein x is greater than or equal to 0 and less than or equal to 1 and wherein y is greater than or equal to 0 and less than or equal to 1.<br>$PbFeO_3$ and doped variations.<br>$PbZrO_3$ and doped variations.<br>$PbVO_3$ and doped variations.<br>$SrTiO_3$ and doped variations.<br>$AgNbO_3$<br>$AgTaO_3$<br>$ACrO_3$ where A = Dy, Ho, Yb, Lu, Pr, Y<br>$AMnO_3$, where A = Y, Er, Ho, Tb, Tm, Yb, Lu, Dy, etc. |
| 2 | Tungsten-bronze type oxides, including, but not limited to:<br>$PbNb_2O_6$<br>$PbTa_2O_6$<br>$K_2BiNb_5O_{15}$ |
| 3 | Pyrochlore-type compounds, including, but not limited to:<br>$Pb_2BiTaO_6$<br>$Pb_2BiNbO_6$ |

TABLE 1-continued

A List of Useful Dielectric, Pyroelectric, Piezoelectric or Ferroelectric Materials

| Item No. | List of Dielectric, Pyroelectric, Piezoelectric, (anti-)Ferroelectric Materials |
|---|---|
| 4 | Layered-structure oxides, including, but not limited to:<br>$Bi_2WO_6$<br>$SrBi_2Nb_2O_9$<br>$Bi_4Ti_3O_{12}$<br>$SrBi_4Ti_4O_{15}$<br>$Sr_{1-x}Bi_{2+2x/3}Ta_2O_9$ |
| 5 | Barium-fluoride type compounds, including, but not limited to:<br>$BaMgF_4$<br>$BaNiF_4$ |
| 6 | Molybdates |
| 7 | Boracites |
| 8 | Halides |
| 9 | Antimony sulphide iodide compounds |
| 10 | Potassium dihydrogen phosphate type compounds (i.e., $KH_2PO_4$ and others) |
| 11 | Sulphates and related compounds (i.e., $(NH_4)_2SO_4$ and others) |
| 12 | Polymer ferroelectrics (i.e., poly(vinylidene fluoride-trifluoroethylene)-based [P(VDF—TrFE)], P(VDF—TrFE—CFE) (CFE: chlorofluoroethylene) terpolymers, polymers and copolymers, and others) |

(Note -
x is greater than or equal to 0 and less than or equal to 1 and y is greater than or equal to 0 and less than or equal to 1)

A range of substrates are useful in the electron emission devices and methods of the present invention. As used herein the term "substrate" broadly includes any structure capable of supporting a device component, such as the dielectric, pyroelectric, piezoelectric or ferroelectric thin film of device of the invention and/or actuator. Substrates useful in the invention include bulk substrates, such as a bulk wafer or bulk layer. Alternatively, substrates useful in the invention include device substrates, such as a substrate comprising a cantilever device or an array of cantilever devices. A substrate can support a device component directly, for example, wherein the device component is physically provided on a surface, such as a receiving surface, of the substrate. Alternatively, a substrate can support a device component indirectly, for example, wherein the device component is provided on one or more intermediate structures (e.g., thin films, buffer layers, adhesion layers, relief features, etc.) provided on a surface, such as a receiving surface, of the substrate. In an embodiment, the substrate has an integrated temperature controller, such as an integrated heater or cooler.

In an aspect of the invention, the substrate is a semi-infinite substrate or flat film. As used herein, a "semi-infinite substrate" refers to a substrate having a thickness that is at least 10 times larger than the thickness of the dielectric, pyroelectric, piezoelectric or ferroelectric thin film, and optionally for some applications at least 100 times larger than the thickness of the dielectric, pyroelectric, piezoelectric or ferroelectric thin film and optionally for some applications at least 1000 times larger than the thickness of the dielectric, pyroelectric, piezoelectric or ferroelectric thin film. As used herein, a flat film is a substrate having lateral dimensions (e.g., length, width, etc.) are at least 10 times larger than the width of the emitting area of the dielectric, pyroelectric, piezoelectric or ferroelectric thin film, optionally for some applications at least 100 times larger than the width of the emitting area of the dielectric, pyroelectric, piezoelectric or ferroelectric thin film, optionally for some applications at least 1000 times larger than the width of the emitting area of the dielectric, pyroelectric, piezoelectric or ferroelectric thin film. In an embodiment, for example, the substrate is a semi-infinite substrate or flat film having an external surface comprising a plurality of relief features each independently terminating at a distal end having lateral cross sectional dimensions less than or equal to 250 nm, wherein the dielectric, pyroelectric, piezoelectric or ferroelectric thin film is provided on at least a portion of the plurality of relief features or provided on one or more intermediate structures supported by a portion of the plurality of relief features. In an embodiment, for example, the external surface of the semi-infinite substrate or flat film has an array of probe tips each independently having lateral cross sectional dimensions less than or equal to 250 nm, wherein the dielectric, pyroelectric, piezoelectric or ferroelectric thin film is provided on at least a portion of the plurality of relief features or provided on one or more intermediate structures supported by a portion of the plurality of relief features.

In an aspect of the invention, the substrate is a cantilever that supports, directly or indirectly, the dielectric, pyroelectric, piezoelectric or ferroelectric thin film, and optionally wherein the cantilever is in thermal contact with the dielectric, pyroelectric, piezoelectric or ferroelectric thin film. A range of cantilevers may be used in the present electron emission devices including microcantilevers and nanocantilevers. Cantilevers of the invention include free ended cantilevers and fixed ended cantilevers, such as cantilevers having a clamped-clamped cantilever configuration. In an embodiment, for example, the cantilever is a nanomechanical resonator beam, optionally with one or more fixed ends and one/or more free ends. In an embodiment, for example, the cantilever is a suspended structure. In an embodiment, for example, the cantilever is a rectangular cantilever. In an embodiment, for example, the cantilever comprises a cantilever bridge provided between first and second ends, wherein the cantilever bridge allows thermal and electrostatic actuation. In an embodiment, the substrate is a cantilever wherein the actuator is an integrated component of the cantilever, such as an integrated temperature controller or piezoelectric actuator, providing thermal, mechanical and electrostatic actuation of the dielectric, pyroelectric, piezoelectric or ferroelectric thin film. In an embodiment, for example, the cantilever comprises a cantilever bridge provided between first and second ends, wherein the cantilever bridge allows thermal, mechanical and electrostatic actuation. In an embodiment, for example, the cantilever has a length selected over the range of 1 μm to 500 μm; and/or a width selected over the range of 1 μm to 100 μm; and/or a thickness selected over the range of 100 nm to 15 μm. In an embodiment, for example, the cantilever has a resonance frequency selected over the range of 10 kHz to 500 MHz.

In an embodiment, the substrate is a cantilever and the actuator is a heater-thermometer in thermal contact with the dielectric, pyroelectric, piezoelectric or ferroelectric thin film, for example wherein the heater-thermometer is an integrated component of the cantilever. In an embodiment, for example, the cantilever has a fixed end and a free end, wherein the dielectric, pyroelectric, piezoelectric or ferroelectric thin film, the heater-thermometer device or both the dielectric, pyroelectric, piezoelectric or ferroelectric thin film and the heater-thermometer device is positioned proximate to the free end of the cantilever. In an embodiment, for example, the cantilever has a clamped-clamped cantilever configuration, wherein the dielectric, pyroelectric, piezoelectric or ferroelectric thin film, the heater-thermometer device or both the dielectric, pyroelectric, piezoelectric or ferroelectric thin film and the heater-thermometer device is positioned at a cantilever bridge provided between a first end and second end of the cantilever.

A range of heater-thermometers are useful in the devices and methods of the invention. In an embodiment, for example, the heater-thermometer comprises a resistive heater. In an embodiment, for example, the heater-thermometer comprises a thermistor. In an embodiment, for example, the heater-thermometer provides a microhotplate. In an embodiment, for example, the heater-thermometer comprises a doped semiconductor material, such as doped diamond or doped silicon. Heater-thermometers materials of some embodiments are capable of withstanding high operating temperatures. In an embodiment, for example, the heater-thermometer comprises a material having a melting point temperature equal to or greater than 1250° C. In an embodiment, for example, the heater-thermometer provides heating of the dielectric, pyroelectric, piezoelectric or ferroelectric film at a rate equal to or greater than $1 \times 10^{5}$° C. $s^{-1}$, optionally for some embodiments at a rate equal to or greater than $1 \times 10^{9}$° C. $s^{-1}$. In an embodiment, for example, the heater-thermometer is capable of heating of the dielectric, pyroelectric, piezoelectric or ferroelectric film to a temperature equal to or greater than 1200° C. In an embodiment, the cantilever or the heater-thermometer has a probe tip, wherein the dielectric, pyroelectric, piezoelectric or ferroelectric thin film is provided on at least a portion of the probe tip or conformally coats at least a portion of the probe tip, for example, wherein the probe tip has a cylindrical or conical shape, and optionally terminates at a distal end having lateral cross sectional dimensions less than or equal to 100 nm.

In an embodiment of this aspect, the device further comprises one or more electrodes electrically connected to the heater-thermometer; for example, wherein the one or more electrodes comprise a first electrode electrically connected to the heater-thermometer and a second electrode electrically connected to the heater-thermometer. In an embodiment, the one or more electrodes are an integrated component(s) of the cantilever, for example, wherein the one or more electrodes comprise one or more legs of the cantilever. In an embodiment, for example, the one or more electrodes deliver electrical current to the heater-thermometer for effecting a temperature change in the heater-thermometer. Electrodes of the electron emission device may comprise a range of materials including electrically conductive materials such as elemental metals, metal alloys, semiconductors, doped materials, and metal oxides (binary, ternary, quaternary, etc.). In an embodiment, for example, the one or more electrodes comprise doped semiconductor materials, such as doped diamond and doped silicon. In an embodiment, for example, the electrodes are materials capable of withstanding high temperatures, such as a material having a melting point temperature equal to or greater than 1250° C.

In an embodiment, the invention provides an electron emission device comprising: (i) a cantilever having an integrated heater-thermometer; and (ii) a thermally conductive tip comprising a dielectric, pyroelectric, piezoelectric or ferroelectric film having a thickness less than or equal to 10 μm, wherein the thermally conductive tip terminates at an end having a cross sectional dimension less than or equal to 250 nm; and wherein the thermally conductive tip is provided on the cantilever in thermal contact with the heater-thermometer; wherein the dielectric, pyroelectric, piezoelectric or ferroelectric film undergoes electron emission upon application of a change in temperature, mechanical strain or applied electric field. In some embodiments, the thermally conductive tip is an electron emission device component in thermal contact with the heater-thermometer component of the device. Devices of the invention may have a free ended cantilever configuration, for example, wherein the cantilever has a fixed end and a free end, wherein the heater-thermometer is positioned proximate to the free end. The invention also includes devices having a clamped-clamped cantilever configuration, wherein the heater-thermometer is positioned at a cantilever bridge provided between a first end and second end of the cantilever. Heater-thermometer components of certain embodiments are an integrated component of the cantilever and capable of actuating the thermally conductive tip, for example, by providing a change in the temperature and/or state of strain of the dielectric, pyroelectric, piezoelectric or ferroelectric film. IN some embodiments, the heater-thermometer is in thermal contact with the thermally conductive tip, for example, such that heat is capable of flowing from the heater-thermometer to the dielectric, pyroelectric, piezoelectric or ferroelectric film. In some embodiments, heater-thermometer is also provided in physical contact with the dielectric, pyroelectric, piezoelectric or ferroelectric film.

Electron emission devices of the invention may optionally comprise a number of additional device components such as sensors, detectors, electrodes, insulators, resonators, actuators, electrostatic lenses, clamps, bases, holders, adhesive layers, device substrates, piezoresistive sensors, actuators and resonators and the like. In an embodiment, the electron emission device further comprises a piezoelectric actuator operably connected to the cantilever. In an embodiment, the electron emission device further comprises an extraction electrode positioned sufficiently close to the dielectric, pyroelectric, piezoelectric or ferroelectric film so as to facilitate electron emission, for example, by providing an applied electric field on an external surface of the dielectric, pyroelectric, piezoelectric or ferroelectric film that lowers the work function for pyroelectric emission and/or field emission.

Electron emission devices of the invention are highly versatile and capable of generating emission having accurately controlled spatial, temporal and energetic attributes. In an embodiment, for example, a device of the present invention is capable of generating electron emission characterized by electron packet sizes less than or equal to 1 pC; and/or pulses lengths less than or equal to 1 ps, emittances less than or equal to 0.05 mm-mrad; and/or pulse repetition rates greater than or equal to 10 MHz.

Devices of the invention may also comprise a plurality of electron emission devices, optionally provided in an array device format. Any of the electron devices described herein may also be provided as a device array or component thereof.

In another aspect, the present invention provides a method for generating electron emission comprising the steps of: (i) providing an electron emission device comprising: a substrate having a receiving surface; a dielectric, pyroelectric, piezoelectric or ferroelectric thin film provided on at least a portion of the receiving surface or provided on one or more intermediate structures supported by the receiving surface; wherein the dielectric, pyroelectric, piezoelectric or ferroelectric thin film has a thickness less than or equal to 10 µm; and an actuator operationally coupled to the dielectric, pyroelectric, piezoelectric or ferroelectric thin film for selectively modulating a state of mechanical strain, a temperature, an applied electric field or a combination of these in the dielectric, pyroelectric, piezoelectric or ferroelectric thin film so as to generate electron emission from an external surface of the dielectric, pyroelectric, piezoelectric or ferroelectric thin film; and (ii) applying a change in temperature, mechanical strain or applied electric field to the dielectric, pyroelectric, piezoelectric or ferroelectric thin film, so as to generate the electron emission from the external surface of the dielectric, pyroelectric, piezoelectric or ferroelectric thin film.

In an embodiment of this aspect, the actuator is a heater-thermometer in thermal contact with the dielectric, pyroelectric, piezoelectric or ferroelectric thin film; wherein the heater-thermometer actuates the change in the temperature. In an embodiment, the step of applying the change in temperature, mechanical strain or applied electric field comprises heating or cooling the dielectric, pyroelectric, piezoelectric or ferroelectric thin film. In an embodiment, for example, the dielectric, pyroelectric, piezoelectric or ferroelectric thin film is heated at a rate equal to or greater than $1 \times 10^{6\circ}$ C. s$^{-1}$ and, optionally for some applications at a rate equal to or greater than $1 \times 10^{9\circ}$ C. s$^{-1}$. In an embodiment, for example, the dielectric, pyroelectric, piezoelectric or ferroelectric thin film is cooled at a rate equal to or greater than $-1 \times 10^{6\circ}$ C. s$^{-1}$ and, optionally for some applications at a rate equal to or greater than $-1 \times 10^{9\circ}$ C. s$^{-1}$; wherein in this context greater than the specified rate refers to an absolute value greater than $1 \times 10^{5\circ}$ C. s$^{-1}$ or $1 \times 10^{9\circ}$ C. s$^{-1}$ but retains the negative sign so as to indicate a change in temperature providing cooling. In an embodiment, for example, the dielectric, pyroelectric, piezoelectric or ferroelectric thin film undergoes a change in temperature selected over the range of 0° C. to 1250° C. In an embodiment, for example, the dielectric, pyroelectric, piezoelectric or ferroelectric thin film is heated to a temperature equal to or greater than 1200° C. or cooled to temperature equal to or less than −150° C. In an embodiment of this aspect, the step of applying a change in temperature, mechanical strain or applied electric field comprises changing the state of strain of the dielectric, pyroelectric, piezoelectric or ferroelectric thin film. In an embodiment, for example, the dielectric, pyroelectric, piezoelectric or ferroelectric thin film undergoes a change in the state of strain selected over the range of −4% to 4%. In an embodiment of this aspect, the step of applying a change in temperature, mechanical strain or applied electric field comprises changing the electric field applied to the dielectric, pyroelectric, piezoelectric or ferroelectric thin film. In an embodiment, for example, the electric field applied to the dielectric, pyroelectric, piezoelectric or ferroelectric thin film is changed at a rate equal to or greater than $1 \times 10^9$ V s$^{-1}$.

In an embodiment, for example, the dielectric, pyroelectric, piezoelectric or ferroelectric thin film under goes a change in the applied electric field selected over the range of 0 to +/−10$^9$V/cm.

In another aspect, the present invention provides a method for making an electron emission device comprising the steps of: (i) providing a substrate having a receiving surface; (ii) providing a dielectric, pyroelectric, piezoelectric or ferroelectric thin film on at least a portion of the receiving surface or provided on one or more intermediate structures supported by the receiving surface; wherein the dielectric, pyroelectric, piezoelectric or ferroelectric thin film has a thickness less than or equal to 10 µm; and operationally coupling an actuator to the dielectric, pyroelectric, piezoelectric or ferroelectric thin film for selectively modulating a state of mechanical strain, a temperature, an applied electric field or a combination of these in the dielectric, pyroelectric, piezoelectric or ferroelectric thin film so as to generate electron emission from an external surface of the dielectric, pyroelectric, piezoelectric or ferroelectric thin film. In an embodiment, for example, the dielectric, pyroelectric, piezoelectric or ferroelectric film is generated using epitaxial growth, molecular beam epitaxy (MBE), pulsed laser deposition (PLD) growth, metal organic chemical vapor deposition (MOCVD), sputtering, annealing, chemical vapor deposition, physical vapor deposition and/or sol-gel techniques.

In an embodiment, for example, the step of providing the dielectric, pyroelectric, piezoelectric or ferroelectric thin film comprises depositing or growing the dielectric, pyroelectric, piezoelectric or ferroelectric thin film or a precursor thereof directly on the receiving surface of the substrate or on one or more intermediate layers supported by the receiving surface of the substrate. In an embodiment, for example, the dielectric, pyroelectric, piezoelectric or ferroelectric thin film is deposited or grown via epitaxial growth. In an embodiment, for example, the step of providing the dielectric, pyroelectric, piezoelectric or ferroelectric thin film comprises crystallizing the dielectric, pyroelectric, piezoelectric or ferroelectric thin film or a precursor thereof on the substrate. In an embodiment, for example, the step of providing the dielectric, pyroelectric, piezoelectric or ferroelectric thin film comprises annealing the dielectric, pyroelectric, piezoelectric or ferroelectric thin film or a precursor thereof on the substrate.

In another aspect, the present invention provides a method for generating electron emission comprising the steps of: (i) providing an electron emission device comprising: a cantilever having an integrated heater-thermometer; and a thermally conductive tip comprising a dielectric, pyroelectric, piezoelectric or ferroelectric film having a thickness less than or equal to 10 µm, wherein the thermally conductive tip terminates at an end having a cross sectional dimension less than or equal to 250 nm; and wherein the thermally conductive tip is provided on the cantilever in thermal contact with the heater-thermometer; and (ii) applying a change in temperature, mechanical strain or applied electric field to the dielectric, pyroelectric, piezoelectric or ferroelectric film, so as to generate the electron emission from the thermally conductive tip. In an embodiment, the heater-thermometer actuates the change in temperature, mechanical strain or applied electric field of the dielectric, pyroelectric, piezoelectric or ferroelectric film. In an embodiment, the method of this aspect further comprises applying an electric field to the cantilever, for example an electric field selected over the range of 0 to +/−10$^9$V/cm.

In another aspect, the present invention provides a method for making an electron emission device comprising the steps of: (i) providing a cantilever having an integrated heater-thermometer; and (ii) providing a dielectric, pyroelectric, piezoelectric or ferroelectric film on the cantilever having a thickness less than or equal to 10 μm, thereby generating a thermally conductive tip, wherein the thermally conductive tip terminates at an end having a cross sectional dimension less than or equal to 250 nm; and wherein the thermally conductive tip is provided in thermal contact with the heater-thermometer. In an embodiment of this aspect, for example, the step of providing a dielectric, pyroelectric, piezoelectric or ferroelectric film comprises growing, depositing, crystallizing and/or annealing the dielectric, pyroelectric, piezoelectric or ferroelectric film or a precursor thereof on the cantilever. In some embodiments, for example, the integrated heater-thermometer of the device provides a means for crystallizing and/or annealing processing of the dielectric, pyroelectric, piezoelectric or ferroelectric film.

Without wishing to be bound by any particular theory, there can be discussion herein of beliefs or understandings of underlying principles or mechanisms relating to the invention. It is recognized that regardless of the ultimate correctness of any explanation or hypothesis, an embodiment of the invention can nonetheless be operative and useful.

BRIEF DESCRIPTION OF THE DRAWINGS

FIG. 19. provides a table summarizing physical properties of a number of candidate pyroelectric materials.

DETAILED DESCRIPTION

Figure 1:
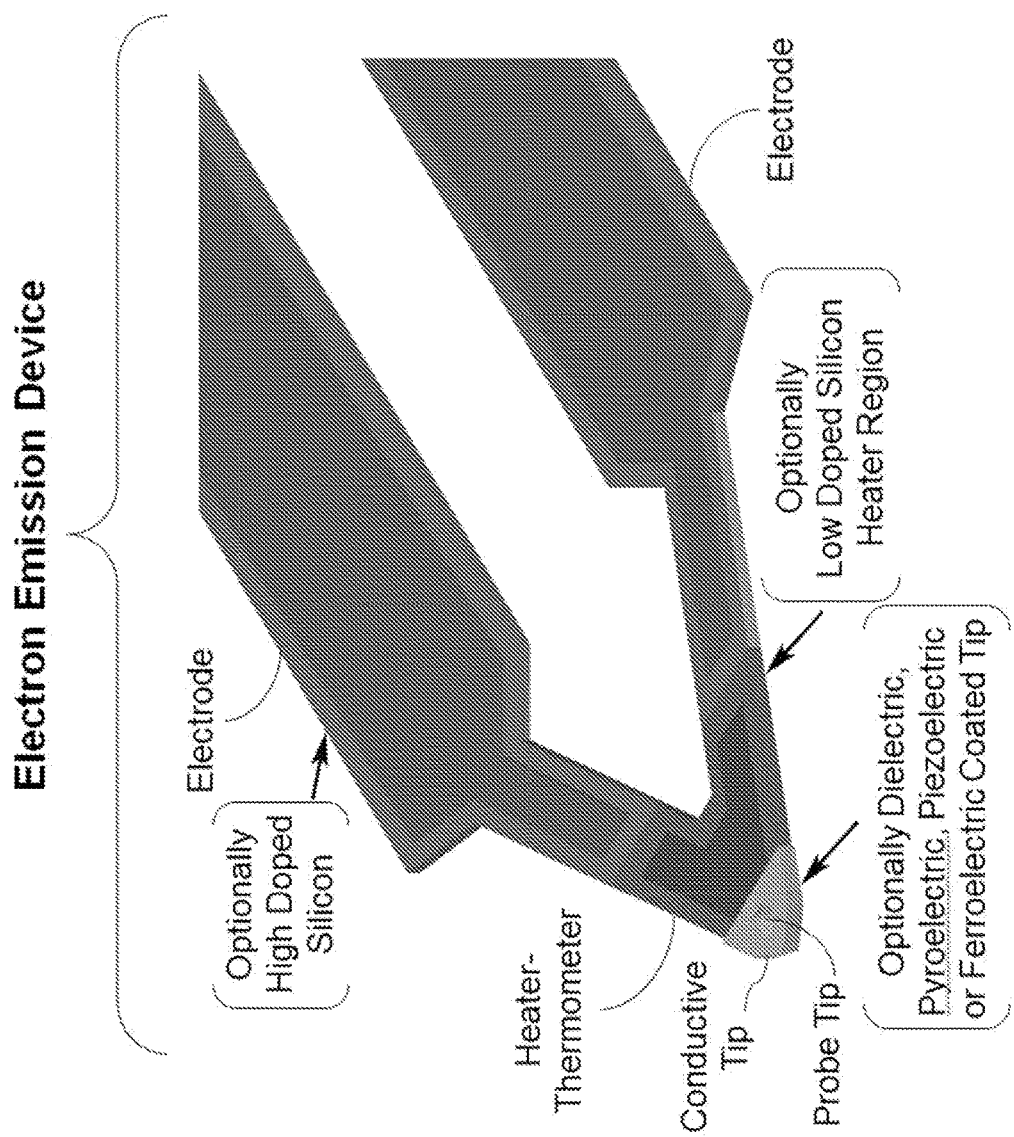
FIG. 1. Single-crystal doped silicon nanoprobe with integrated solid state heater and thermally conductive tip comprising a dielectric, pyroelectric, piezoelectric or ferroelectric film.

In general the terms and phrases used herein have their art-recognized meaning, which can be found by reference to standard texts, journal references and contexts known to those skilled in the art. The following definitions are provided to clarify their specific use in the context of the invention.

"Thermal contact" and "thermal communication" are used synonymously and refer to an orientation or position of elements or materials, such as an actuator, substrate, a dielectric, pyroelectric, piezoelectric or ferroelectric thin film, a temperature controller, heater, cooler, and/or a thermally conductive tip, such that there is more efficient transfer of heat between the two elements than if they were thermally isolated or thermally insulated. Elements or materials may be considered in thermal communication or contact if heat is transported between them more quickly than if they were thermally isolated or thermally insulated. Two elements in thermal communication or contact may reach thermal equilibrium or thermal steady state and in some embodiments may be considered to be constantly at thermal equilibrium or thermal steady state with one another. In some embodiments, elements in thermal communication with one another are separated from each other by a thermally conductive material or intermediate thermally conductive material or device component. In some embodiments, elements in thermal communication with one another are separated by a distance of 1 μm or less. In some embodiments, elements in thermal communication with one another are also provided in physical contact. In an embodiment, for example, the dielectric, pyroelectric, piezoelectric or ferroelectric thin film, the substrate and optionally one or more probe tips are provided in thermal contact. In an embodiment, for example, the dielectric, pyroelectric, piezoelectric or ferroelectric thin film, the actuator and optionally one or more probe tips are provided in thermal contact. "Thermally conductive" refers to the property of a material or structure that is able to conduct heat, for example, metals, conductors, and semi-conductors. Thermally conductive materials generally have thermal conductivity greater than or equal to 10 W m$^{-1}$ K$^{-1}$. In some cases, the relative thermal conductivity of a one material to another may be high, such that a material with thermal conductivity greater than or equal to 1 W m$^{-1}$ K$^{-1}$ may be considered thermally conductive. In an embodiment, the invention provides devices and methods wherein any one, and preferably for some applications, all of, the substrate, dielectric, pyroelectric, piezoelectric or ferroelectric thin film and the actuator are thermally conductive. In an embodiment, the invention provides devices and methods wherein any one, and preferably for some applications, all of, the cantilever, thermally conductive tip and integrated heater-thermometer are thermally conductive. In an embodiment, the invention provides a device having a thermally conductive probe tip in thermal contact with a temperature controller (e.g., heater or cooler) and a dielectric, pyroelectric, piezoelectric or ferroelectric thin film.

"Cantilever" refers to a structure having at least one fixed, or attached end, such as a microcantilever of an atomic force microscope, electron microscope or nano-materials sensor. Cantilevers of the invention include microcantilevers and nanocantilevers having a free ended cantilever configuration or having a clamped-clamped cantilever configuration. A cantilever generally comprises a tip, for example useful for probing properties of a surface, such as contours, morphology, composition, etc. In some embodiments, microcantilevers have dimensions on the order of 1 to 1000 μm. Useful cantilevers comprise those having any useful shape, including platform or rectangular shaped cantilevers, circular shaped cantilevers, ladder shaped cantilevers, U-shaped cantilevers, triangular shaped cantilevers, and cantilevers having cutout portions. "Rectangular cantilever" specifically refers to a cantilever having a platform type shape, with a length, a width and a height. Rectangular cantilevers also include embodiments where there are one or more cutout portions. For some embodiments, a "cutout portion" refers to a region of a cantilever where material is removed from a cantilever that would be an otherwise monolithic body. For specific embodiments, a cutout portion refers to regions within a cantilever that comprise air or other material which do not allow efficient coupling and/or substantial coupling of mechanical or thermal energy from one portion of a cantilever to another portion of a cantilever.

"Fixed end" or "fixed base" refers to an end of a cantilever which is attached to the cantilever base. A fixed end of a cantilever is unable to move independently of the cantilever base.

"Free end" or "non-fixed end" refers to an end of a cantilever which is not attached to the cantilever base. The free end of a cantilever is able to move independently of the cantilever base, for example when the cantilever bends or vibrates. For some embodiments, when a cantilever is operating in contact mode, the free end of the cantilever or the tip of the cantilever is in contact with an object, such as a surface; in these embodiments the free end is coupled to the sample. For embodiments, when a cantilever is operating in tapping mode, the free end of the cantilever is permitted to vibrate.

"Temperature controller" refers to a device or component thereof capable of changing the temperature of a structure or material, such as a dielectric, pyroelectric, piezoelectric or ferroelectric thin film, a probe tip, and/or substrate. Temperature controllers include heaters, coolers and combination heater—coolers, optionally with one or more sensors and processers for controlling temperature.

"Heater-thermometer" refers to a combination of a device for determining temperature and a device for actuating the temperature. In an embodiment, a thermistor is useful as a heater-thermometer. A thermistor refers to a resistive material which has a resistance which is temperature dependent. Providing a current or voltage to a thermistor can result in an increase in the temperature of the thermistor through resistive heating. Since the resistance of a thermistor is temperature dependent, it can be used as means for measuring the temperature; i.e., by measuring the resistance of the thermistor, the temperature of the thermistor can be determined. A thermistor useful with some embodiments of the present invention comprises doped silicon, for example silicon doped with a phosphorus concentration of about $1 \times 10^{15}$ cm$^{-3}$ to $1 \times 10^{18}$ cm$^{-3}$. A heater-thermometer can refer to a single or separate distinct elements for measuring and actuating the temperature, for example a thermistor or a thermocouple and a resistive heater.

"Ferroelectric" refers to a material exhibiting a ferroelectric property. Ferroelectric properties include, but are not limited to, the ability to generate a voltage and/or a current upon exposure to an electric field and/or change in exposed electric field. Some ferroelectric materials emit electrons when the spontaneous polarization is rapidly switched or undergoes a change in magnitude, whether through a temperature change, mechanical strain, or an electric field. The term ferroelectric is intended to include both ferroelectric and antiferroelectric materials.

"Pyroelectric" refers to a material exhibiting a pyroelectric property. Pyroelectric properties include, but are not limited to, the ability to generate a voltage and/or a current upon a change in temperature.

"Piezoelectric" refers to a material exhibiting a piezoelectric property. Piezoelectric properties include, but are not limited to, the ability to generate a voltage and/or a current upon the application of a mechanical stress and/or change of an applied mechanical stress. Piezoelectric properties include, but are not limited to, the ability to change physical dimensions and/or the state of strain upon the application of a voltage and/or a current.

"Positioned proximate to" refers to the position of a device component relative to another device component or feature. In an embodiment, proximate to refers to the arrangement of one device component such that it is within 100 μm of another device component or feature, optionally for some applications within 10 μm of another device component or device feature, and optionally for some applications within 1 μm of another device component or device feature. In some devices of the invention, the heater-thermometer is positioned proximate to the free end of the cantilever.

"Piezoresistive sensor" refers to a resistive material having resistance which changes when a strain is induced in the material, for example when the material is stretched or compressed. A piezoresistive sensor useful with some embodiments of the present invention comprises doped silicon, for example silicon doped with phosphorus or boron. In some embodiments of the present invention, piezoresistive sensors are integrated into a cantilever near the fixed end, and are useful for sensing surface stresses induced in the cantilever. According to this aspect, when a surface stress is induced in a cantilever which has an integrated piezoresistive sensor, the resistance of the piezoresistive sensor will change and can be sensed by a resistance sensing circuit thereby sensing the surface stress of the cantilever.

"Sense" and "sensing" refer to determination and/or observation of a signal indicative of a value, variable and/or property. In some embodiments, sensing refers to direct measurement of a value, variable and/or property; in other embodiments, sensing requires transformation (e.g., a mathematical transformation) to convert one value, variable and/or property into a measured and/or detected value.

"Measure" and "measuring" refer to determination of an absolute or relative value of a variable and/or property.

"Detect" and "determine" refer to observation and/or measurement of a property, object or value and/or a change in a property, object or value.

"Suspended structure" refers to a structure which is attached to one or more supports such that the structure is suspended over an opening or recessed region. In an embodiment, a cantilever is an at least partially suspended structure. A suspended structure may also refer to a structure which is held in place over an opening or a recessed region by one or more supports such that the structure partially covers the opening or recessed region. A suspended platform as used herein refers to a suspended structure having a planar or substantially planar surface, such a surface having an average divergence from planarity of less than 1 μm. For some embodiments, a suspended platform is a thin planar suspended structure, e.g. having an average thickness in the range of 0.05 to 5.0 μm.

"Unitary structure" refers to a structure having one or more components within a single continuous or monolithic body, and includes structures having a uniform or non-uniform composition. For example, a block of single crystal silicon having a region of implanted dopants has a unitary structure.

"Operationally coupled" refers to a configuration wherein a device component is able to interact with, act upon, or otherwise effect, another device component, for example, so as to achieve a functional result in connection with device operation or device functionality. In an embodiment, for example, the invention provides electron emission devices wherein an actuator component is operationally coupled to a dielectric, pyroelectric, piezoelectric or ferroelectric thin film such that it is able to selectively modulate, or otherwise effect a change in, temperature, state of mechanical strain and/or applied electric field to the dielectric, pyroelectric, piezoelectric or ferroelectric thin film, for example, so as to generate said electron emission from an external surface of said dielectric, pyroelectric, piezoelectric or ferroelectric thin film. In specific methods and devices of some embodiments of the invention, an actuator comprising a temperature controller, such as a heater component or a cooling component, is operationally coupled by being placed in direct or indirect thermal contact with a dielectric, pyroelectric, piezoelectric or ferroelectric thin film, for example via a thermally conductive substrate. In specific methods and devices of some embodiments the invention, an actuator comprising a mechanical resonator is operationally coupled by being positioned such that forces generated by the resonator can act on the dielectric, pyroelectric, piezoelectric or ferroelectric thin film. In specific methods and devices of some embodiments the invention, an operationally coupled actuator directly supports and is in physical contact with the dielectric, pyroelectric, piezoelectric or ferroelectric thin film. In specific methods and devices of some embodiments the invention, an operationally coupled actuator indirectly supports the dielectric, pyroelectric, piezoelectric or ferroelectric thin film, for example wherein the thin film is provided on one or more intermediate structures, such as one or more probe tips, supported by the actuator. In an embodiment, for example, the invention provides electron emission devices wherein an actuator component is operationally coupled to a dielectric, pyroelectric, piezoelectric or ferroelectric thin film such that it is able to established a selected electric field on an external surface of the dielectric, pyroelectric, piezoelectric or ferroelectric thin film.

The invention may be further understood by the following non-limiting examples.

Example 1: Ferroelectric Nanoprobe Tip Emitter with Heater-Thermometer

This example describes the fabrication of nanometer-sharp ferroelectric tips on doped silicon heater-thermometers using wafer scale batch processing. The nanoprobes can self-heat to more than 500° C. for pyroelectric electron emission from the ferroelectric film.

Ferroelectric materials emit electromagnetic radiation when the spontaneous polarization of the material is rapidly switched, whether through a temperature change, mechanical strain, or an electric field. Traditionally, studies of electron emission in ferroelectric materials have focused on samples of millimeter length scale or larger. This example describes a nanometer-scale tip with an integrated thin film of crystalline $PbZr_{0.2}Ti_{0.8}O_3$ (PZT) capable of rapid self-heating to achieve pyroelectric electron emission.

Electron emission from ferroelectric materials has been well documented and studied for more than half a century. Ferroelectrics emit electrons with relatively high current densities in poor vacuum and with instant turn-on. Weak electron emission occurs during rapid changes in the spontaneous polarization of the ferroelectric material. Such spontaneous polarization may occur from thermal stress, mechanical stress, or large applied electric fields. Weak emission current densities can reach $10^{-7}$ A/cm² with electron energies near $10^5$ eV. Early research indicated a decrease in electron emission with a decrease in film thickness and therefore studies focused on crystals with dimensions larger than millimeters. More recently, as fabrication methods and film qualities have improved, electron emission has been demonstrated from ferroelectric films nanometers thick, now making it possible to incorporate high-quality thin ferroelectric films in conventional silicon microelectronics for electron emission.

Fabrication.

Figure 2:
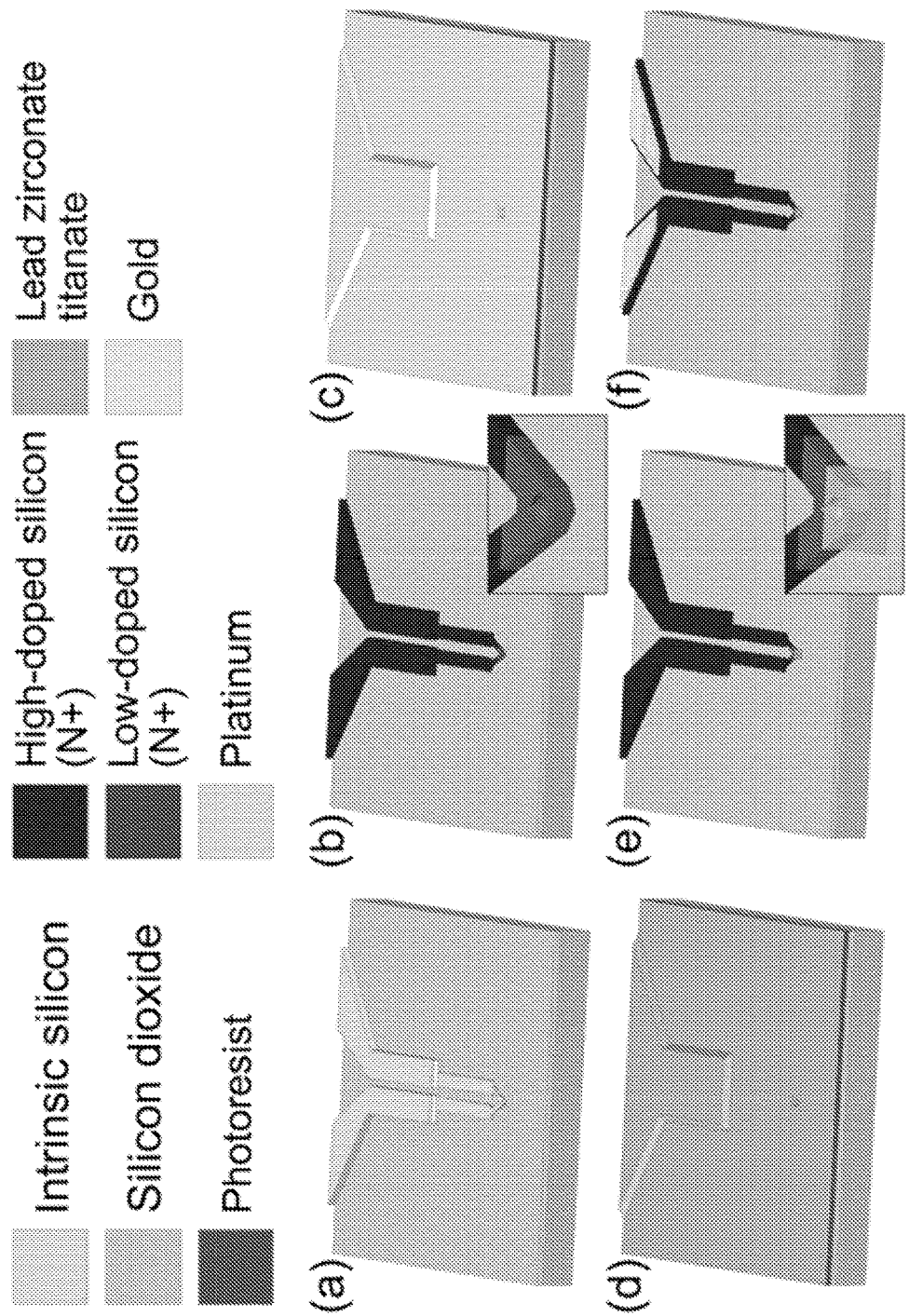
FIG. 2. Fabrication process for ferroelectric nanoprobe. (a) Starting with an SOI wafer, we form the sharpened tip using oxidation sharpening and define the device shape using deep-reactive ion etching, (b) then low dope the entire structure n-type and highly dope the device legs n+-type. (c) Only the nanoprobe tip is sputter coated with 5 nm of titanium and 75 nm of platinum using photolithography. (d) PZT is deposited at room temperature using pulsed-laser deposition, (e) then the excess platinum and PZT are removed with an acetone lift-off. The PZT is annealed in a furnace at 600° C. and (f) electrical connections are formed with sputtered gold.

FIG. 1 shows the ferroelectric tip integrated with the doped single-crystal silicon heated nanoprobe. The highly doped device legs carry current while the tip region is doped at a lower concentration for resistive heating. FIG. 2 shows the fabrication process for depositing (001) crystallized PZT on <100> single-crystal silicon. The devices are fabricated using a silicon-on-insulator (SOI) process, modified to accommodate a ceramic perovskite.

Fabrication begins with a 100 mm SOI wafer with a handle layer thickness of 500 μm, a silicon dioxide buried oxide (BOX) layer thickness of 1 μm, and a device layer thickness of 5±0.5 μm with a resistivity of 1-10 Ω·cm doped n-type with phosphorus. First, dull cylindrical tips are fabricated using an inductively coupled plasma-deep reactive ion etch (ICP-DRIE) to etch 2 μm into the silicon device layer and then sharpen the silicon tips using oxidation sharpening to about 10 nm in radius. An ICP-DRIE through the remaining silicon device layer to the BOX layer defines the final device shape. Next, a photoresist mask is patterned and the entire structure is low doped n-type with phosphorus using ion implantation. Following the first ion implantation, the photoresist mask is removed and a 300 nm thick diffusion barrier plasma-enhanced chemical vapor deposition (PECVD) oxide is deposited and then the dopant is annealed in $N_2$ at 1000° C. for 30 min. Subsequently, the device legs are high doped n+-type with phosphorus through another photoresist mask and once more the photoresist mask is removed, a 300 nm thick diffusion barrier PECVD oxide is deposited, and then the phosphorus dopants are annealed in $N_2$ at 1000° C. for 120 min.

After the final dopant annealing, the barrier oxide is stripped and the exposed heater-thermometer is checked for proper resistance. Next, a photoresist mask is used to protect most of the device region except for a 14 μm square around the nanoprobe tip, which allows for selectively sputter coating the silicon tip with a 5 nm titanium adhesion layer and 75 nm of platinum. The platinum is predominantly (111) oriented due to its low surface energy and thus serves as a smooth, high-temperature compatible template for growing (001) oriented films of PZT. The PZT layer is deposited using pulsed laser deposition at room temperature employing a KrF excimer laser and a $Pb_{1.1}Zr_{0.2}Ti_{0.8}O_3$ ceramic target. The excess platinum and PZT are removed through lift-off in acetone and the remaining PZT is annealed in a furnace at 600° C. for 30 minutes in 1 atm oxygen to crystallize the PZT. The growth and annealing conditions were optimized to achieve fully (001) oriented PZT as determined by ex-situ X-ray diffraction studies. The nanoprobe is completed by forming electrical connections to the conductive device legs using sputtered gold.

Results and Discussion.

Figure 3:
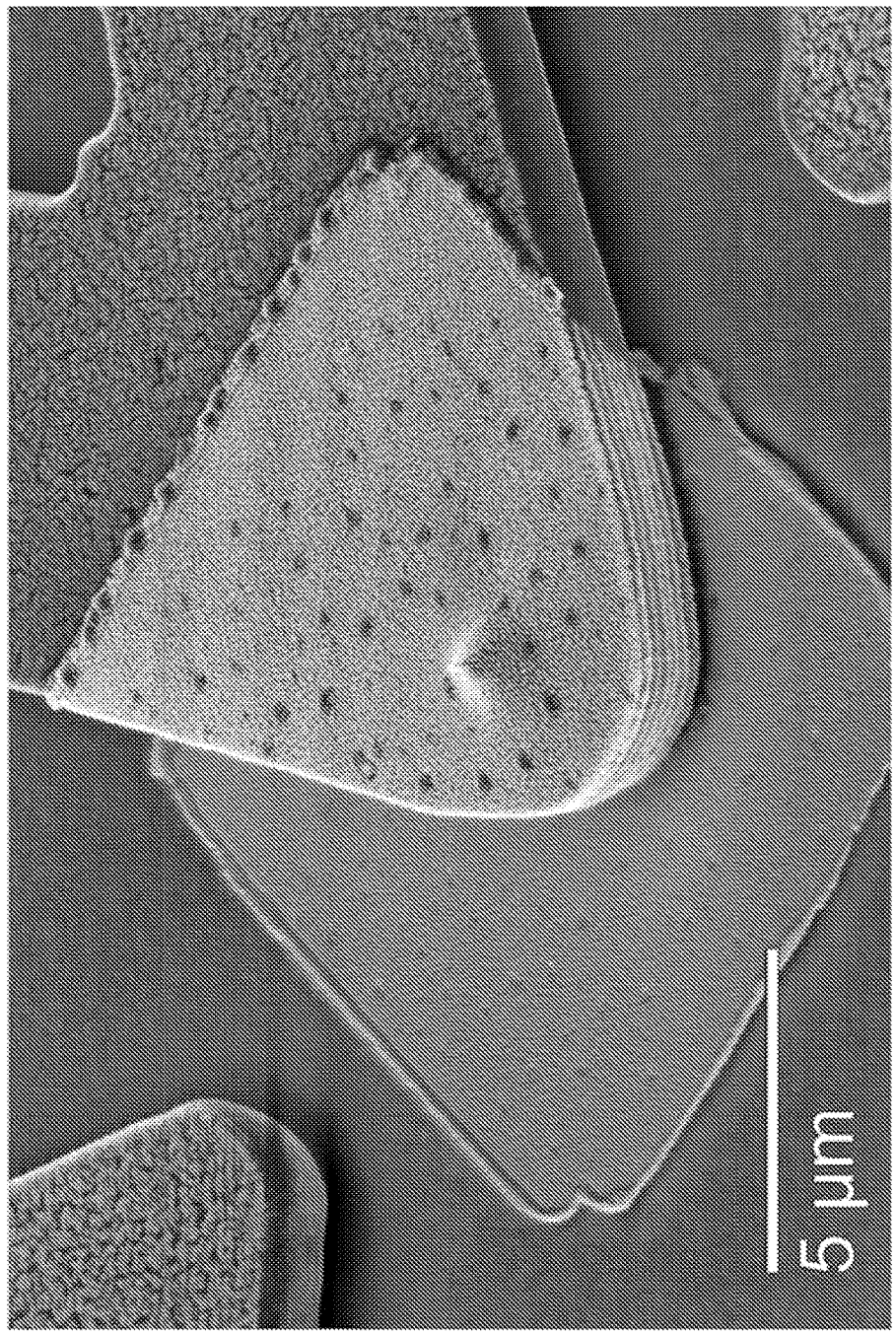
FIG. 3. Scanning electron micrograph of a heater-thermometer nanoprobe with PZT tip. The devices have an average tip radius of 26 nm over the wafer. The 75 nm thick PZT coating was deposited on top of a square area of platinum surrounding the nanoprobe tip.
Figure 4:
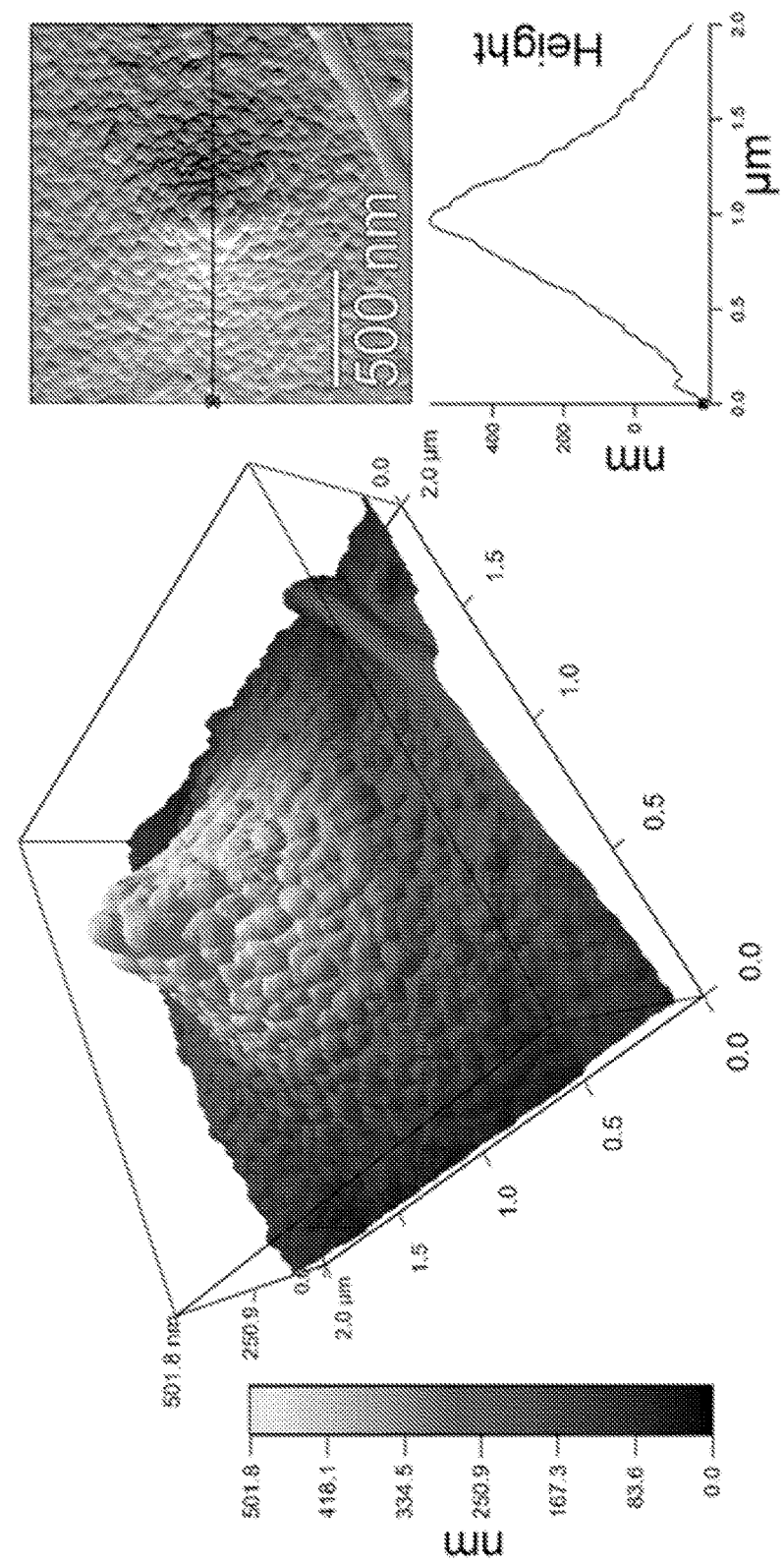
FIG. 4. Topography of heated nanoprobe tip coated with PZT. The top right inset shows an orthographic view of the tip area with the bisecting line indicating the location of the height cross section depicted in the bottom right inset.

FIG. 3 shows a fabricated ferroelectric nanoprobe and FIG. 4 shows a topography image of the ferroelectric PZT tip. The tip is conformally coated with (001) oriented PZT approximately 75 nm thick with RMS roughness of 32 nm. The batch fabrication process yields >550 devices on each 100 mm wafer with an average tip radius of 26 nm. The nanoprobe heater is capable of reaching temperatures >500° C. which exceeds the Curie temperature, or the point at which the PZT becomes cubic and paraelectric.

The as-grown spontaneous polarization direction of the PZT was studied using an atomic force microscope (AFM)-based technique. The ferroelectric nanoprobe was mounted on the sample stage and a conductive commercial tapping-mode cantilever tip was positioned 250 nm directly above the ferroelectric-coated tip, as shown in the FIG. 5 inset. A voltage bias was applied to the conductive cantilever and the tip force was measured as a function of separation distance for voltage biases between ±40V.

Figure 5:
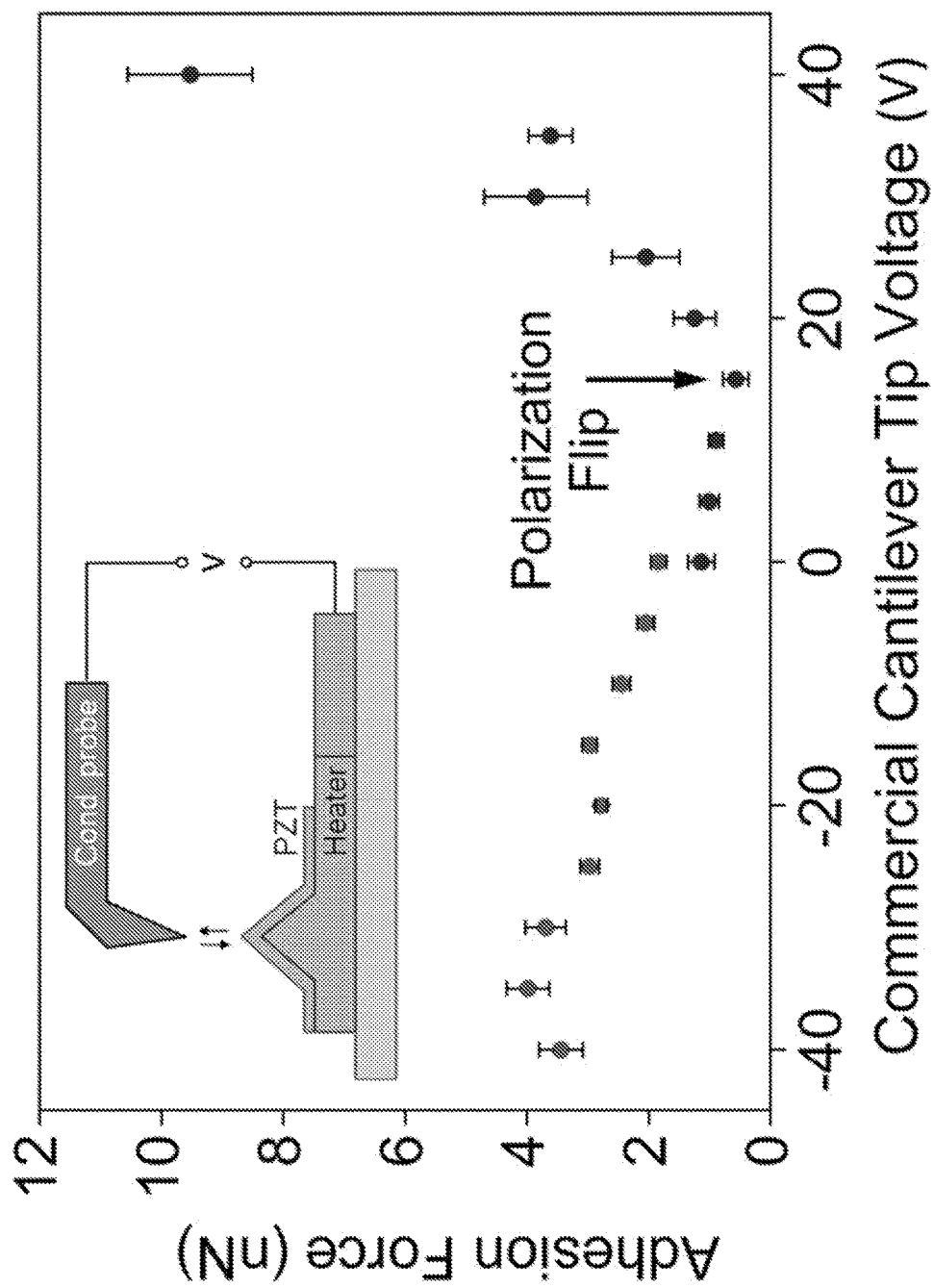
FIG. 5. Adhesion force versus applied tip voltage for an electrically conductive tip approaching a ferroelectric-coated nanoprobe in an AFM. The PZT flips polarization during the approach with +15 V bias. Inset shows the experimental setup for measuring force versus distance in an AFM. The separation distance was a maximum of 250 nm and the voltage potential V was ramped to ±40V in 5V increments.

FIG. 5 shows the adhesion force between the two tips during retraction as a function of voltage bias. The tip bias applied to the virgin PZT was initially from 0 to −40V, center to left on FIG. 5; the adhesion force increased approximately linearly which indicates that the as-grown PZT had an initial positive surface charge corresponding to an upward polarization of the PZT layer. The PZT tip was then interrogated with a voltage bias from 0 to +40V, center to right on FIG. 5, and the adhesion force initially decreased to a minimum and then increased linearly. This suggests that the PZT experienced a spontaneous polarization reversal with an applied tip bias of +15V, becoming negatively charged on the surface.

In summary, this example demonstrates a nanometer-scale tip of crystalline PZT on a single-crystal silicon heated nanoprobe designed for electron emission through rapidly switching polarization with an electric field or temperature gradient. The incorporation of ferroelectric material in a nanometer-sharp tip facilitates nanoscale electron sources for miniature electron microscopes and nano-characterization tools.

Example 2: Nanometer-Scale Pyro-Electro-Mechanical Electron Source

Ferroelectric materials can generate electron emission when actuated with temperature changes, mechanical strains, or electric fields. Such emission arises due to the deviation in spontaneous polarization from its equilibrium state and the generation of uncompensated electrostatic charges and fields on the ferroelectric polar surface. Ferroelectric materials exhibit pyroelectric and piezoelectric effects as well as spontaneous polarization reversal—all of which can give rise to electron emission. Traditional approaches to such electron emission effects have focused on materials of millimeter or larger size. Over the past decades, there have been revolutionary improvements in the design and synthesis of ferroelectric materials and their integration into nano-electromechanical systems (NEMS). These advances have, however, not been applied to electron sources.

This example outlines the design, fabrication, and characterization of an electron emitter based on modern pyroelectric thin films integrated into a nano-thermo-mechanical resonator. In embodiments, the emitter produces tunable electrons which can be controlled. For example, in an embodiment, the emitter produces electron packet sizes less than 1 pC. In an embodiment, the emitter produces pulses lengths less than 1 ps. In an embodiment, the emitter produces emittances less than 0.05 mm-mrad. In an embodiment, the emitter produces pulse repetition rates greater than 10 MHz. In embodiments, the pyroelectric films are controlled to exhibit pyroelectric coefficients of greater than or equal to 0.000005 $C/m^2$ K, for example, greater than 10× larger than the largest value ever reported. In embodiments, the pyroelectric films are controlled to exhibit and low conductivities, for example less than $10^{-5}$ S/m. In embodiments, the films are integrated with a NEMS resonator having resonance frequency >10 MHz, optionally controlling the repeat period between electron emission events. In embodiments, the resonator has an integrated thermal element, for example, allowing heating and cooling speeds greater than $10^{9\circ}$ C./s. Without being bound by any theory, it is believed that the speed of the heating/cooling speed helps to control the emission pulse length. Furthermore, in embodiments, a nanometer-scale tip or arrays of tips are integrated onto a resonator, allowing the pyroelectric cathode element to optionally approach an anode to within a distance of 10 nm and optionally leading to enhanced local field strengths as high as $10^9$ V/cm. This combination of strong pyroelectric response, controlled temperature fluctuations, field strength, and mechanical freedom arising from the resonating beam enables tunable electron emitter embodiments with variable electron packet size and variable electron energies (as high as $10^5$ eV).

In specific embodiments, a nanometer-scale pyroelectric emitter produces electron packet sizes of less than 1 pC. In specific embodiments, a nanometer-scale pyroelectric emitter produces electron pulse length of 1 ps. In specific embodiments, a nanometer-scale pyroelectric emitter produces electron source emittance between 0.005-0.05 mm-mrad. In specific embodiments, a nanometer-scale pyroelectric emitter exhibits pulse repetition rates between 10-50 MHz. Optionally, the device exhibits a power consumption of less than 10 mW. In embodiments, the device has a total size less than 100 $mm^2$, for example excluding the power source.

In embodiments, an electron emission device relies on electron emission driven by the pyroelectric effect from a nanometer-scale cathode tip, operating in vacuum. In a specific embodiment, the tip is integrated into a nanomechanical resonator beam having an integrated solid-state heater and a nanometer-scale sharp tip. In an exemplary embodiment, the tip is coated with a pyroelectric material having pyroelectric coefficient greater than or equal to 0.000005 $C/m^4$ K, for example, greater than 10× higher than the highest value ever reported. In embodiments, the mechanical resonator is a clamped-clamped beam of doped silicon, for example, with geometry selected such that the beam can be in mechanical resonance at 10 MHz. In embodiments, the beam exhibits mechanical resonance of 50 MHz or higher. Optionally, the silicon resonator has regions that are selectively doped such that electrical current can flow along the length of the beam. In one embodiment, the region near the tip is more highly resistive than the remainder of the beam, for example, such that there will be electrical power dissipated in the beam, inducing local heating, when current flows through the beam. In embodiments, the heating rate is faster than $10^{9\circ}$ C./sec. In embodiments, fine-level control over the electron pulse duration and pulse repetition rate is achieved while generating electrons with energies in excess of $10^5$ eV. Such control is achieved, in embodiments, because pyroelectric current generation is proportional to pyroelectric coefficient and rate of temperature change.

Figure 6:
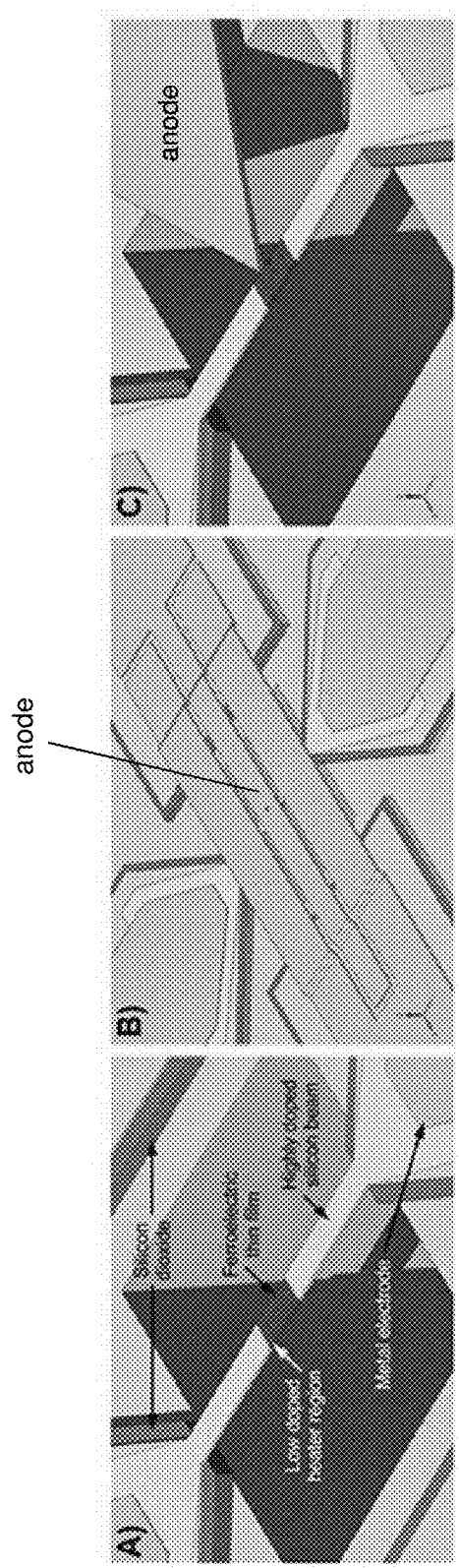
FIG. 6. Illustrations of the proposed device structure. A) Cut-away showing the details of the beam structure, including the low-doped heater and pyroelectric/ferroelectric region where emission will occur. B) The complete device structure will include a metallic anode structure (yellow) above the beam structure. Side electrodes can be used to drive the device structure. C) The top anode structure can be varied dramatically to tune emission characteristics, including creation of "point" anodes like that shown here.

FIG. 6 shows a device overview and two different device embodiments with differences in the anode geometry. In embodiments, device operation is as follows. The device is operated either in vacuum or in various gaseous environments. Primarily this example focuses on low vacuum (≤$10^{-5}$ Torr). An electrostatic force on the resonator beam causes it to move up and down at resonance. Relatively low voltages (~10V) can induce mechanical displacements greater than 1 μm. As the mechanical resonator moves up and down, the cathode tip will move toward and away from an anode. When the cathode tip is closest to the anode, the local field strength can be tuned to exceed $10^6$-$10^8$ V/cm, which is sufficient for electron emission from the tip, in embodiments. The critical field strength will be exceeded for only part of the overall mechanical resonance period, such that while the pulse repeat is defined by the mechanical resonance, the pulse duration is defined by the duration of time in which the local field strength exceeds the critical field strength. While FIG. 6 shows a single tip design, embodiments are contemplated with multiple tips on a single resonator, or embodiments having multiple closely packed resonators, where each resonator has a single or multiple tips.

In concert with the mechanical motion of the resonator beam, the heater induces temperature changes of the pyroelectric tip, for example greater than $10^{9\circ}$ C./sec. This temperature change induces electron emission from the formation of an electrostatic field due to a deviation in the spontaneous polarization from its equilibrium value. The character of this emission is, in general, a function of the change in polarization, the distance between the cathode and anode, the thickness and dielectric constant of the cathode material, and other variables. Below are provided detailed analyses of embodiments of the emitted electronics.

For example, the emission is controlled to achieve electron packet sizes less than 1 pC. In an embodiment, utilizing high-performance pyroelectric materials and nanofabrication to create nano-tip geometries, generation of surface fields at the pyroelectric as high as $10^8$-$10^9$ V/cm result in electron emission. By controlling the emitter tip geometry and field configuration, the electron packet size is controlled, for example $10^{-5}$-1 pC. Depending on requirements for integrated the emitter with an accelerator or other apparatus, the electron packet size can be further adjusted simply by varying the embodiment geometry and the number of tips that created in square or close-packed arrays. Likewise, in embodiments, the device has electron source emittance between 0.005 and 0.05 mm-mrad.

An important distinction between the embodiments described in this example and the prior art in field emitters is that many state-of-the-art field emitters work to make the sharpest tips possible to further enhance the electric field needed for emission which places strict limits on the minimum emittance. The presence of the high-performance pyroelectric material in device embodiments described in this example greatly enhances the ability to create strong electric fields required for emission.

General Discussion of Other Research in this Area.

There is a rich history of work on electron emission from ferroelectric materials. Traditionally, silicon has been used as the principle cathode material for field emitter arrays, but poor emission characteristics call for surface modification—including incorporation of new materials—to enhance emission. Electron emission from ferroelectrics is considerably different from classic electron emission and is thought to be superior to thermionic cathodes in that it has higher current densities and lifetimes, instant turn-on, can be operated in poor vacuum, and needs no separate activation process. Ferroelectric materials exhibit pyroelectric and piezoelectric effects as well as spontaneous polarization reversal—all of which can give rise to electron emission. For simplicity, throughout the remainder of the document we will use the term pyroelectric to describe the materials under study in this program, but we reiterate that the use of pyroelectric, ferroelectric materials also enables piezoelectric and polarization switching effects as needed.

Two different types of emission, so-called "weak" and "strong" emission, have been observed. Weak emission occurs from polar surfaces of ferroelectric materials only when they are in the ferroelectric phase and arises from a deviation of the spontaneous polarization with thermal (pyroelectric) and mechanical (piezoelectric) stresses and during polarization switching. The effect only occurs from negatively charged ferroelectric surfaces that are uncovered by an electrode. Such weak emissions effectively provide a screening electron current into the vacuum similar to a conventional conductive current of pyroelectric, piezoelectric, or polarization inversion origin in traditional capacitor structures. Generally a field between $10^6$-$10^8$ V/cm is required to drive a field electron emission effect in such materials. Weak electron emission is tunneling in nature and generally does not surpass current densities of $10^{-7}$ A/cm$^2$, but emitted electron energies can reach nearly $10^5$ eV. In general weak emission has been studied in low vacuum environments ($\leq 10^{-5}$ Torr).

Strong emission can achieve current densities in excess of 100 A/cm$^2$ and is thought to be a plasma-assisted electron emission process. Such effects have been observed in both ferroelectric and non-ferroelectric dielectric phases. Strong emission only occurs when patterned electrodes are deposited on the top of the ferroelectric material. It is hypothesized that application of a large voltage to the patterned electrode structures gives rise to a normal field component that is responsible for reversing the spontaneous polarization, completing a field-induced phase transition, and inducing conventional dielectric polarization in areas under or directly next to the patterned electrode. A tangential field component, however, exists in the uncovered areas of the sample and may cause a surface flashover by avalanching emitted electrons. There is not a strong consensus about the true nature of "strong" emission and this field is ripe for further investigation, especially within the present context of electron sources. In general strong emission, contrary to classical emission, is actually enhanced by low-pressures of gas or plasma—studies have demonstrated strong emission at pressures as high as 0.1 Torr.

Before the year 2000, published research on emission from pyroelectrics focused on mm to cm sized crystals, not suitable for integration as modern electronic devices. Early research showed a pronounced size effect (i.e., diminished emission from thinner single crystals) that suggested it might be difficult to achieve emission in thin films. Conventional wisdom within the field suggested that the field intensity would vary strongly with the ratio of the thickness of the material to the gap between the anode and cathode. It is now clear that this conventional wisdom is incorrect. Electron emission has been achieved in 800 nm thick films at considerably smaller applied voltages than observed previously. Electron emission has been observed from 30 nm films of $Ba_{0.67}Sr_{0.33}TiO_3$ on silicon tips, 12 nm thick $SrTiO_3$-coated and N-doped $SrTiO_3$-coated silicon tip arrays, 30 nm thick $(Ba_{0.65}Sr_{0.35})_{1-x}La_xTiO_3$ films on silicon emitter arrays, and others.

Technical Rationale.

In embodiments, miniature electron sources are produced by integrating high-quality pyroelectric thin films with a NEMS thermo-mechanical actuator. For some embodiments, use of thin film growth techniques permits formation of extraordinary high crystalline quality films and to control the properties of these materials. Control over ferroelectric thin films is achieved, for example to provide large and tunable polarization, pyroelectric coefficients, and piezoelectric coefficients as compared to their bulk ceramic counterparts.

In general two types of electron emission (over-barrier or photoelectron/thermionic and tunneling) are possible from solids. This example expands from work in electron emission which occurs as a result of thermal stimulation (i.e., the pyroelectric effect), mechanical stress (i.e., the piezoelectric effect), and ferroelectric switching. The measured electron energies from such emissions are high (several keV without an external accelerating voltage). Early studies showed important distinctions between ferroelectric electron emission and classic electron emission—namely the only reason for the ferroelectric electron emission is the formation of an electrostatic field due to a deviation in the spontaneous polarization from its equilibrium value under pyroelectric, piezoelectric effects or polarization reversal. Although much work has focused on low pressure studies (i.e., <$10^{-5}$ Torr) some forms of emission in these materials (contrary to classical emission) are actually enhanced by low-pressures of gas or plasma—studies have demonstrated strong emission at pressures as high as 0.1 Torr. Much work to date has focused on flat plane-to-plane emission geometries where the external field developed at the surface of the pyroelectric is a function of the change in polarization, the distance between the cathode and anode, the thickness and dielectric constant of the cathode material. Calculations showing the characteristics of electrons emitted from the device embodiments described herein are provided.

Component Design.

FIG. 6 shows a complete device embodiment schematic. The device builds off of a thin silicon clamped-clamped cantilever beam that has been selectively doped with phosphorus such that the center of the beam has a low-doped heater region in series with the two cantilever legs (highly-doped) that carry current with low resistance. The cantilever bridge has electrical connections to enable thermal and electrostatic actuation for both temperature and position control. In embodiments, the resistive heater region (shown in red in FIG. 6) dissipates over 95% of the applied power. In embodiments, the heater region reaches temperatures as high as 1200° C. Heating/cooling rates as fast as $10^{9°}$ C./sec are achieved by certain embodiments. In a specific embodiment, at the center of the device, a sharp silicon tip (or array of tips), for example with radius of less than 10 nm, is fabricated on the cantilever beam and the tip is coated with a pyroelectric thin film enabling enhanced electron emission.

The heated tip design achieves temperature control, for example, over the temperature range 25-1200° C., and high operating speeds, for example greater than 10 MHz and optionally in the range of 10-50 MHz. In an embodiment, the cantilever beam resonates at frequencies in excess of 10 MHz normal to a metal anode cap fabricated above the cantilever beam (yellow areas in FIGS. 6B and C). In one embodiment, this metal film has a small hole directly above the silicon tip such that electrons emitted from the pyroelectric film pass through the metal anode normal to the substrate and allow for electric field shaping and formation of the very large fields needed for emission from the tip material. In embodiments, the tip-hole spacing is controlled to within 10 nm. This combination of mechanical strain, high temperature transients, and controllable high field, for example, enables very high field emission with all of the important parameters actively controlled. In an embodiment, the device structure is electrically isolated from the underlying silicon using a silicon dioxide insulating layer that is incorporated using silicon-on-insulator wafer technology. In embodiments, the overall device chip is a 10 μm square fabricated on a standard 500 μm thick silicon handle wafer. Optionally, the wafer is made thinner using standard techniques.

Typical forces per unit length required to maintain clamped-clamped cantilever beams in resonance are on the order of 10 μN/m. The attractive electrostatic force between two charged parallel plates is $$F_{electrostatic} = \frac{1}{2}\frac{\varepsilon A}{d^2}V^2 \quad (1)$$

where $\varepsilon$ is the permittivity of air, A is the surface area of the plate, d is the distance between the parallel plates, and V is the voltage between the plates. A resonating beam embodiment 8 μm wide and 30 μm long resonates at about 10 MHz. In embodiments, an electrostatic voltage of about 10 V achieves displacements greater than 1 mm.

Figure 7:
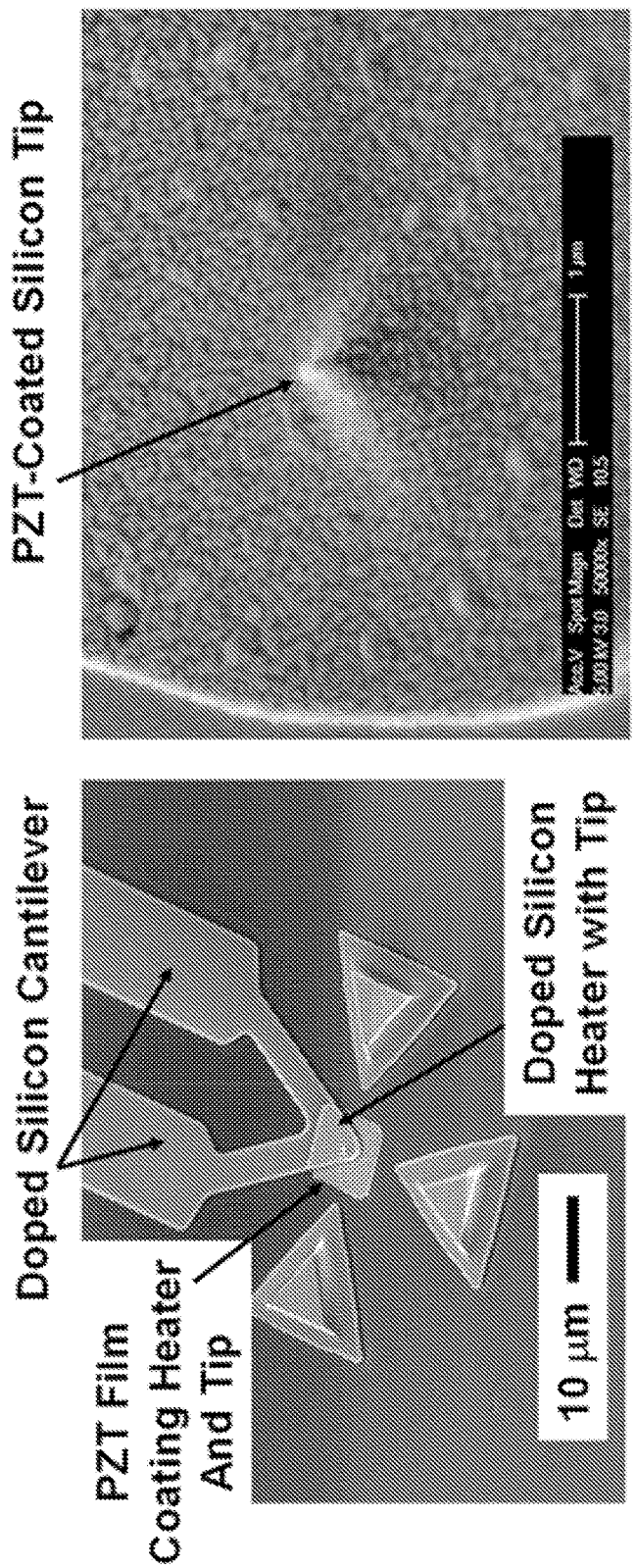
FIG. 7. AFM cantilever and tip fabricated from doped silicon. A doped silicon heater region is located near the tip. This tip has been coated with 75 nm PZT.

Embodiments achieve enhanced emission by incorporating high-performance pyroelectric materials into such devices, for example, using high pyroelectric coefficient films with low electrical conductivity and integration of these films into a silicon NEMS platforms. FIG. 7 shows a device embodiment where a $PbZr_{0.2}Ti_{0.8}O_3$ thin film has been fabricated onto a nano-tip fabricated at the free end of a doped silicon microcantilever. The PZT film has been patterned using a liftoff process such that it coats only the cantilever heater region, which is located near the cantilever free end. While there are a few published papers showing pyroelectric films coated onto silicon tips, this is the first demonstration of a pyroelectric film integrated into a working NEMS device. Additional embodiments include multiple tips or arrays of tips on a single cantilever, for example, to further enhance emission and electron packet sizes.

Advanced Materials and Materials Design.

In certain embodiments, physical properties, such as pyroelectric, piezoelectric, ferroelectric, and electronic properties are tuned through stoichiometry and synthesis conditions. In embodiments, materials with large pyroelectric coefficients ($\pi$), large $P_s$, low $E_R$, and low $\sigma$ are utilized, for example, to maximize emission capacity and efficiency. In one embodiment the film is $Pb(Zr_{0.2}Ti_{0.8})O_3$. Optionally, $\pi$ is about 0.0003 $C/m^2 K$. Optionally, $P_s$ is within the range of 70-100 μC/cm². Optionally, c is less than or equal to 300. Optionally $\sigma$ is within the range of $10^{-8}$-$10^{-9}$ S/m.

Figure 8:
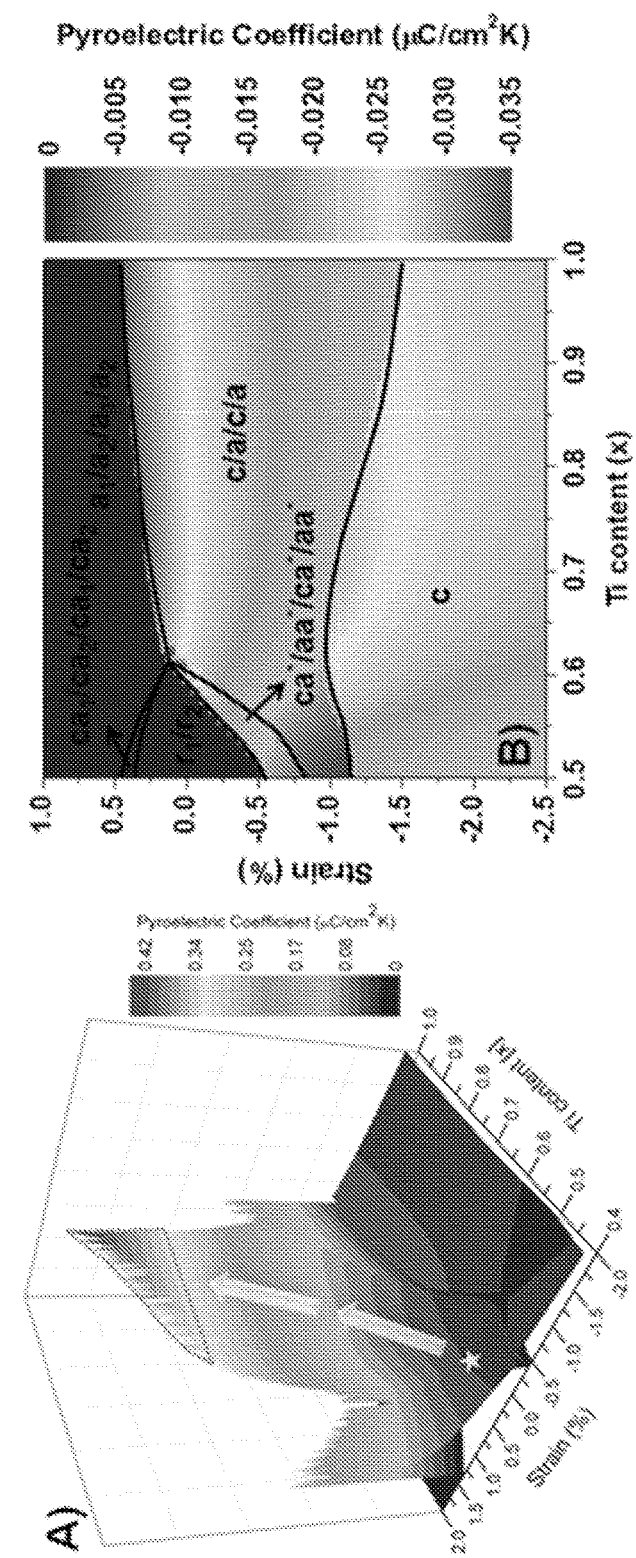
FIG. 8. GLD models as a function of synthesis parameters allow us to design high-performance materials in both A) single domain and B) poly-domain structures expected to occur in our devices. Here we show the variation of the pyroelectric coefficient as a function of chemical composition and thin film strain. The star marks the highest-measured value to date and our proposed areas of testing.

GLD phenomenological models are useful, for example, for optimizing the pyroelectric materials. These models allow for the prediction, for example, of optimal film strain, thickness, crystal orientation, and composition. FIG. 8 shows an example of such modeling applied to a thin film of (001)-oriented $PbZr_xTi_{1-x}O_3$. The example here shows pyroelectric coefficient as a function of materials chemistry and epitaxial thin films strain at 300K. The models appropriately capture structural phase evolution and suggest interesting enhancement of pyroelectric coefficients near phase boundaries and with strain and chemistry. The star marks the location of the highest ever measured pyroelectric coefficient in $PbZr_xTi_{1-x}O_3$. The models reveal that embodiments exhibiting appropriate strain and chemistry control obtain pyroelectric currents well over 10× larger than the highest ever reported. The pyroelectric coefficient, and therefore the electron emission characteristics of the films, achieved by embodiments are orders of magnitude higher than previously thought or than prior art indicates is possible.

Electron Packet Sizes Less than 1 pC.

The pyroelectric materials used in this example achieve controllable electron packet sizes less than 1 pC. In embodiments, electron emission from such materials requires fields between $10^6$-$10^8$ V/cm. To reiterate, there are a range of possible manners by which the formation of such fields is achieved including pyroelectric (temperature) effects, piezoelectric (strain) effects, ferroelectric polarization switching (electric field), or by a combination of externally applied field and one of the above. Each of these mechanisms and the effect on electron packet size is described next.

Figure 9:
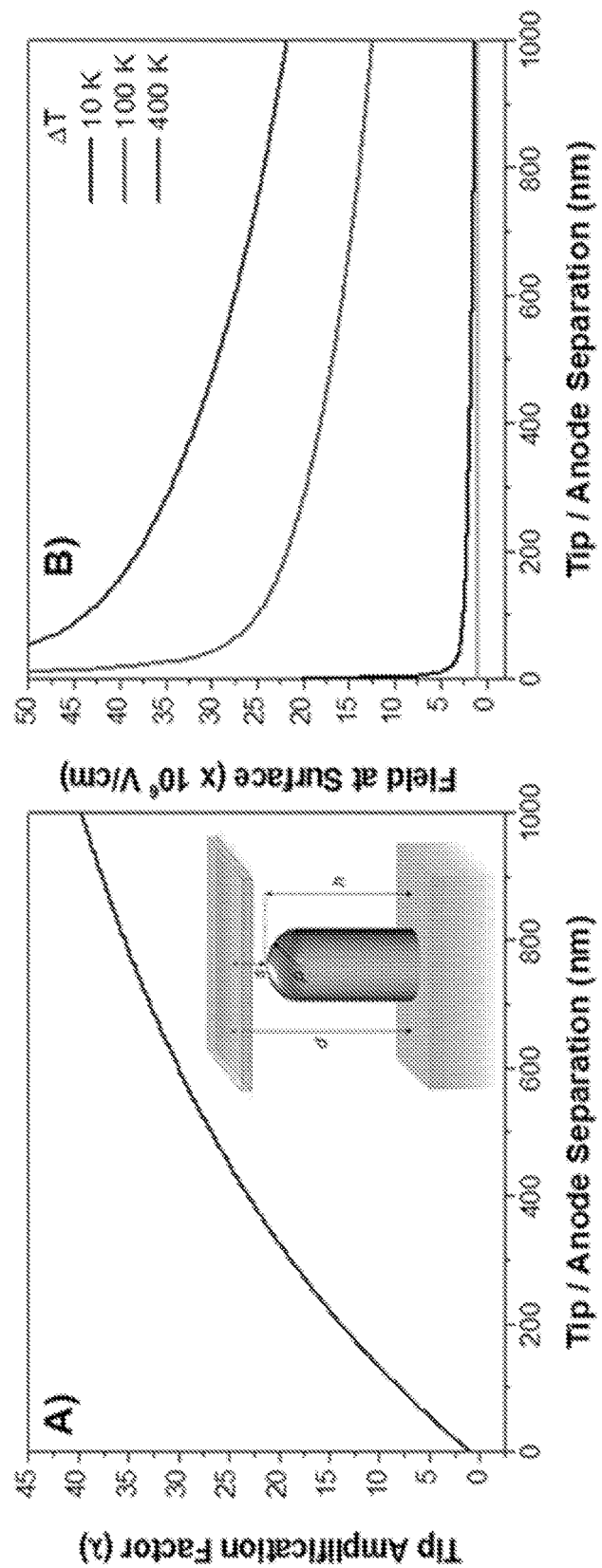
FIG. 9. A) Field amplification factor (λ) as a function of tip/anode separation for a tip with h=1 μm and ρ=10 nm. The inset shows a schematic drawing of the approximate tip geometry and the various terms of interest. B) Calculations of electric field at the surface of the pyroelectric/ferroelectric cathode material as a function of tip/anode separation for ΔT=10, 100, or 400K. The orange line marks the minimum field needed for emission.

Beginning with pyroelectric emission from materials, embodiments include materials with significantly enhanced pyroelectric coefficients over those studied previously. For example, using a pyroelectric material with a pyroelectric coefficient of 0.004 $C/m^2$ K, the field at the surface and the electron packet size for a range of temperature changes and device geometries can be estimated. Note that these calculations assume no externally applied field. Here the various advantages of device embodiments are discussed in a mathematical framework of computed performance. The field in the gap between a planar pyroelectric cathode and a planar metal anode is described by $$E = \frac{\Delta P}{\varepsilon_0}\frac{1}{1+\frac{d_{gap}}{d_{FE}}\varepsilon_R} \quad (2)$$

where the source of this electrostatic field is the change in the spontaneous polarization ($\Delta P$), $\varepsilon_0$ is the permittivity of free space, $d_{gap}$ is the gap between the pyroelectric cathode and the anode material, $d_{FE}$ is the thickness of the pyroelectric cathode material, and $E_R$ is the dielectric constant of the pyroelectric cathode material. Furthermore, device embodiments utilize field enhancement that arises from the use of appropriate tip geometries. Thus the total electric field equals $$E_{enhanced} = E\lambda \quad (3)$$

where $\lambda$ is the field amplification factor that falls into two regimes. The inset of FIG. 9A is a schematic illustration of the tip geometry and defines the various values needed to understand the amplification factor. For large spacings between the tip and the anode (d→∞) the amplification factor is defined as $$\lambda_\infty = 1.2\left(\frac{h}{\rho} + 2.5\right)^{0.9} \quad (4)$$

and for small spacings (d→0) the amplification factor is $$\lambda = \lambda_\infty \frac{s}{s+h} + 1 \quad (5)$$

These models accurately describe the decrease in effective field observed at very small spacings as the cathode tip/anode surface tend to the planar-planar geometry. The amplification factor for a tip embodiment of height 1 μm and tip radius of 10 nm is shown in FIG. 9A. Thus the models in equations 2-5 are useful, for example, for accurately predicting the magnitude of the field produced and to estimate the expected electron packet size.

Next, consider how the geometry of device embodiments impacts the performance of the electron emission device embodiments. Useful variables include, but are not limited to: 1) the magnitude of the temperature change, 2) the pyroelectric film thickness, 3) the spacing between the cathode and the anode, 4) the material properties of the pyroelectric material (i.e., pyroelectric coefficient, spontaneous polarization, dielectric constant, bulk conductivity), 5) the geometry and effective area of the tip emitter. One illustrative embodiment is a device based on $Pb(Zr_{0.2},Ti_{0.8})O_3$ which is controlled to have a pyroelectric coefficient of 0.004 $C/m^2$ K. One important consideration is that equations 2 and 3 assume no bulk conductivity through the material. This assumption is only valid when the time of heating (t) is much less than the so-called relaxation time of the material. The relaxation time can be defined as $$\tau = \frac{\varepsilon_R \varepsilon_0}{\sigma} \quad (6)$$

where, again, σ is the bulk conductivity and is equal to the inverse of the resistivity of the material. For $Pb(Zr_{0.2},Ti_{0.8})O_3$ films conductivities are typically measured on the order of $10^{-7}$-$10^{-9}$ S/m and dielectric constants between 300-500 in the thin films. This results in relaxation times for common materials embodiments between 25 and 450 ms. Thus for these thin film materials embodiments, the models above are appropriate.

Next, the fields produced from these materials embodiments are estimated assuming a change in temperature (ΔT) of 10, 100, or 400K. Here, ΔT is the temperature rise over room temperature. For an embodiment with a film thickness of 200 nm, a dielectric constant of 300, a tip height of 1 μm and tip radius of 10 nm, the field as a function of tip/anode separation (FIG. 9B) is calculated. Even with small temperature changes (i.e., 10K) and by exerting nanoscale-level control of the device geometry, fields (Eλ) are achieved that meet the requirements for emission. These models also provide insight into how to maximize the effects in certain materials embodiments. For example, the magnitude of the field will scale directly with the thickness, pyroelectric coefficient, and polarization of the pyroelectric material and inversely with the dielectric constant of the material.

Figure 10:
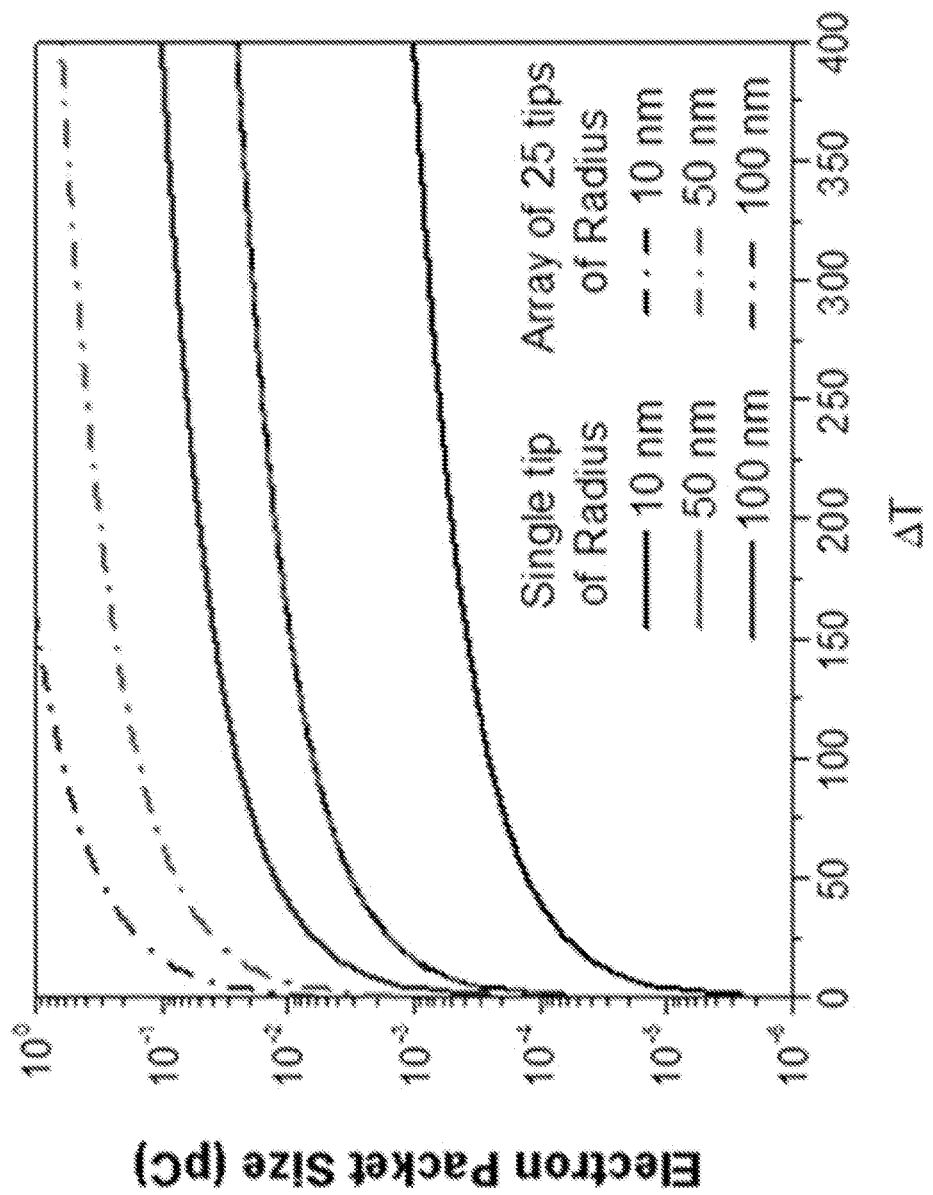
FIG. 10. Calculations of electron packet size emitted from the pyroelectric/ferroelectric cathode material as a function of temperature change and tip geometry.

Next, the packet size of the emitted electrons are estimated. Again, assuming only pyroelectric emission, the electron packet size for λT ranging from 1 to 400K as a function of the device geometry (i.e., the tip radius ρ) is computed. In embodiments, the variation in the tip radius allows for a controllable change in the relative area of material that gives rise to emission and, in turn, the electron packet size. Embodiments include both the emission from a single tip under these conditions and from an array of tips. Depending on the desired output parameters, the electron packet size is tuned by varying device embodiment geometry and the number of tips that can be created in square or close-packed arrays. For these calculations, an embodiment having an array of 25 tips in an array is contemplated. The results of these calculations are shown in FIG. 10. The device design provides adaptability for controllable output parameters, including fine-level control over the nature of the emitted electrons to work with a range of other component-level technologies (i.e., accelerators, decelerators). Device embodiments include those exhibiting electron packet sizes across a range of sizes, for example ranges less than 1 pC.

In embodiments, emission also occurs as a result of ferroelectric switching in certain materials. For example, a ΔP of about 1.4 $C/m^2$ is achieved by embodiments with surface electric fields between $4.36\times10^7$-$1.82\times10^8$ V/cm and individual tip and tip array electron packet sizes from $8.80\times10^{-4}$-2.20 pC, respectively. This further highlights the flexibility of device embodiments that can be tuned to future device specifications, to access a wide range of capabilities, and that can be operated in various modes of operation.

Electron Source Emittances Less than 0.05 mm-mrad.

Device embodiments include those having electron source emittance between 0.005-0.05 mm-mrad. Emittance refers to the tendency of a beam of particles to spread in cross section as the beam propagates and is given by the product of the beam size and its divergence. In a specific embodiment, the emittance due to the cathode itself cannot be undone with subsequent beam optics. It is thus useful to understand the cathode emittance for the embodiments of interest. Although there are a few treatments for thermal and photo-emitters in the literature, this field of modeling emittance from tip cathodes has remained relatively untouched. Here models are adapted for field emitters to the pyroelectric emitters described herein. The development of models for the emittance from curved emitters and arrays of curved emitters are further described.

Figure 11:
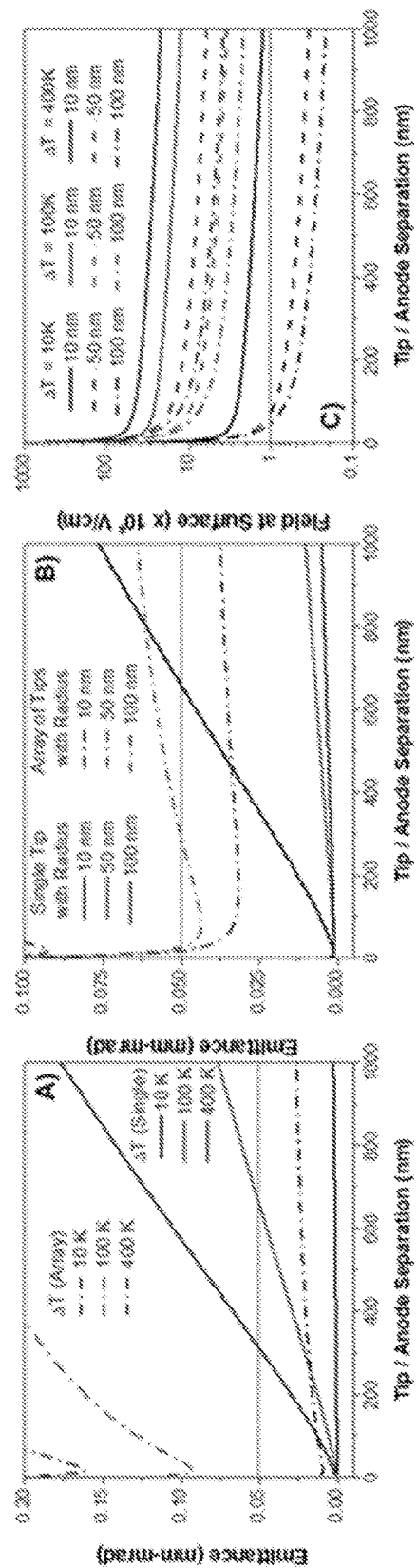
FIG. 11. A) Emittance for a single emitter tip (solid) and an array of 25 tips (dashed) as a function of tip/anode separation for various ΔT assuming a 10 nm tip radius. B) Emittance for a single emitter tip (solid) and an array of 25 tips (dashed) as a function of tip/anode separation for various ρ assuming ΔT=100K. C) Total enhanced field at surface of emitter as a function of tip/anode separation for various ΔT and ρ values. The orange lines demarcate the critical program requirements.

The emittance from a single emitter tip has been shown to be equal to $$\varepsilon_{rms} = \frac{\hbar}{\sqrt{2}\,mc} a_0 k_0 \left(\frac{\gamma_3}{C^2}\right) \quad (7)$$

where ℏ is Planck's constant divided by 2π, m is the mass of an electron, c is the speed of light, $a_0$ is the tip radius of curvature, $\gamma_3$ is a constant describing the momentum divergence of the electrons (for certain embodiments $\gamma_3$ is equal 25), $k_0$ is defined as $$k_0 = \frac{\sqrt{2mF_0 a_0}}{\hbar} \quad (8)$$

where $F_0$ is equal to the charge of an electron multiplied by the un-enhanced field at the surface of the emitter, and C is defined as $$C = \frac{\frac{4}{3\hbar}\sqrt{2m\Phi^3}}{2F_{tip}a(\eta^2 - 1)} \quad (9)$$

where $\Phi$ is the work function of the emitter (for embodiments, 4.5 eV), $F_{tip}$ is the fully enhanced field at the surface of the emitter, a is a factor describing the elliposoidal nature of the emitter tip (for embodiments, 1, or sphere-like), and $\eta$ the ratio of the evaluation plane to emitter height (here defined as the ratio of $[s+\rho]/\rho$). These models are further extended to treat an array of tips. The emittance of an array of tips is written as $$\varepsilon_{rms} = \gamma_1 \frac{\hbar}{mc} k_0 l \left[\frac{N(N+1)}{6C}\right]^{0.5} \quad (10)$$

where $\gamma_1$ is a constant describing the momentum divergence of the electrons (for embodiments $\gamma_1$ is 12), l is the array unit cell length (in embodiments between 1-3 μm), and N is the number of active emitters on one side of the array quadrant array (in embodiments, $[2N+1]^2=25$ total tips, N=2). In an embodiment with a tip radius of curvature of 10 nm, analysis of the devices as a function of various ΔT and tip/anode separation distance using these equations results in FIG. 11A. It is observed that for single tip embodiments there are large regimes where the device emittance falls below 0.05 mm-mrad. In general by increasing the ΔT, the field at the surface is increased, which causes the emittance to diverge faster. Increasing the footprint of the device (i.e., as is the case for embodiments with an array of tips) the emittance of the electron packet scales with the starting area. Likewise, the effect of varying the tip geometry (specifically the tip radius p) on the emittance is investigated (FIG. 11B). In embodiments, the general trend, for a specific ΔT (100K for FIG. 11B), is that the sharper the tip (i.e., the smaller the tip radius) the faster the increase in the emittance with increased tip/anode separation. Nonetheless, device embodiments provide a wide array of working conditions with emittances less than 0.05 mm-mrad. There is an important distinction between certain embodiments described in this example and the prior art in field emitters. Many state-of-the-art field emitters work to make the sharpest tips possible to further enhance the electric field needed for emission. This, in turn, places harsh limits on the minimum in emittance that can be achieved with these traditional technologies. In certain embodiments, the presence of the pyroelectric material greatly enhances the ability to create strong electric fields required for emission. This is shown in FIG. 11C where the total enhanced field at the surface of the emitter is plotted as a function of the tip/anode separation for a range of ΔT and ρ. It is clear that certain embodiments obtain the large fields required for emission in a number of geometries.

Pulse Repetition Rates Greater than 10 MHz.

Certain embodiments exhibit pulse repetition rates in excess of 10 MHz. In embodiments, the repetition rate is enhanced, for example using one or more of the following options: temperature fluctuations in the heated cantilevers, electric field oscillations using an external pulse/function generator, or through utilization of mechanical oscillations in the NEMS system.

In specific embodiments, pyroelectric emission results from temperature oscillations. The devices of certain embodiments include a resistive heater region (shown in red in FIG. 12) that dissipates >95% of the applied power and is capable of reaching temperatures as high as 1200° C. with heating/cooling times as fast as $10^{9°}$ C./sec. This translates into a maximum pulse repetition rate for certain embodiments of around 50 MHz for temperature changes <500° C. In embodiments, heated AFM tips have temperature controllable over the temperature range 25-1200° C. and can be operated at speeds of greater than 10 MHz.

In addition to the temperature oscillations, embodiments exhibit enhanced pulse repetition rates by application of electric fields via an external pulse/functional generator. In certain embodiments that rely on emission resulting from ferroelectric switching, the switching speed of the ferroelectric (for example, as fast as 1-100 ns or $10^7$-$10^9$ Hz) and the ability to apply external fields are limitations.

Figure 12:
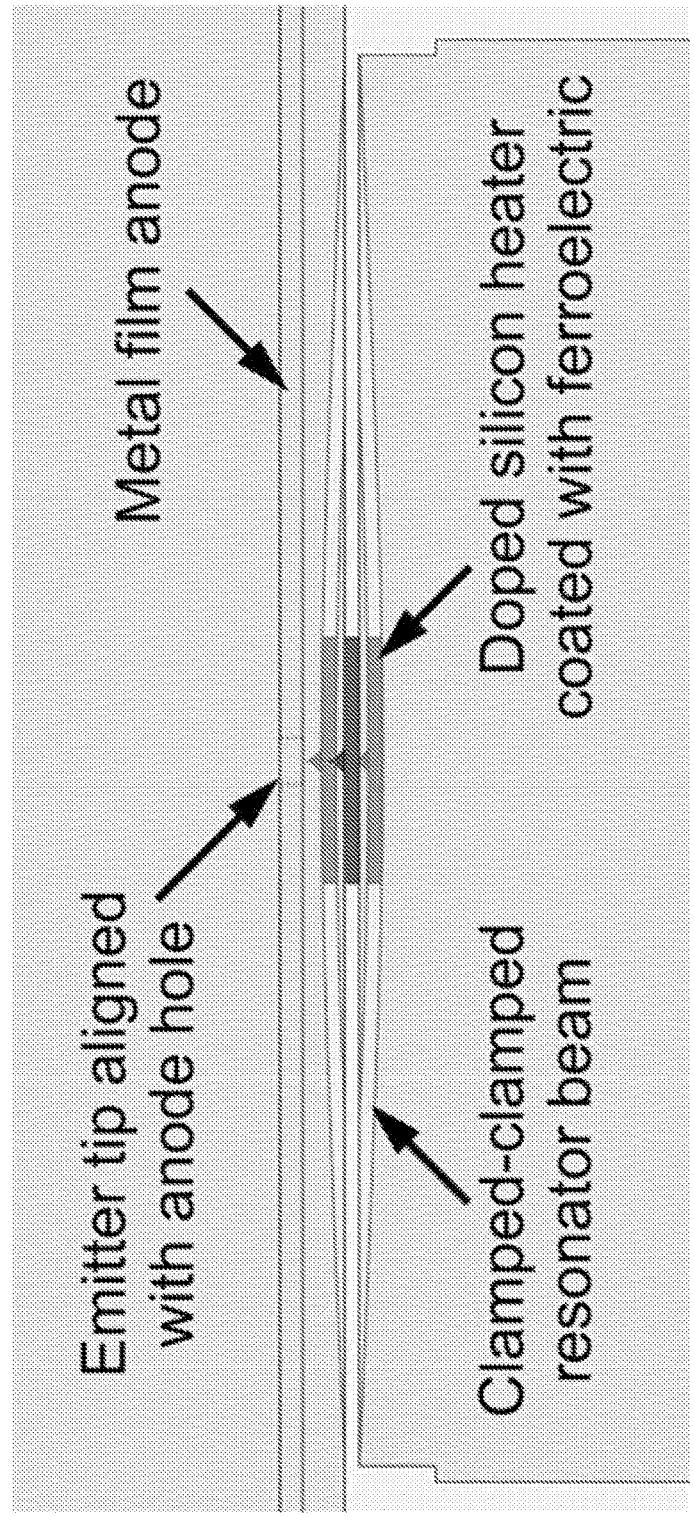
FIG. 12. Cross-sectional illustration of the oscillating cantilever structure and mechanical method for achieving controllable pulse repetition rate.

In embodiments, electric fields drive deflections of the resonator, for example, at a mechanical resonance frequency of 10-50 MHz. FIG. 12 shows a side view of an emitter device embodiment. The clamped-clamped resonator cantilever beam is located under a metal film anode with a small hole collinearly located above the sharp silicon tip. As the resonator beam is driven in mechanical resonance, the tip approaches the anode hole once per mechanical period. When the field strength is sufficiently high, the pyroelectric tip emits electrons that will pass through the metal film. In embodiments, the metal anode also provides means for electrostatic excitation of the cantilever beam. The fundamental resonant frequency of a clamped-clamped beam is $$\omega_n = \sqrt{\frac{EI}{\rho A L^4}}\,\alpha_n^2$$

where $\omega_1$ is the frequency in rad/sec, E is the material Young's modulus, ρ is the material density, A is the beam cross sectional area, L is the beam length, $\alpha_1$ is 4.73 for the first resonant mode, and I is the second moment of inertia of the beam. The second moment of inertia about the horizontal axis is $$I = \frac{wt^3}{12}$$

where w is the beam width and t is the beam thickness. A 1 μm thick×8 μm wide single-crystal silicon beam embodiment resonates at 10 MHz when the length of the beam is 30 μm, ignoring the added mass of the silicon tip and thin pyroelectric film. Certain embodiments achieve oscillation frequencies as high as 10 MHz. For certain embodiments, the mechanical oscillations bring the emitter tip to within a specific distance of the metal anode (thereby creating a critical field for emission), permitting control over the pulse repetition rate.

In embodiments, forces per unit length required to maintain clamped-clamped cantilever beams in resonance are on the order of 10 μN/m. The attractive electrostatic force between two charged parallel plates is given in equation 1 above. Again, a resonating beam embodiment 8 μm wide and 30 μm long will resonate at about 10 MHz. In certain embodiments, an electrostatic voltage of about 10 V achieves displacements greater than 1 mm. While the model calculations here are for a resonator that will operate in resonance at 10 MHz, small changes to the device geometry permit embodiments having mechanical resonance up to 50 MHz.

Electron Pulse Lengths Less than 1 ps.

In embodiments, the electron pulse length is determined by the amount of time during which the applied electric field exceeds the critical field strength for emission. For example, with a resonator mechanical period of 20-100 nsec, embodiments exhibit electron pulse lengths that are less than 0.001% of the total cycle time. Certain embodiments utilize a number of strategies to achieve this short pulse length.

In one embodiment, the resonator beam is driven electrostatically, with voltage pulses synchronized to the cantilever resonance. In an embodiment, the anode is used to drive the resonator. In another embodiment, a second electrode (placed either above or below the cantilever) is used to drive the resonator as the emitter tip approaches the cathode. FIGS. 6 and 12 show illustrative embodiments. In a specific embodiment, the mechanical motion of the resonator, the anode voltage, and the internal heating of the tip are selected such that the critical conditions for emission are satisfied for only 1 ps when the tip is closest to the cathode and the field has risen to above the critical level for emission (generally $10^6$-$10^8$V/cm). In an embodiment which aids this tuning of the critical conditions, the voltage on the anode and the cathode are pulsed in a manner that one turns off shortly after the other turns on. In this manner, their synchronization creates a high field strength for only a short period of time, which can be controlled through this synchronization. Optionally, embodiments include those having a resonator with mechanical and thermal time constants decreased by 10× or more. In certain embodiments, the faster electrical, mechanical, and thermal responses permit the pulse length to be a larger fraction of the overall device cycle.

Figure 13:
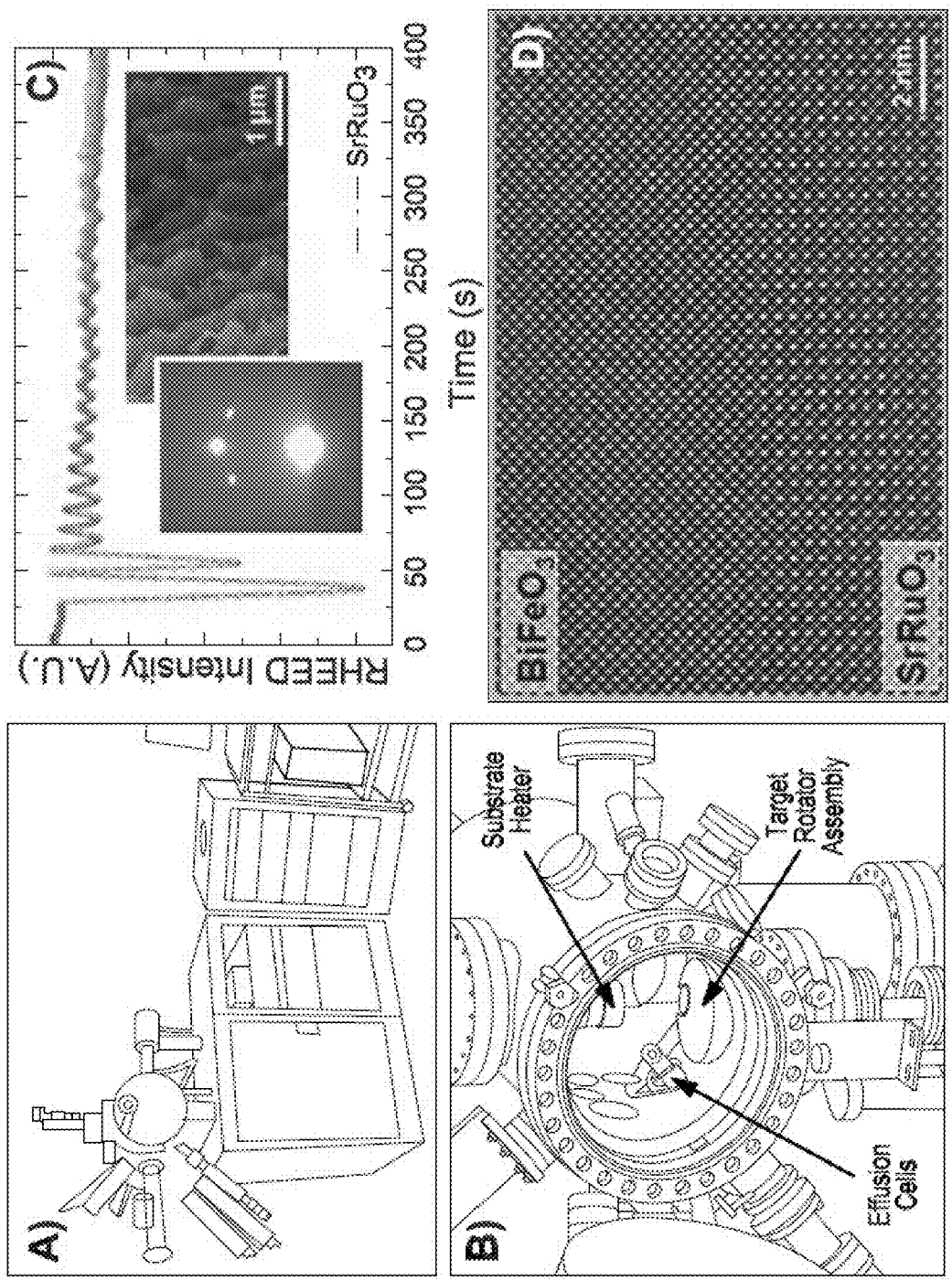
FIG. 13. A) Photo of the complex oxide hybrid MBE/Laser-MBE growth system. B) Internal geometry of the growth chamber. C) RHEED-assisted growth of $SrRuO_3$, inset is the RHEED pattern for this surface and surface morphology. D) Cross-sectional transmission electron microscopy image of high quality interface between $SrRuO_3$ and $BiFeO_3$.
Figure 14:
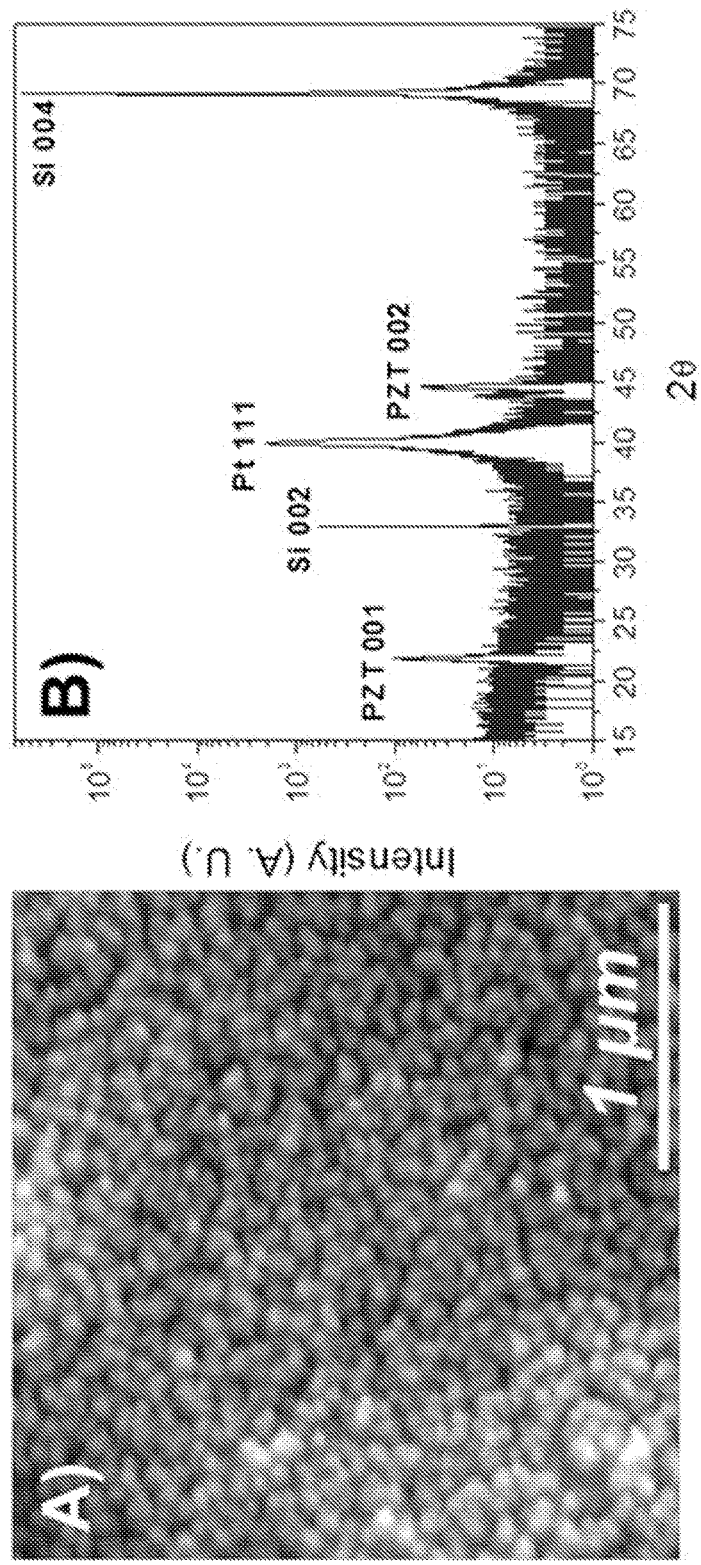
FIG. 14. A) Atomic force microscopy image of a PZT/Pt/Ti/$SiO_2$/Si(001) film structure. B) Corresponding x-ray diffraction data confirming the presence of a fully 001-oriented film of PZT.

Fabrication. Methods of making device embodiments are provided. In one embodiment, a pyroelectric oxide films is synthesized using a combination of both MBE and PLD growth techniques augmented by RHEED, which creates high quality, highly crystalline, precisely controlled oxide thin films and heterostructures. For example, materials can be synthesized using PLD, MBE, or through the simultaneous use of both MBE and PLD (FIGS. 13A and B). A distinctive feature of a certain embodiment of this system is the presence of load-locked effusion cells that is retracted from the chamber for high pressure growth and anneals, for example, permitting growth and post-annealing in both oxygen and ozone environments with accessible pressures ranging from $10^{-10}$ to 760 Torr. In one embodiment, film growth is tracked by monitoring the RHEED intensity oscillations as a function of time, for example, enabling one to maintain a nearly perfect surface throughout the entire structure. FIGS. 13C and D show an example of materials synthesis embodiments, including embodiments where the growth of the film is tracked by monitoring the RHEED intensity oscillations as a function of time and embodiments where the nearly perfect surface is maintained throughout the entire structure. Certain embodiments include extremely high quality materials (FIG. 13D), with nearly perfectly coherent interfaces that are free of defects, for example, useful for the study of multiferroic-based heterostructures and devices. In embodiments, the growth techniques result in the production of high quality materials and the control of oxide materials at the unit-cell level. Useful materials include $BaTiO_3$, $Ba_{1-x}Sr_xTiO_3$, $PbTiO_3$, $PbZr_xTi_{1-x}O_3$, and $BiFeO_3$. An example of a $PbZr_{0.2}Ti_{0.8}O_3$ film grown on the Si wafers for this program is shown (FIG. 14).

In an embodiment, a pyroelectric emission device is fabricated on a 100 mm silicon-on-insulator (SOI) wafer with a handle layer thickness of 500 µm, a silicon dioxide buried oxide (BOX) layer thickness of 1 µm, and a device layer thickness of 5±0.5 µm with resistivity 1-10 Ω·cm doped N-type with phosphorus. In embodiments, the dull cantilever tips are formed using an inductively-coupled plasma (ICP) deep reactive ion etch (DRIE) to etch 2 µm into the silicon device layer, then an oxidation sharpening technique sharpens the silicon tips to about 10 nm radius. In embodiments, an ICP-DRIE etch through the remaining silicon device layer to the oxide BOX layer defines the final clamped-clamped microcantilever beam shape. In embodiments, a photoresist mask is patterned and the low-doped N-type heater regions are doped using ion implantation of phosphorus. In embodiments, following the first ion implantation, the photoresist mask is removed and a diffusion barrier PECVD oxide is deposited, followed by annealing of the dopant in $N_2$ at 1000° C. for 30 minutes. In an embodiment, a wet etch removes the barrier oxide and subsequently the high-doped N+-type cantilever legs are doped through a photoresist mask using ion implantation of phosphorus. In an embodiment, after the second ion implantation, the photoresist mask is removed and a second diffusion barrier PECVD oxide is deposited, followed by a dopant anneal in $N_2$ at 1000° C. for 2 hours.

In an embodiment, the second PECVD oxide diffusion barrier is removed with a wet etch and then the $PbZr_xTi_{1-x}O_3$ is deposited using the PLD/MBE systems. In an embodiment, the microcantilever beam and pyroelectric coating is protected using a thin square of photoresist. In an embodiment, the thickness of the photoresist determines the distance between the cantilever tip and anode. In an embodiment, the electrical contacts and cap anode are fabricated by depositing a 1.5 µm thick uniform layer of aluminum using electron beam deposition followed by photolithography to protect the electrodes and definition of the anode hole, followed by wet etching to remove the excess aluminum. In an embodiment, the SOI handle layer is etched through to the sacrificial silicon dioxide layer with a backside ICP-DRIE etch. In an embodiment, the cantilevers are be released by removing the BOX layer in concentrated hydrofluoric acid for 40 seconds and dissolving the photoresist cap protecting the pyroelectric in acetone.

Characterization.

In embodiments, the electrical, mechanical, and thermal characteristics of all of the device components are characterized individually and collectively. In one embodiment, the pyroelectric response of a material is characterized using a range of measurements. In one embodiment, a direct measurement technique made by Byer and Roundy is utilized where the sample is heated a constant ramp rate and the current is measured directly. Application of this method to thin films and small device sizes is achieved in certain embodiments by incorporating close proximity current amplification into a custom probe station equipped with a high-temperature heating stage capable of temperature ramp rates of over 150° C./s. Another characterization embodiment utilizes a thermoelectric heater/cooler stage that oscillates temperatures at relatively high frequencies about the desired temperature of measurement. This method, for example allows lock-in to the pyroelectric current which is 90° out of phase with the temperature oscillations permits the separation and exclusion of lossy, non-pyroelectric currents. Another characterization embodiment employs microfabricated test patterns based on the geometry of the 3ω method for highly accurate measurements of pyroelectric coefficients. For example, in the standard 3ω measurement of thermal properties, a single narrow metal line serves as both the heater and thermometer in the experiment; temperature changes created by ac current heating of the line are monitored by voltage oscillations at the third harmonic of the drive current. In certain embodiments, the potential of an electrically floating test pattern is monitored at the 2ω frequency to probe the pyroelectric coefficient.

Optionally, the heating characteristics of the device are characterized using laser Raman spectroscopy, which measure temperature in doped silicon to a spatial resolution of 1 μm. The electrical resistance of the doped silicon is a strong function of temperature, and once calibrated the heater temperature is optionally controlled electronically. In embodiments, resistance thermometry is also used to characterize the device transient thermal characteristics. In embodiments, the mechanical deflections and dynamic responses of the resonator are characterized using laser Doppler vibrometry. In embodiments, these measurements are made while the resonator is driven electrostatically.

Optionally, the electron emission process is characterized through a number of method embodiments. Measurement of electron emission currents has traditionally been done using plane-to-plane geometries (i.e., planar pyroelectric to planar collector off-set by a given distance). In embodiments, these geometries are adapted to device structure embodiments, permitting the use of plane collectors such as electron channel multipliers and pulse counting systems, Faraday cups, and grid collectors. In embodiments, devices and arrays of devices are synthesized and entire wafers are placed in environmentally controlled chambers equipped with the above planar detectors for measurement. In certain embodiments, electron emission is probed under low pressure $10^{-5}$ Torr). Optionally, electron emission is probed at higher pressures, for example as high as 0.1 Torr. In certain embodiments, emitted electron charge is controlled through the use of an RC integrating circuit. In embodiments, the current in the sample circuit is monitored while completing simultaneous measurements of the polarization hysteresis loop and switching currents of the samples. In a specific embodiment, such measurements are accomplished by utilizing a Radiant Precision Multiferroic Tester. In embodiments, electron energies are measured by the retarding potential method or cylindrical mirror analyzer of an Auger spectrometer.

Example 3: Nanometer-Scale Pyro-Electro-Mechanical Electron Source

This example provides description of design and fabrication approaches for making nano-scale pyro-electro-mechanical electron sources.

Embodiments of the invention include coated single tips and arrays of tips with over 6.25 million tips using a platinum buffer layer to grow epitaxial lead zirconium titanate (PZT). The buffer layer is useful given the lattice mismatch between single crystal silicon and thin epitaxial PZT films. We have grown polycrystalline PZT films with a (111) preferential orientation. The invention also includes design approaches using alternate buffer layer chemistries to grow (001) oriented pyroelectrics, which are better suited in some applications to perpendicular electron emission.

The materials synthesis and fabrication work for development of the nano-scale pyro-electro-mechanical electron sources focuses on two areas: 1) Optimization of high-performance ferroelectric/pyroelectric materials for electron emission and 2) Integration of materials and device fabrication. This work includes growth and characterization of $PbZr_{1-x}Ti_xO_3$, $LiNbO_3$, and compositionally graded ferroelectrics. These materials possess strong pyroelectric properties and have been synthesized on a variety of substrates, including silicon wafers and nanoscale tip-arrays to be used in final devices.

High-Performance Ferroelectric/Pyroelectric Materials.

A goal for developing nano-scale pyro-electro-mechanical electron sources is to optimize the conditions for the growth of high-quality, high-performance, low-loss emitter materials. These include ferroelectric/pyroelectric materials with high crystallinity and controlled ferroic order and domain structures. In particular, much of the development has focused on the production of monodomain ferroelectric thin films that possess a single polarization direction perpendicular to the thin film surface.[1] Materials of interest include the $LiNbO_3$, materials possessing large spontaneous polarization (e.g., $PbZr_{0.2}Ti_{0.8}O_3$), and compositionally graded ferroelectrics capable of enhanced performance.

$LiNbO_3$ single crystals are reported to have a high figure of merit for electron emission and have been studied for electron emission.[2] Thus far, $LiNbO_3$ thin films have been successfully grown on 0001-sapphire and Pt/Ti/Si (001) wafers. The $LiNbO_3$ thin films show 0001-oriented growth on both substrates from detailed X-ray diffraction studies. Atomic force microscopy (AFM) and piezoresponse force microscopy (PFM) show smooth films (in some cases possessing ~1 nm root-mean-square (RMS) roughness) and monodomain ferroelectric domain structure.

The structural, dielectric, ferroelectric, and pyroelectric nature of model PZT20:80 films was synthesized and characterized. PZT20:80 films have been grown on traditional oxide substrates such as $SrTiO_3$ (001), planar Pt/Ti/Si (001), and custom nanofabricated Si tip arrays. Initial studies support the ability to enhance pyroelectric coefficients beyond levels observed previously. Also of interest for development of nano-scale pyro-electro-mechanical electron sources is the synthesis and control of ferroelectric materials such as $LiNbO_3$ and PZT20:80.

Compositionally graded ferroelectric films are also useful for nano-scale pyro-electro-mechanical electron sources given their large polarization offset and enhanced pyroelectric coefficient:[4,5] Recent theoretical studies on compositionally graded $(Ba,Sr)TiO_3$ propose that geometric frustration arising from the different magnitude of the z-components of the dipoles could give rise to useful properties—including enhanced pyroelectric effects.[6] We have synthesized compositionally graded $PbZr_xTi_{1-x}O_3$ heterostructures and investigated so-called up- and down-gradient samples corresponding to samples possessing an increasing or decrease Zr/Ti ratio moving from the bottom to the top of the film. We have focused on graded films that continuously vary in composition from PZT 20:80 to PZT80:20. Such films have been successfully grown on $SrTiO_3$ (001) and $GdScO_3$ (110) substrates. Optimization of growth temperature appears to be one of the most important factors in the production of compositionally graded films. PFM analysis has been used to probe the evolution of ferroelectric domain structures in these materials and we observe distinctive ferroelectric domain contrast on up-gradient PZT grown on $GdScO_3$ (110) compare that on $SrTiO_3$ (001). Analysis of Zr/Ti ion ratio across the gradient PZT film may be carried out using Time-of-Flight Secondary Ion Mass Spectrometry.

To date, pyroelectric induced electron emission studies has been carried out primarily on single crystals of $LiNbO_3$ and $LiTaO_3$.[1] It has been suggested that by reducing the size such single crystals, the emission process will be diminished and that emission may not be possible in thin films.[1] To aid our discussion, it is useful to review the figures of merit (FoM) for ferroelectric electron emission (FEE). First, there is FoM that examines the maximum field that can be produced by the material $$E_{max} = \frac{\pi \alpha}{\sigma} \frac{d_s}{d_g}$$

where $d_s$ is the emitter material thickness, $d_g$ is the vacuum gap width, $\pi$ is the pyroelectric coefficient, $\alpha$ is the temperature change rate, and $\sigma$ is the electrical conductivity of the material. It is often assumed that $$\frac{d_s}{d_g} = 10^2$$

for bulk samples, but for our nano-scale devices it is safe to assume that this will be closer to 1. For emission to current $E_{max} > 10^8$ V/m; therefore, $(\pi\alpha/\sigma) \geq 10^8$ V/m in our system. The second figure of merit focuses on the pyroelectric response of the material and is defined as the ratio $\pi/\in$ where $\in$ is the dielectric constant. The higher this value the stronger the FEE current density for a given temperature change.[2] Thus, to achieve FEE in ferroelectric thin films we need to have thin films with high pyroelectric coefficient, low conductivity, low dielectric constant, and be able to rapidly change the temperature of the system. The present materials and system are well-suited to address these concerns and challenges. Using our high-performance materials (with $\pi$~350 µC/m²K, $\in$~110, $\sigma$~$10^{-8}$ ($\Omega$-m)$^{-1}$) we end up with electronic relaxation times of ~10-100 ms and ramp rates $10^3$-$10^4$ K/s to achieve emission just from the material, which is within the useful ramp rate possibilities for the integrated heaters ($10^6$-$10^9$ K/s) of the present electron emission devices.

Considering the importance of $\pi$, $\in$ and $\sigma$ of the ferroelectric material, we have focused on tuning those parameters by fabricating bilayer and compositionally graded ferroelectrics of PbZr$_{1-x}$Ti$_x$O$_3$ (PZT). For tuning the performance of the PZT system, bilayer and compositionally graded heterostructures were fabricated using PbZr$_{0.2}$Ti$_{0.8}$O$_3$ (PZT20:80) and PbZr$_{0.8}$Ti$_{0.2}$O$_3$ (PZT80:20) starting materials. Compositionally graded PbZr$_x$Ti$_{1-x}$O$_3$ heterostructures were synthesized by continuously varying the composition from PZT20:80 to PZT80:20 and vice versa. The samples are termed as up- and down-graded samples corresponding to samples possessing an increasing or decrease Zr/Ti ratio moving from the bottom-to-the-top of the film. Time-of-flight secondary ion mass spectrometry analysis on the compositionally graded samples confirms the gradual change in Zr and Ti ion ratio across the thickness of the films. These compositionally up-graded heterostructure shows enhanced pyroelectric coefficient compare to that of other heterostructures and such films have been successfully grown on a range of substrates. Single layer films of PZT20:80 and PZT80:20 have been grown for comparison.

The present studies support the presence of certain composition gradients results in the formation of a built-in potential in the material that further enhances the pyroelectric coefficient. Furthermore, due to complexities associated with the resulting domain formation in these graded films,[3] certain contributions present in single-layer versions of these materials that give rise to large dielectric constants are not active. Thus, the resulting bilayer and graded films possess strong pyroelectric response, low dielectric constant, and diminished electrical losses. With an increase in pyroelectric coefficient and decrease in dielectric constant, this heterostructure has figure of merit between 3.1-3.5 which is higher than that of the well-studied LiNbO$_3$ crystal.

In addition to the various materials, compositions, and derivatives thereof reported in Table I, we have also investigated and utilized additional geometries and approaches to the synthesis of dielectric, piezoelectric, pyroelectric, ferroelectric thin films (herein referred to as the emitter material) that aid in the development of high performance materials (this includes, but is not limited to dielectric constants, piezoelectric coefficients, pyroelectric coefficients, saturation polarization, material resistivity, and others). There is a desirable combination of some or all of these factors that can be further engineered by controlling the synthesis of the emitter material. In particular, we utilize multilayer approaches by which we combine two or more emitter materials into a single structure to control these properties. Manifestations of this concept include layered structures, phase separated nanostructures in a matrix, superlattices (small, repeating building blocks, i.e., material A, material B, material A, material B, and so on in any combination and ranging from a single unit cell to may micron thick layers), and more. Beyond composite structures, we also utilize routes to generate compositional gradients (smoothly or abruptly varying chemical composition as a function of position through the emitter material layer thickness). Such compositional gradients are another process by which to control the various material properties of the emitting thin films of certain aspects of the invention. Additionally, embodiments of the devices and methods of the invention utilize buffer layers (metals, metal oxides, dielectrics, etc.), growth rates, thin-film strain (via lattice, thermal expansion, etc. mismatch with the substrate), and other techniques to control the nature of the polarity of the emitter material. By controlling the domain structure of the emitter material we can affect control over the nature of emission from this system. We have demonstrated routes to limit domain variants, selectively/deterministically chose one polarity over others, and beyond. Importantly, these routes can in certain embodiments provide for achieving properties that are more or different from the implied sum of properties from the constituent materials and provide for routes to achieving enhanced and more efficient emission.

Process Strategies for Controlling Growth and Film Orientation

Devices and methods of certain embodiments utilize a number of routes to achieve control polycrystalline, textured, and epitaxial growth of emitter materials on the substrates of interest. In particular, devices of certain embodiments employ (but are not limited to) growth of emitter materials at low and high temperatures directly on etched Si and native oxide layers from the vapor phase. This includes the demonstration of both polycrystalline, textured, and epitaxial growth of emitter materials directly on Si wafers. Devices of certain embodiments also use of a number buffer layers to promote controlled growth and various orientations and crystallinity. This includes, but is not limited to the growth of crystalline metallic layers—in particular thin Ti adhesion layers with Pt buffer layers grown directly on the native oxide coated Si wafer. Subsequent growth of the emitter materials results in textured or epitaxial films depending on the nature of the Pt metal layer. In some embodiments, elemental metals can also be substituted by oxide metal layers (e.g., SrRuO$_3$, IrO$_2$, etc.). Finally, we have investigated the use of oxide buffer layers, including demonstration of the use of Y-stabilized $ZrO_2$ (YSZ) buffer layers to promote epitaxial growth of the emitter materials. In particular, the YSZ is grown at low pressures and at high temperatures that enables a reaction between the substrate and YSZ layer, formation of a buffering silicide phase, and the formation of a suitable buffer layer to promote controlled growth of the emitter materials.

Process Strategies for Controlling Surface Roughness to Enhance Emission Properties of the Emitting Thin Film.

In addition to controlling the morphology of the electron emitting thin film via nanofabrication processes, the growth process can be used to induce various surface morphologies. Devices and methods of certain embodiments readily achieve root-mean-square surface roughness ranging from <0.5 nm to the thickness of the film, can vary the average crystallite size, and can create nanoscale roughness. By varying the growth temperature, the growth pressure, and growth rate, and more we are afforded the opportunity to control these various aspects. In some embodiments, such nanoscale topography is used to locally enhance the fields required for emission.

Materials Integration and Device Fabrication.

The invention provides robust growth procedures for various ferroelectric layers on silicon wafers. It has been noted in prior studies that the structural quality and preferred crystallographic orientation of the PZT20:80 films depend strongly on the nature of the Pt layer (i.e., orientation, crystalline quality, etc.). We have achieved both singly-oriented [(001) and (111)] and textured PZT20:80 films on various Pt/Ti/Si (001) substrates with strong, switchable ferroelectric polarization as imaged via PFM. Strong ferroelectric properties have also been observed in films uniformly coating the nanofabricated emission tips. We have created planar and tip-array PZT20:80/Pt/Ti/Si (001) for testing of electron emission from these materials. Buffer layers of $SrTiO_3$ and $Y:ZrO_2$ may be useful for growing ferroelectric films having different orientations, such as the (001) orientation.[9] The invention also provides novel nano-electromechanical system (NEMS) devices with oxide layers.

Device Development.

A prototype device for testing micrometer scale emission via devices and methods of the invention was designed, fabricated and tested. The prototype device includes single tips and arrays of tips on doped-silicon heaters for thermal actuation of electron emission. Although the invention includes systems incorporating active resonator for mechanical actuation, embodiments of the present example were not designed to actively resonate. A purpose of these devices is to allow technical evaluation of pyroelectric film formulas in the emission vacuum chamber on a surface chemistry identical to that of a fully-integrated device having an active resonator. We have fabricated 126 prototype devices on 6 silicon-on-insulator wafers using a 6 mask fabrication process. Yield is ~90% as a direct result of the resolution limitations of the research-grade mask aligner. The cantilever beams have been released from the underlying substrate and are capable of rapid iterative testing of the pyroelectric films. The smallest heater tested, with only one tip emitter, reaches a steady-state temperature of 340° C. using only 7.6 mW of power. Considering that the heater is capable of operation in a pulsed mode at lower temperatures, this result demonstrates the ability to meet 10 mW the power requirements for some applications. The measured temperature profile along the length of the fixed-fixed beam indicates an exponential drop in temperature from the centrally located tip and heater.

Materials Synthesis and Characterization.

Devices of certain embodiments of the invention incorporate high-performance ferroelectric/pyroelectric materials for electron emission. As an example, $PbZr_{1-x}Ti_xO_3$ provides a high performance material that is also highly-integratable in the present devices. In this system we observe large pyroelectric coefficients in compositionally graded thin films that also can be controlled to possess low dielectric constants and losses through domain engineering. Such materials possess figures of merit from 3.1-3.5 (compared to 2.7 for $LiNbO_3$ and 3.9 for $LiTaO_3$). $LiNbO_3$ may also be integrated on silicon wafers, for example, using buffer layers (including Y-stabilized $ZrO_2$) to enhance film growth quality on silicon wafers and, thus may yield high-performance ferroelectric/pyroelectric materials having better and more reliable properties.

Pressure Considerations for Electron Emission

In order for an electron to be emitted from a surface and detected by an anode some distance from the emitter, the electron must travel through the emitter-anode gap unimpeded and with minimal energy loss. The mean free path (MFP) of an electron in a gas is the average distance between collisions of the electron with gas molecules, and is inversely proportional to the gas pressure. If the MFP is much smaller than the emitter-anode distance, a non-accelerated electron will collide with many gas molecules, changing directions and losing energy, before reaching the anode. The MFP of an electron in air at 1 atm (760 Torr) is about 100 nm, but the MFP is 7.6 millimeters at $10^{-2}$ Torr and 7.6 meters at $10^{-5}$ Torr. Therefore, practical electron emitters typically operate at lower pressures (e.g., less than atmospheric pressure) in order for the electrons to travel some reasonable distance and reach the anode or acceleration mechanics. We have experimentally measured pyroelectric electron emission at pressures between $10^{-7}$-50 Torr. Through microfabrication, the emitter-anode gap can be drastically reduced, facilitating emitter operation in relatively poor vacuum using inexpensive and compact vacuum mechanics.

Fabrication Routes for Tip Arrays on Integrated Heaters

Fabricating nanometer-sharp tips on integrated heaters is useful for concentrating thermal gradients or electric fields so as to enhance electron emission characteristics. Sharp tips on integrated heaters are used in the fields of scanning thermal microscopy, nanothermal analysis, data storage, and pyroelectric electron emission.

One method for incorporating tips on integrated heaters is to individually glue tips onto a heater platform using micromanipulators. This method permits the combination of materials that are incompatible or troublesome to integrate with traditional microfabrication techniques. An example of this approach is gluing a single-crystal diamond tip on a polymer cantilever.

Alternatively, using microfabrication techniques, single tips or arrays of tips can be fabricated on integrated heaters with high-throughput using two general methods. With a subtractive method, excess tip material is removed to form sharp tips. Conversely, an additive method assembles the tips in their final form with no further sharpening required.

The invention includes devices wherein tips are fabricated on integrated heaters using the subtractive method. In some embodiments, for example, the tips may be fabricated from a homogenous substrate that will also form the integrated heater, or the heater may be fabricated separately while the tip material is deposited as a conformal layer. A single tip or array of tips is formed using a combination of anisotropic and isotropic etching of the tip material. Photoresist masks shield some of the tip material during wet or dry etching processes to form the final shape. As an example, a disk-shaped photoresist cap is used on single-crystal silicon to shield the tip from vertical, anisotropic etching. The resulting cylinder is further sharpened with an isotropic wet etch to form the final sharpened tip. If the tip material is monocrystalline, anisotropic etching can be used to preferentially etch certain crystal planes with high selectivity. For single-crystal silicon, these subtractive fabrication methods form nano-meter sharp tips with high throughput and precision.

It is also possible to assemble the tips on integrated heaters without the removal of material or sharpening processes. Tip material can be deposited or pressed into an inverse, sacrificial mold of the final tip shape. After the molding process, the tip-mold substrate may be bonded to an integrated heater substrate, or the tip-mold substrate may be further processed to form the integrated heater below the tip or array of tips. The sacrificial mold is separated from the tip structures mechanically or by dissolving the mold. This additive fabrication method is useful for making tips out of material which are not easily isotropically or anisotropically etched, but tips fabricated this way tend to be duller than tips which are sharpened with etching. Also, the fabrication methods for substrate bonding and mold removal are complex and highly dependent on the materials used. Alternatively, arrays of tips can be additively grown on integrated heaters using self-assembly. Polycrystalline materials grown on an integrated heater will form sharp asperities that can function as tips. The asperity geometry is determined by the crystal lattice parameters. Wires with nanometer or micrometer diameters, for example, can be grown directly on integrated heaters using electrochemical deposition, vapor deposition, or vapor-liquid-solid growth. These wires can be very sharp and grown with high density.

Figure 15:
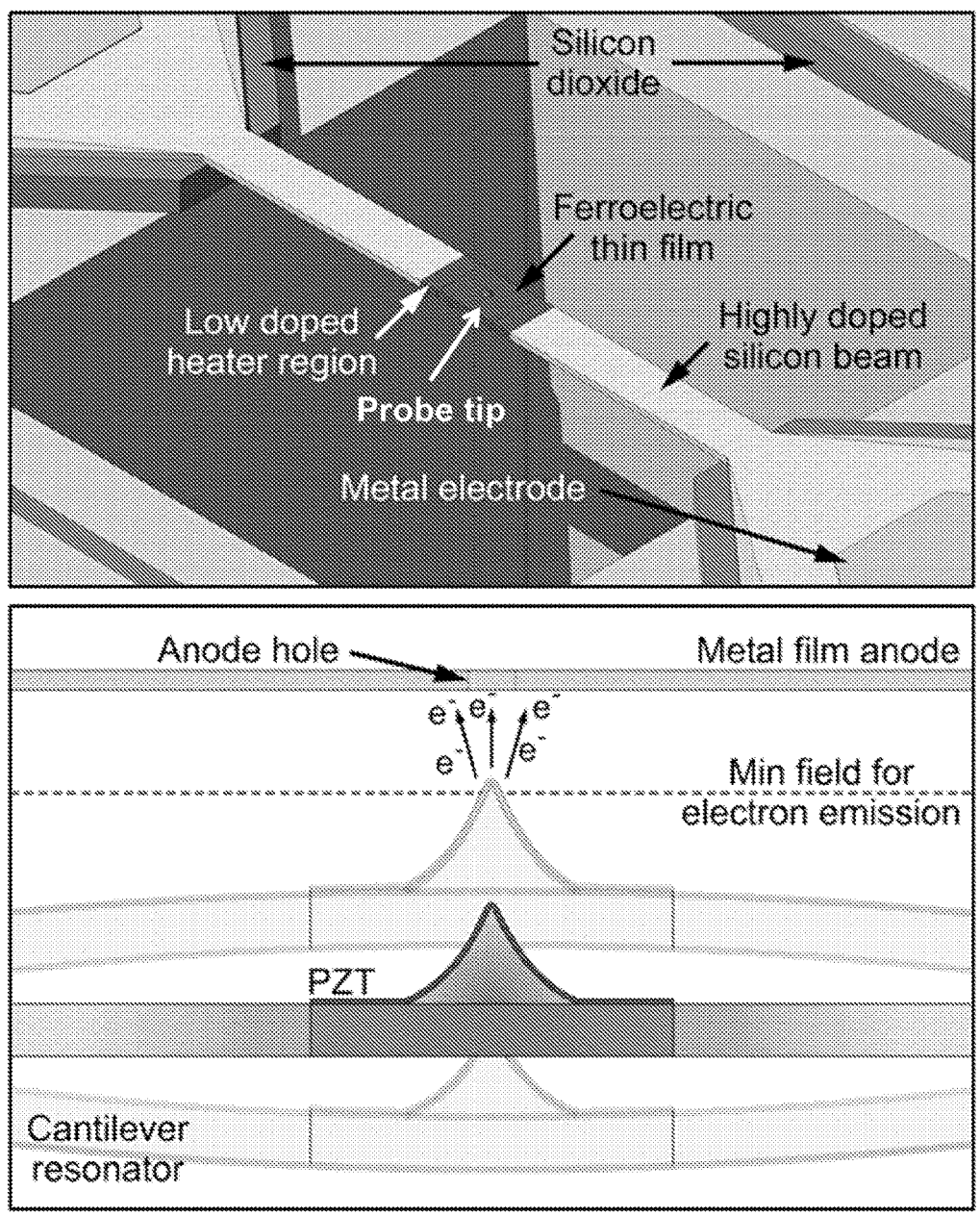
FIG. 15. Schematic diagram of a nano-scale electron emitter with a pyroelectric film. The electron emitter is situated on a clamped-clamped cantilever beam, wherein a pyroelectric thin film coats a thermally-active tip positioned between ends of the cantilever.

FIG. 15 provides a schematic diagram of a nano-scale electron emitter using pyroelectric film. As shown in this figure the electron emitter comprising a cantilever having a clamped-clamped cantilever configuration, wherein a pyroelectric thin film (i.e., the "emitting thin film"), is positioned at a cantilever bridge provided between a fixed first end and fixed second end of said cantilever. As shown in the top panel of FIG. 15 providing a top view, the pyroelectric thin film is provide on a probe tip and in thermal contact with an integrated heater thermometer providing thermal actuation. The heater thermometer comprises low doped heater regions and metal electrode components. The bottom panel of FIG. 15 provides a side view showing emission of electrons from the pyroelectric thin film supported by the probe tip. The bottom panel of FIG. 15 also shows the cantilever resonating so as to provide mechanical actuation of the pyroelectric thin film, wherein the movement of the cantilever is indicated. The electron emitter also comprises a metal film anode having an anode hole for electrically biasing the pyroelectric thin film, for example, by establishing a selected electrical field on the pyroelectric thin film. In this embodiment, emission is generated and/or modulated via electric, thermal, or stress field. In an embodiment, for example, emission frequency and size regulated by mechanical resonator. Nano-scale electron emitters of this embodiment are capable of generating electron emission with the following characteristics: Electron packet size <1 pC; Pulse length <1 ps; Beam emittance <0.05 mm-mrad and Pulse repetition rate >10 MHz. Nano-scale electron emitters of this embodiment provide the following device metrics: Device size <100 $\mu m^2$; Power consumption <10 mW; Operating voltage <10 V; Pyroelectric coefficient <0.5 $C/m^2K$ and Temperature transients >$10^9$ K/s.

Figure 16:
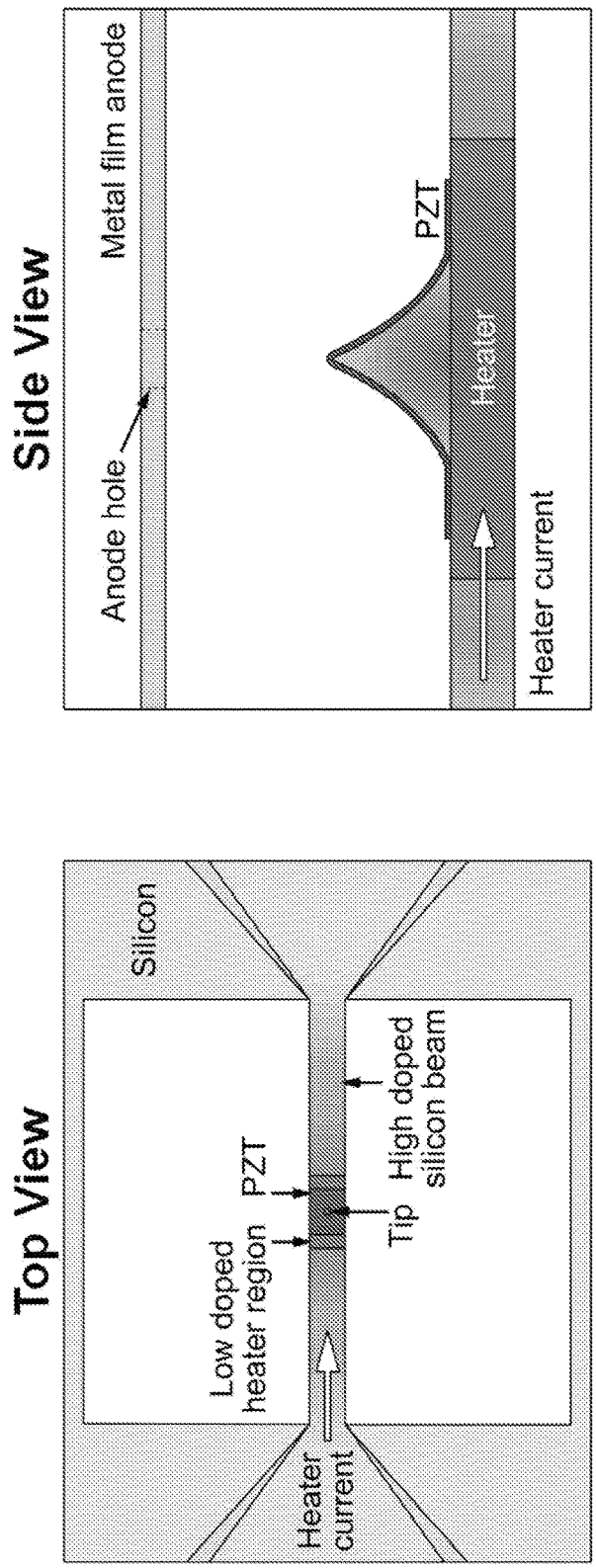
FIG. 16. Top and side view schematics of a nano-scale electron emitter showing the heater current path for providing thermal actuation. Device metrics for this embodiment include: device size <100 μm²; power consumption <10 mW; operating voltage <10 V; pyroelectric coefficient >5 mC/cm²K.
Figure 17:
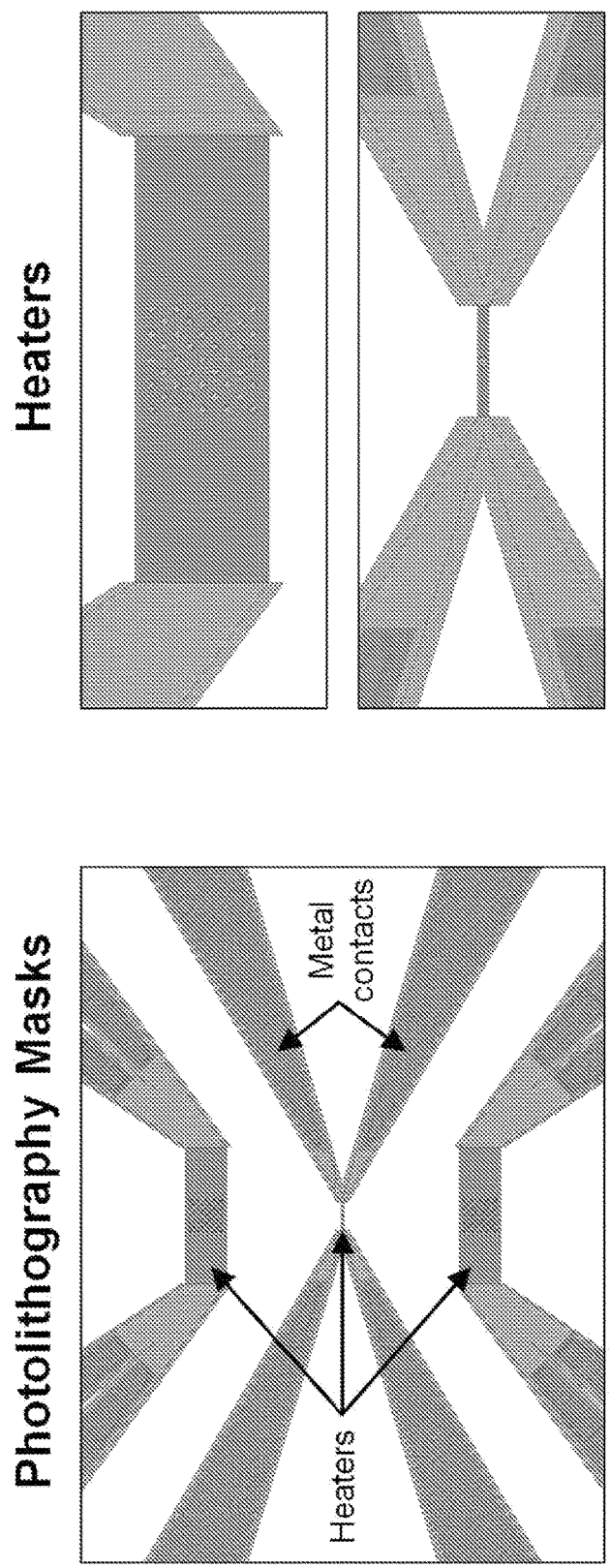
FIG. 17. Top view schematics of a nano-scale electron emitter showing an example of several integrated heaters with either a single emission tip or an array of emitter tips. The integrated heaters are electrically addressed with metal traces for thermal actuation.

FIG. 16 provides top and side view schematics of a nano-scale electron emitter of the invention showing the heater current for providing thermal actuation. Device metrics for this embodiment include: Device size <100 $\mu m^2$; Power consumption <10 mW; Operating voltage <10 V; Pyroelectric coefficient >5 $mC/cm^2K$. The cantilever beam legs are highly-doped to carry current with low resistance. The heater region is low-doped to heat through Joule heating. The high aspect ratio cathode tip designed to emit electrons including both field or pyroelectric emission FIG. 17 shows photolithography masks of a nano-scale electron emitter of the invention showing an example integrated heater with metal contacts for providing thermal actuation. In an embodiment, a central heater is provided having dimensions of 3 $\mu m \times 6$ $\mu m$, and also having a probe tip. In addition, two larger displaced heaters are provided having dimensions of 45 $\mu m \times 90$ $\mu m$, also having an array of 41 probe tips. The heater regions have 1 k$\Omega$ resistance. Heater resistance can be monitored with 4-point probe electrodes. Heater areas can be released from the underlying substrate to improve thermal performance. Thermal time constants are on the order of 1 $\mu s$ from thermal FEA modeling.

Figure 18:
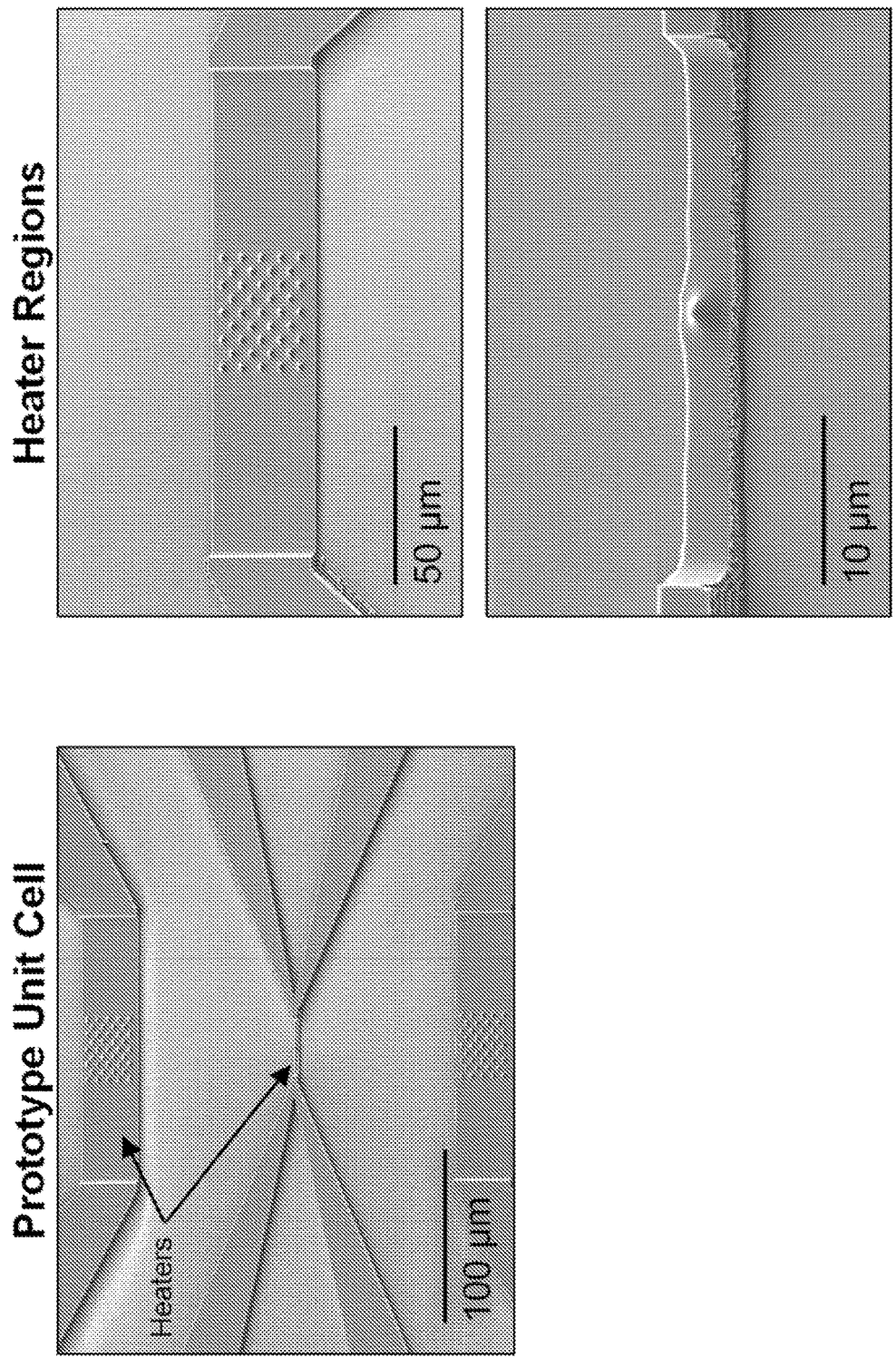
FIG. 18. Scanning electron micrographs of the nano-scale electron emitter shown in FIG. 17. The integrated heaters are made of single-crystal silicon suspended above the substrate. The emission tips are coated with pyroelectric thin film.

FIG. 18 shows top view scanning electron micrographs of a nano-scale electron emitter of the invention showing embodiments having an integrated heater having a probe tip or an array of probe tips for supporting the pyroelectric thin film. The embodiments shown include a central heater having one probe tip and two larger displaced heaters having 41 probe tips. The heater regions have 1 k$\Omega$ resistance. The heater beams are 1 $\mu m$ thick and are released from substrate.

FIG. 19 provides a table summarizing the physical properties of a number of pyroelectric materials. Integration of high-performance materials with advanced-NEMS accesses fast heating enables new functionality for operation. The figure of merit (FoM) is defined as ($\pi/\in_r$). Under this criteria, materials such as $LiNbO_3$, $LiTaO_3$, and PZT show performance characteristic of what is required in this system. The invention also includes material strategies to further enhance properties and performance of integrated materials.

Figure 20:
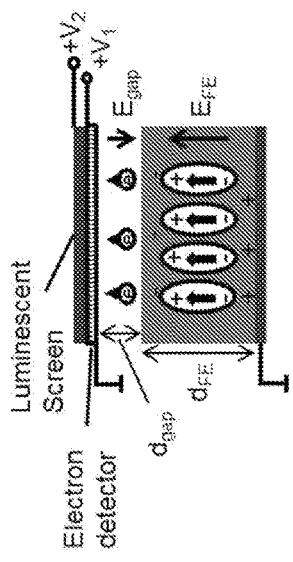
FIG. 20. provides a schematic of ferroelectric electron emission providing a mathematical equation for figure of merit (left) and a schematic illustration of different multi-layered structures and compositionally graded thin films that could potentially be used in the device (right).
Figure 20:
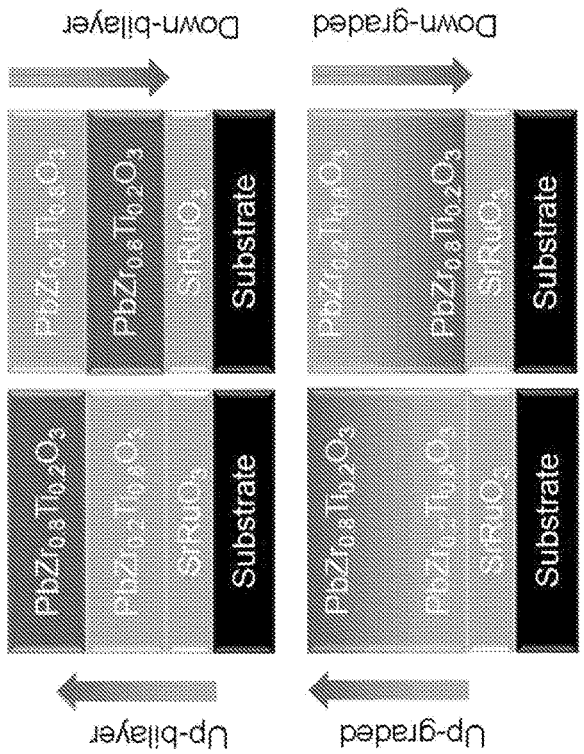

FIG. 20 provides a schematic of ferroelectric electron emission providing a mathematical equation for figure of merit—here both an electronic and pyroelectric figure of merit are included. These define some of the physical properties that are important to control and to enhance the performance of the system. FIG. 20 also provides schematics of multilayer thin film structures. Ferroelectric materials useful for some embodiments provide a high pyroelectric coefficient, low dielectric constant & loss and low electrical conductivity.

Figure 21:
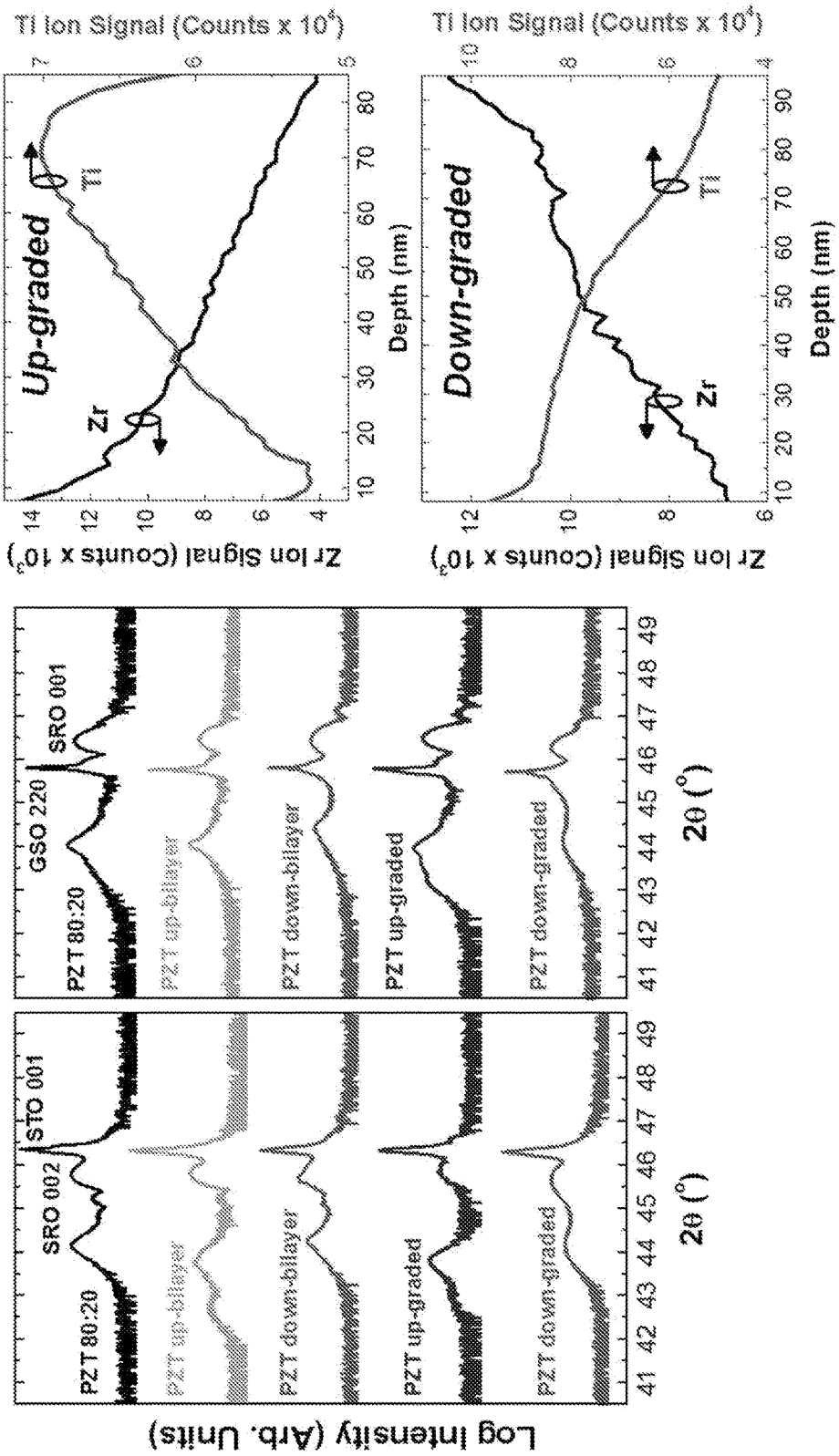
FIG. 21. provides plots from x-ray diffraction of Log intensity versus 2θ(°) showing the ability to synthesize various emitter material thin films (left) and plots of intensity from time-of-flight secondary ion mass spectroscopy analysis of Zr ion signal (black) and Ti ion signal (red) versus depth showing the ability to create compositional gradients.

FIG. 21 provides plots from x-ray diffraction of Log intensity versus 2θ(°) showing the ability to synthesize various emitter material thin films (left) and plots of intensity from time-of-flight secondary ion mass spectroscopy analysis of Zr ion signal (black) and Ti ion signal (red) versus depth showing the ability to create compositional gradients. This figure provides a concrete example of materials synthesis of advanced, high-performance emitter materials and our ability to deterministically control composition in these materials through the film thickness.

Figure 22:
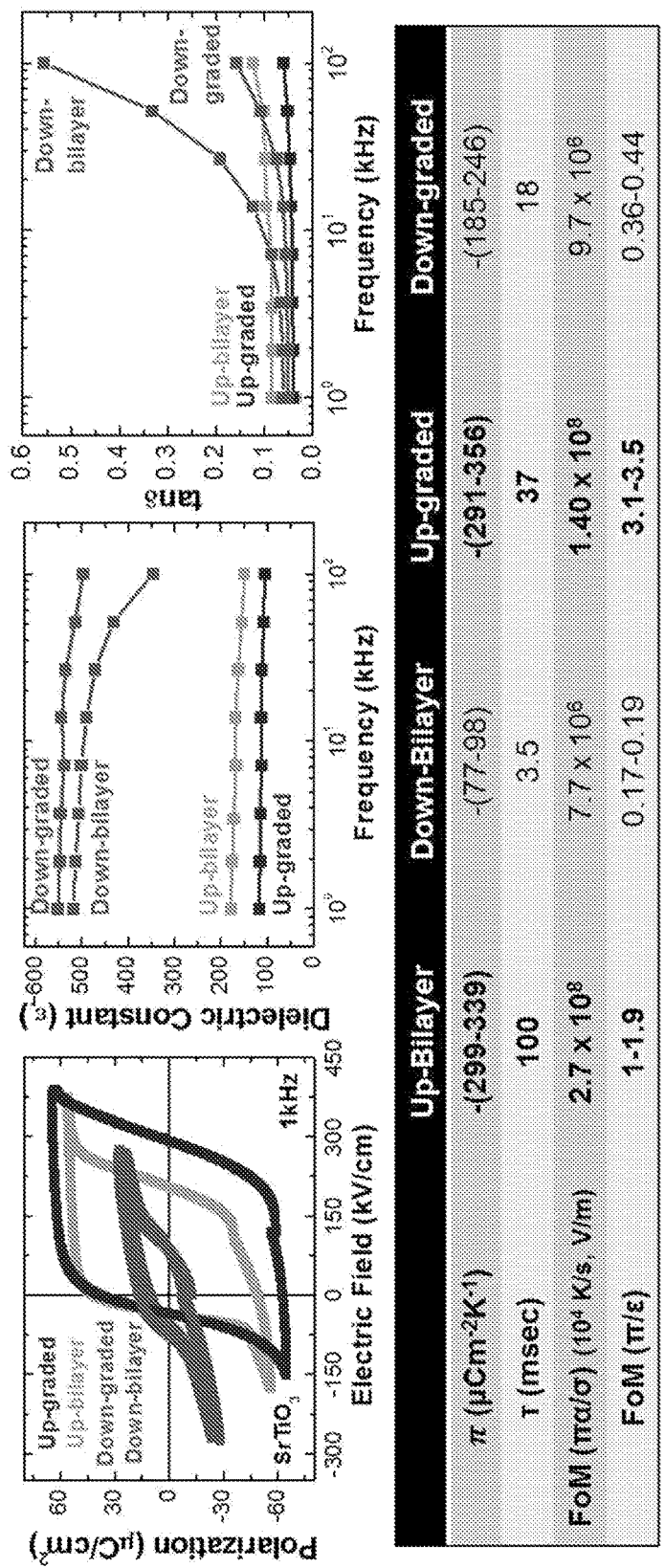
FIG. 22. provides plots of polarization versus electric field; dielectric constant versus frequency and tan δ versus frequency for the samples in FIG. 21.

FIG. 22 provides plots of polarization versus electric field; dielectric constant versus frequency and tan δ versus frequency. The high performance materials of aspects of the invention provide improved pyroelectric effect and diminished dielectric response. For example, the figure of Merit is >3 at 300K (competition for LiNbO₃/LiTaO₃). This figure provides demonstration of ability to synthesize modern ferroelectric thin film materials with performance on par with prior art.

Figure 23:
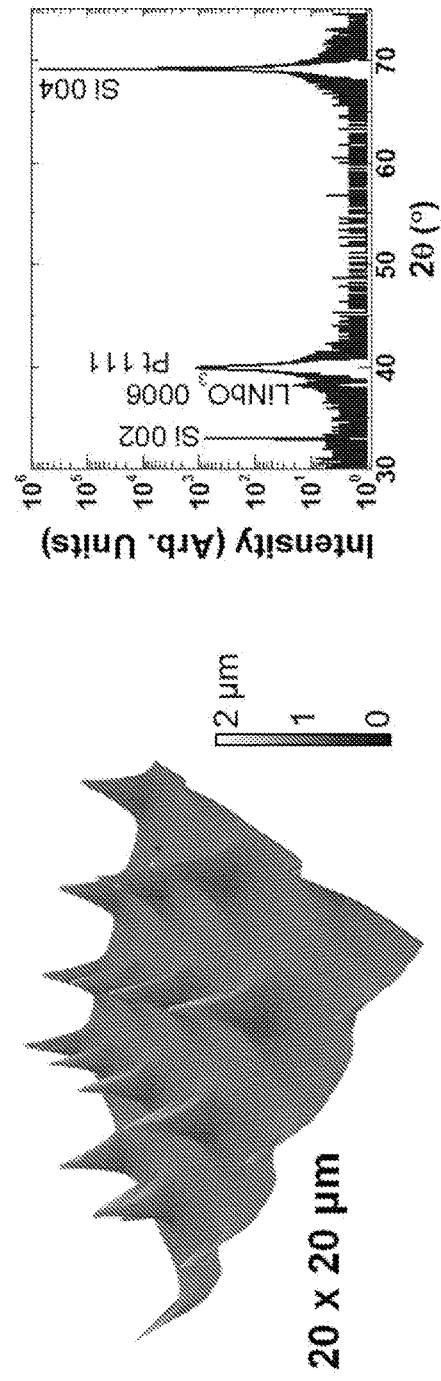
FIG. 23. provides an atomic force microscopy image of a substrate having an array of emitter tips supporting a $LiNbO_3$ thin film for devices and methods of the invention and a plot of x-ray diffraction intensity versus 2θ(°) confirming growth of $LiNbO_3$ emitter material on a Si wafer.

FIG. 23 provides an atomic force microscopy image of a substrate having an array of emitter tips supporting a LiNbO$_3$ thin film for devices and methods of the invention and a plot of x-ray diffraction intensity versus 2θ(°) confirming growth of LiNbO$_3$ emitter material on a Si wafer. FIG. 23 also provides a table providing a summary of layers useful in emitting thin films of the invention including the use of new buffer layers supporting thin films having enhanced physical properties and a summary of how these materials grow on Si wafers.

Figure 24:
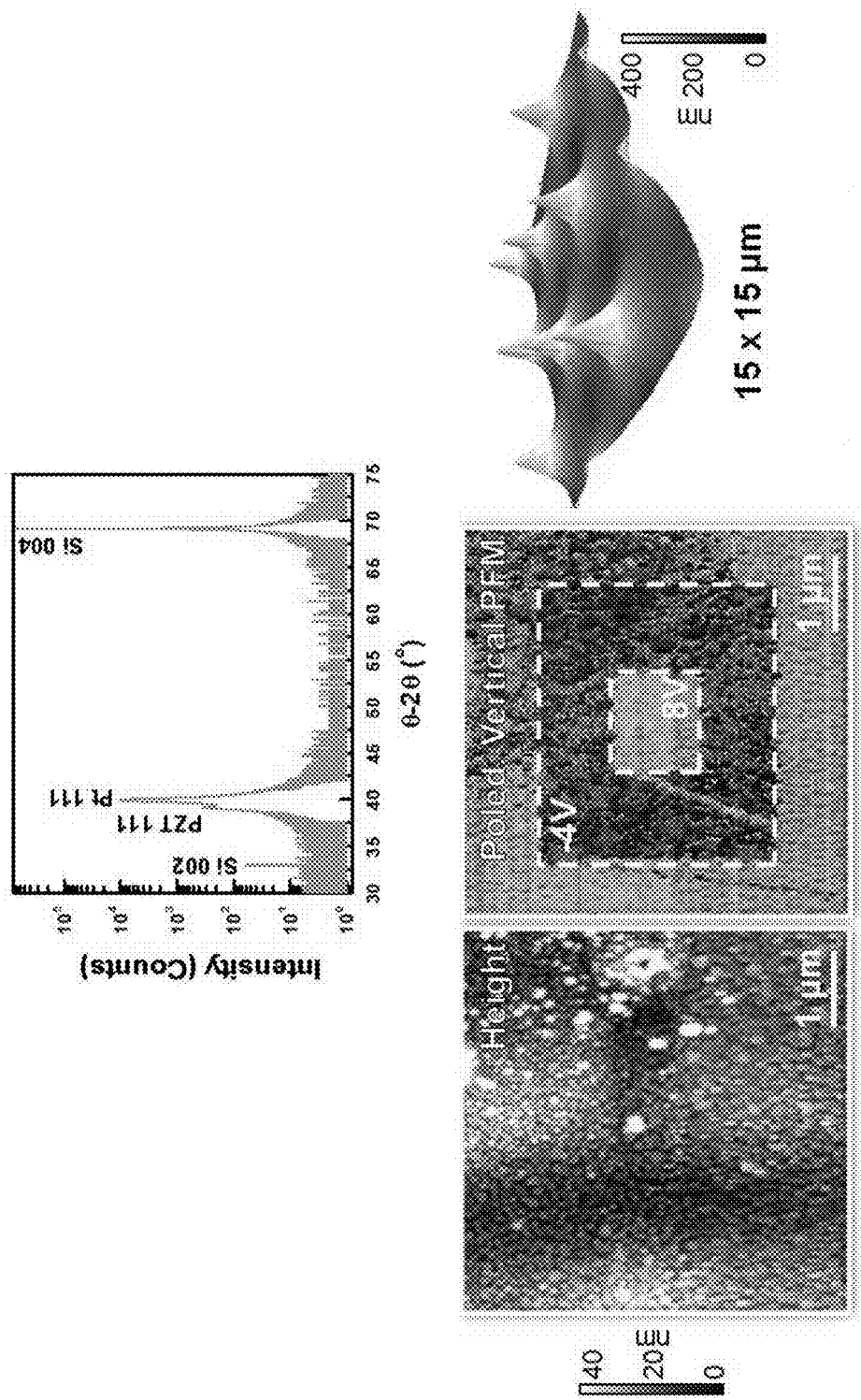
FIG. 24. provides atomic force microscopy images of thin films and substrates having arrays of probe tips useful in devices and methods of the invention. Also provided in FIG. 24 is a x-ray diffraction intensity versus 2θ(°) plot confirming growth of PZT emitter material on a Si wafer and piezoresponse force microscopy images revealing the ferroelectric nature and switchability of these films.

FIG. 24 provides atomic force microscopy images of thin films and substrates having arrays of probe tips useful in devices and methods of the invention. Also provided in FIG. 24 is a x-ray diffraction intensity versus 2θ(°) plot confirming growth of PZT emitter material on a Si wafer and piezoresponse force microscopy images revealing the ferroelectric nature and switchability of these films. The emitting thin films examined include (111) oriented PZT growth on Si-wafers/tips exhibiting strong and switchable ferroelectric polarization and field induced Z+ and Z- polar faces. The images of FIG. 24 demonstrate PZT integration with custom nanofabricated tip.

The invention includes, but is not limited to, devices and methods providing integration of high quality emitting films without a buffer layer. In an embodiment high-quality films of LiNbO$_3$ are produced on sapphire at 650° C. Alternatively, LiNbO$_3$ films are grown at various temperatures on etched Si, 6 nm SiO$_2$, and 230 nm SiO$_2$ yielding LiNbO$_3$ films. Growth at room temperature and RTA process yields similar results. The invention includes, but is not limited to, devices and methods providing integration of high quality emitting films without a buffer layer. In an embodiment high-quality films PbZr$_{0.2}$Ti$_{0.8}$O$_3$ are produced on various substrates at 630° C. Growth of PbZr$_{0.2}$Ti$_{0.8}$O$_3$ films at various temperatures on etched Si, 6 nm SiO$_2$, and 230 nm SiO$_2$ yielded polycrystalline films of PZT. Growth at room temperature and RTA process yields similar results. These results support that PZT films provide a robust route to direct integration. The polycrystalline and textured PZT films have been produced and epitaxial films provide more optimized performance.

Figure 25:
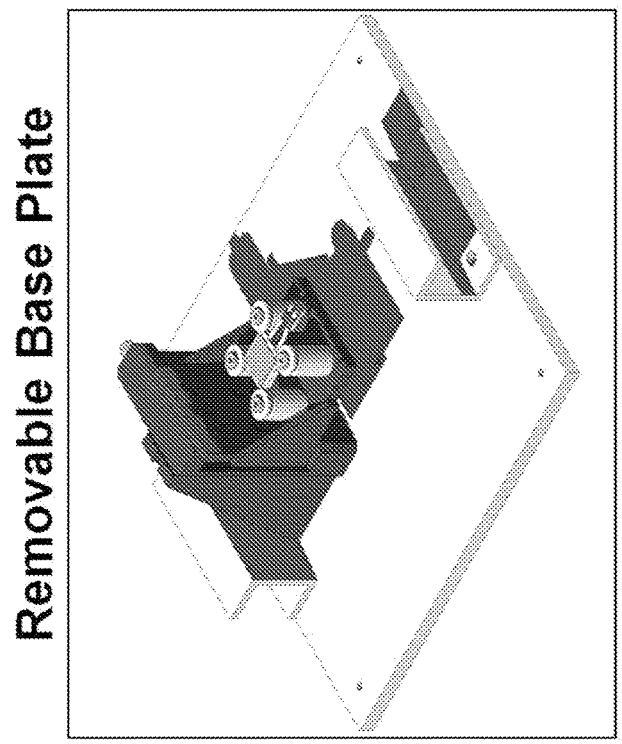
FIG. 25. Schematics of a vacuum test chamber and removable base plate system useful for technical testing of integrated heater electron emission devices and methods of the invention. The vacuum chamber maintains pressures between $100-10^{-7}$ Torr.
Figure 25:
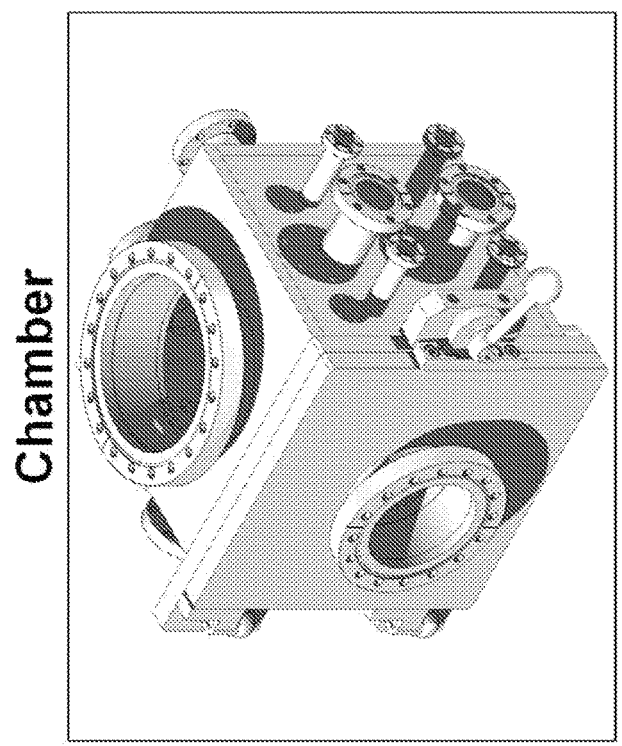

FIG. 25 shows a vacuum chamber and removable base plate system useful for technical testing of certain devices and methods of the invention. Chamber specifications useful for characterizing electron emission via the present devices and methods include, but are not limited to: pressure between 10⁻⁷-10 Torr, chamber interior 10"×10"×10", anode-to-emitter separation 0-7 inches, 11 electrical access ports, and a method to introduce alternate environmental gases. A removable sample mounting stage useful for characterizing electron emission via the present devices and methods includes, but is not limited to: a Z-axis translation stage with resolution 7 nm; a faraday cup emission detector with energy analyzing grids, and a variable gain, low noise DC or AC current amplifier with input noise ≥4.3 fA/√Hz.

Figure 26:
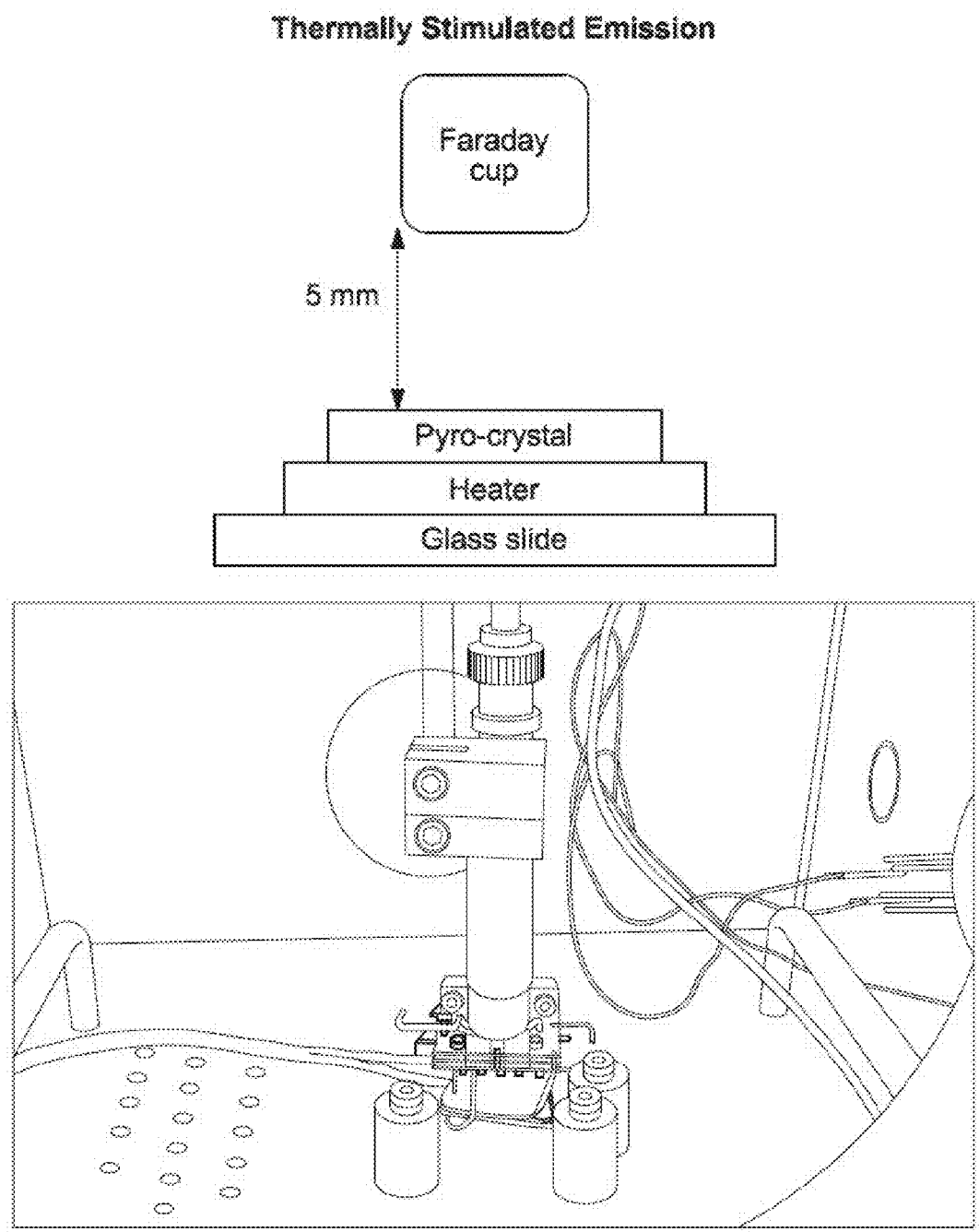
FIG. 26. Schematic and photograph image of an experimental setup for characterizing electron emission from pyroelectric thin films. The heater thermally stimulates the ejection of electrons from the pyroelectric crystal, through a vacuum, into the Faraday cup.

FIG. 26 provides a schematic and photograph image of an experimental setup for evaluating electron emission from emitting thin films. The samples tested include: (1) a LiNbO$_3$ optical grating <z-cut>, unpoled; (2) a small single crystal BaTiO$_3$, poled and (3) PZT-coated tip array, <1-1-1> orientation, unpoled. The results show detectable emission for LiNbO$_3$ sample and no emission for BaTiO$_3$ or PZT-coated tips. Conditions employed for the experiments include: a heating rate of 10-100° C./min, a pressure of 10⁻⁶ to 10⁻⁵ Torr.

Figure 27:
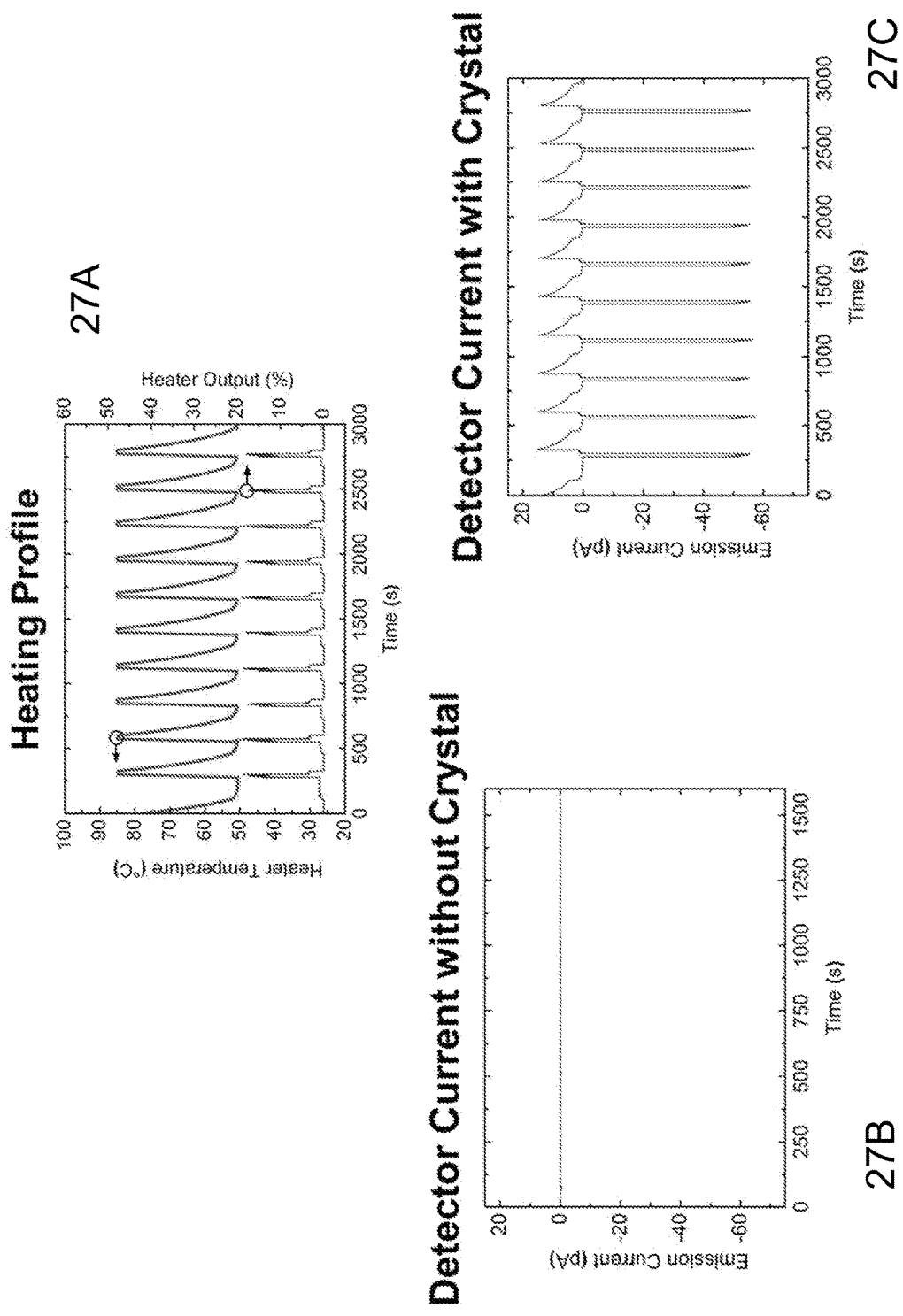
FIG. 27. (A) Graph showing the temperature of a pyroelectric crystal being heated over time, with the corresponding emission current without no crystal shown in (B) and with a crystal shown in (C). There is no detectable electron emission without the pyroelectric crystal. The electron emission for this crystal polarization orientation occurs during heating, with an equivalent surface recharge during cooling.

FIG. 27 shows the temperature of a LiNbO$_3$ pyroelectric crystal being heated over time, with the corresponding emission current without no crystal shown in (27B) and with a crystal shown in (27C). The sample tested was a LiNbO$_3$ optical grating single crystal, <Z-cut>, having random spontaneous polarization (unpoled). There is no detectable electron emission without the pyroelectric crystal. The electron emission for this crystal polarization orientation occurs during heating, with an equivalent surface recharge during cooling. Conditions employed for the experiments include: chamber pressure ~10⁻⁵ Torr and heating rate ~120° C./min. There is no detectable change in the emission characteristics with time. The surface recharges with electrons during the temperature cycle opposite to the emission temperature cycle.

Figure 28:
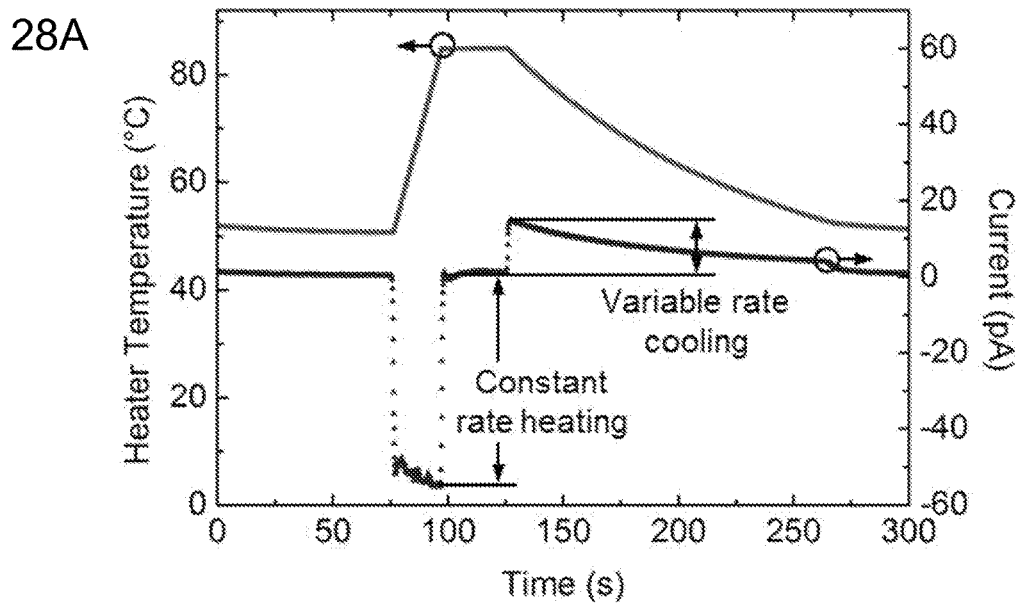
FIG. 28. (A) Example emission profile of a pyroelectric crystal being heated and cooled. This crystal has a polarization orientation which emits electrons—negative current—during heating and recharges the surface during cooling. The emitted current is a function of the change in temperature with time. (B) The magnitude of the emission current is proportional to the inverse of the separation between the emitter and anode. The emitted current decreases exponentially as the emitter-anode gap increases.
Figure 28:
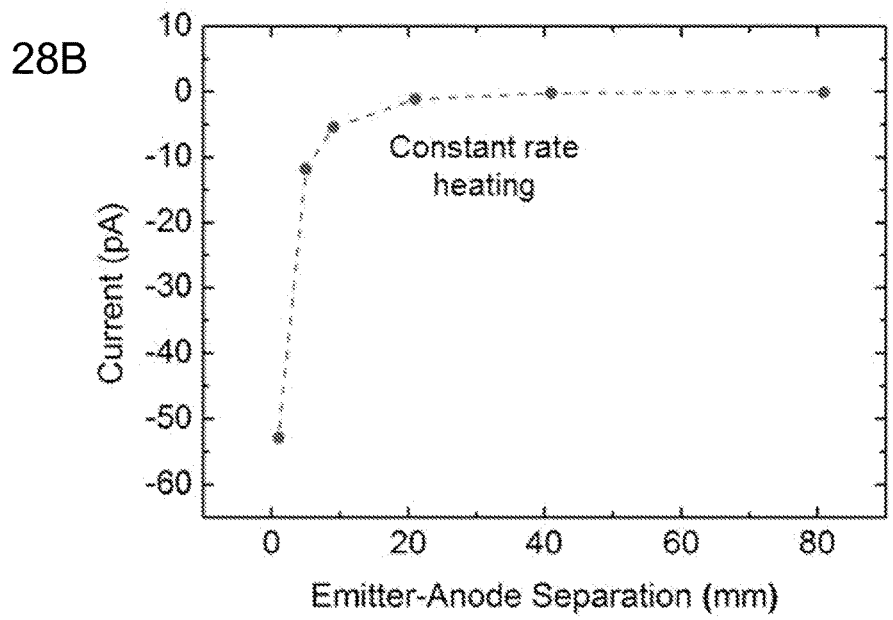

FIG. 28 shows an example emission profile of a pyroelectric crystal being heated and cooled. This crystal has a polarization orientation which emits electrons—corresponding to negative current—during heating and recharges the surface during cooling. The emitted current is a function of the change in temperature with time. (B) The magnitude of the emission current is proportional to the inverse of the separation between the emitter and anode. The emitted current decreases exponentially as the emitter-anode gap increases.

Figure 29:
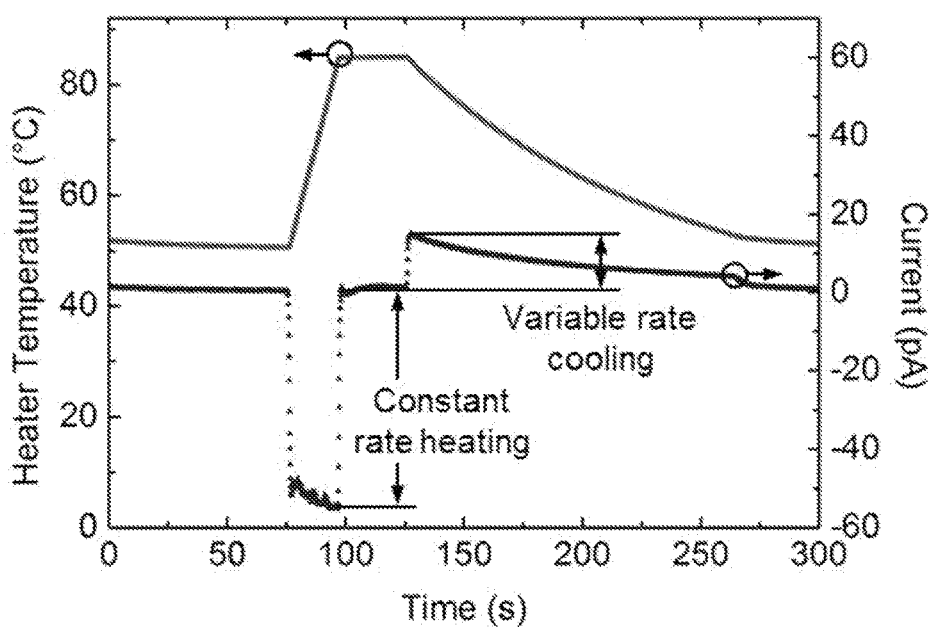
FIG. 29. (A) Example emission profile of a pyroelectric crystal being heated and cooled. This crystal has a polarization orientation which emits electrons—negative current—during heating and recharges the surface during cooling. (B) The magnitude of the emission current is proportional to the heating rate of the pyroelectric crystal. The emitted current increases linearly as the heating rate increases.
Figure 29:
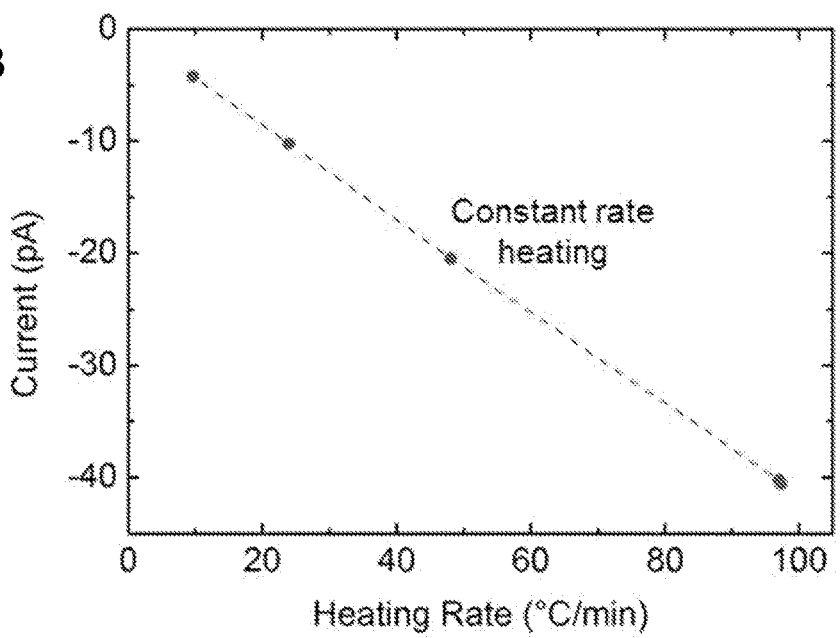

FIG. 29 shows the emission profile for varying heating rate of the same pyroelectric crystal in FIG. 28. This crystal has a polarization orientation which emits electrons—negative current—during heating and recharges the surface during cooling. (B) The magnitude of the emission current is proportional to the heating rate of the pyroelectric crystal. The emitted current increases linearly as the heating rate increases. Emission is linearly related to heating rate for rates 0-100° C./min.

Figure 30:
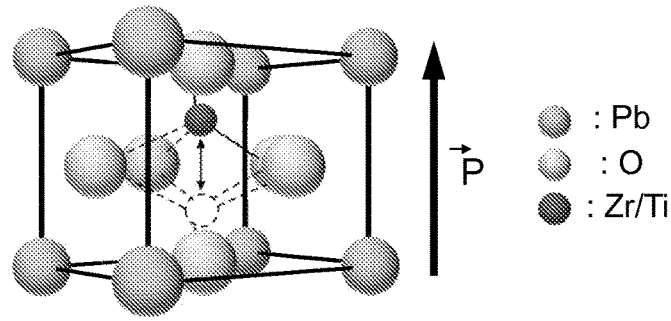
FIG. 30. provides (30A) a schematic of a ferroelectric crystal and (30B) a schematic device for providing electron emission.
Figure 30:
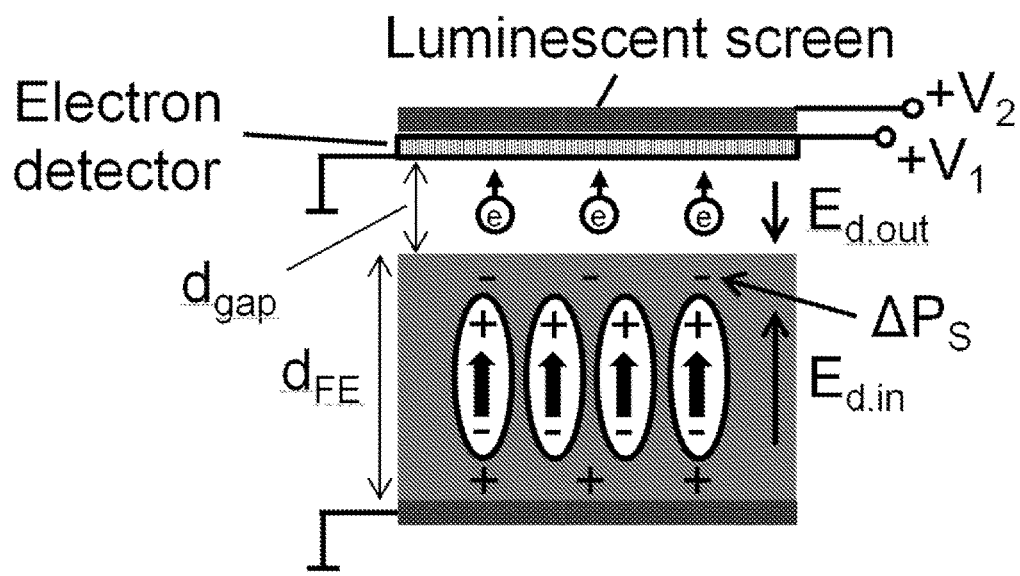

FIG. 30 provides (30A) a schematic of a ferroelectric crystal and (30B) a schematic device for providing electron emission. For Pyroelectric materials, a change in temperature (T) induces a change in polarization. The pyroelectric coefficient is defined as $$\pi = \left(\frac{dP_S}{dT}\right)_E.$$

All Terroeiectrics are pyroelectric. Ferroelectric materials are a subgroup of materials with strong spontaneous polarization (P$_s$), known T-dependence. For these systems, a deviation of spontaneous polarization causes emission. Under some conditions the field strength is 10°-10° V/cm. Electron emission is enhanced by sharp tip. Emission can occur as a result of ferroelectric switching, heating, or application of stress. All embodiments suggested here could potentially be used to control or enhanced emission in these devices.

Figure 31:
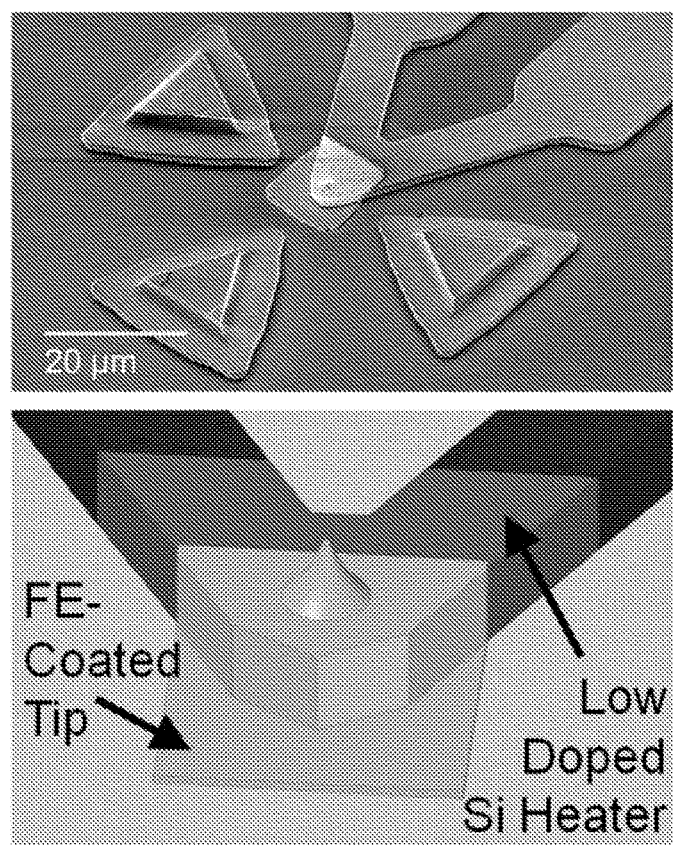
FIG. 31. Ferroelectric nanoprobe with integrated electron emitter fabricated from doped silicon. A doped silicon heater region is located near the tip, which heats the ferroelectric coating the thermally conductive tip.

FIG. 31 shows a pyroelectric nanoprobe with integrated electron emitter fabricated from doped silicon. A doped silicon heater region is located near the tip, which heats the pyroelectric film coating the thermally conductive tip. This device was the result of integrating a thermal nanoprobe with a high-quality PE thin films using a buffer layer and epitaxial film growth.

Figure 32:
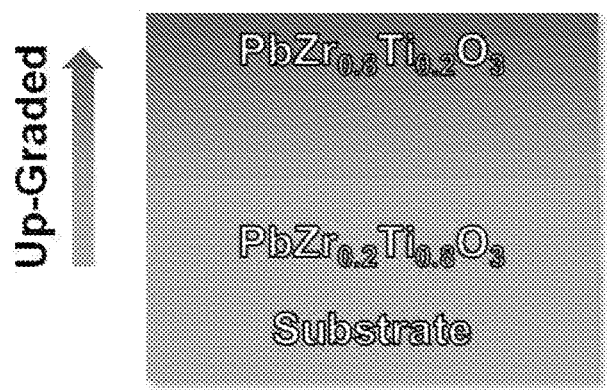
FIG. 32. provides: (32A) a schematic illustrating an up-graded emitting thin film geometry, (32B) a schematic illustrating an down-graded emitting thin film geometry.
Figure 32:
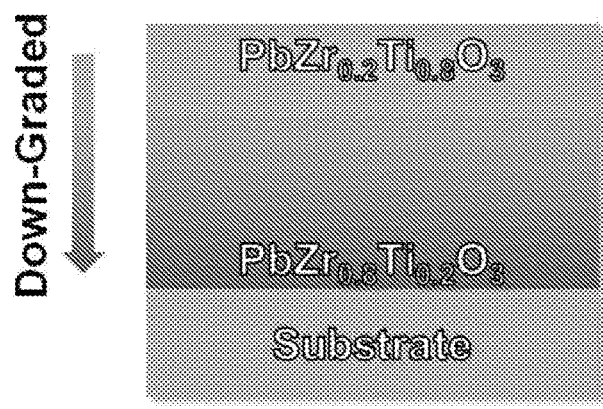

FIG. 32 provides: (32A) a schematic illustrating an upgraded emitting thin film geometry and (32B) a schematic illustrating an down-graded emitting thin film geometry. For enhanced electron emission, materials with large pyroelectric coefficients (i.e., large dP/dT) as particularly useful in the present devices and methods. Attractive materials for some applications include those exhibiting large polarization offset and having an enhanced pyroelectric coefficient. All of these and other embodiments will be utilized in these enclosed devices.

Figure 33:
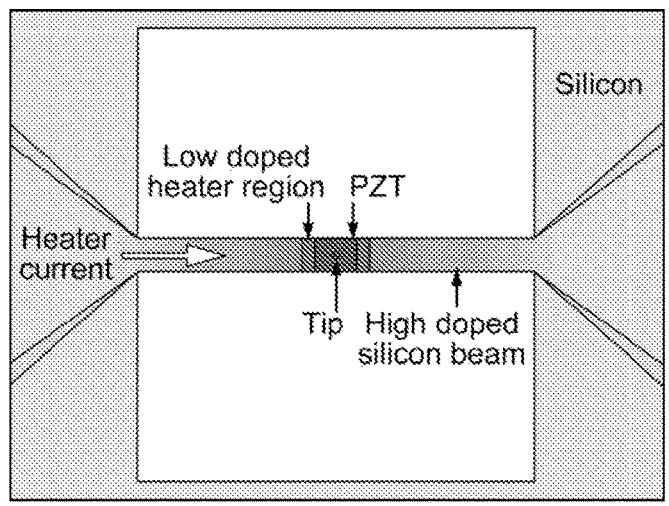
FIG. 33. Schematic diagram of an electron emission device comprising a pyroelectric thin film coating a tip on an integrated heater, suspended from a fixed-fixed cantilever.

FIG. 33 provides a schematic diagram of an electron emission device comprising a pyroelectric thin film coating a tip on an integrated heater, suspended from a fixed-fixed cantilever.

Figure 34:
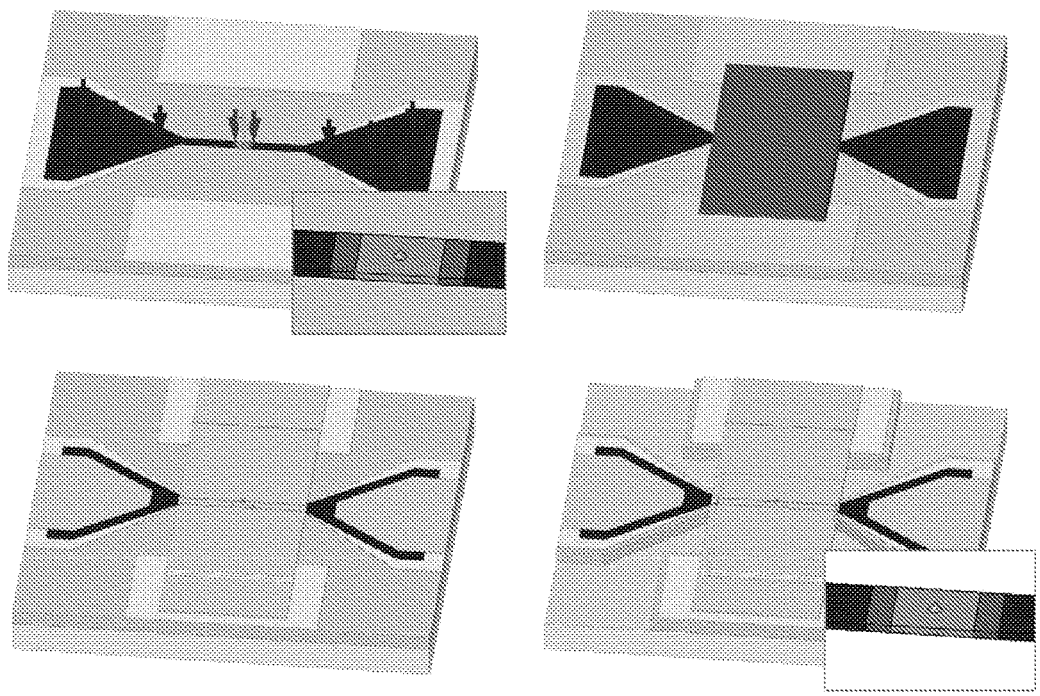
FIG. 34. Fabrication process for making an electron emission device with a metal anode above the emitter. Starting with an SOI wafer, we form the sharpened tip using oxidation sharpening and define the device shape using deep-reactive ion etching, then low dope the entire structure n-type and highly dope the device legs n+-type. The nanoprobe tip is sputter coated with a buffer layer and pyroelectric material is deposited using pulsed-laser deposition. The pyroelectric is annealed in a furnace. The electrical connections and anode are formed with sputtered metal.

FIG. 34 shows a process flow diagram for making an electron emission device of the invention. In an embodiment, the beam legs of the cantilever are highly-doped to carry current and the heater region is low-doped to provide Joule heating. The process flow diagram includes steps of; (1) Cantilever and tip formation, (2) low and high doping with phosphorus, (3) buffer layer and PZT film deposition, (4) photoresist protection, (5) gold trace and anode deposition, and (6) cantilever release.

Figure 35:
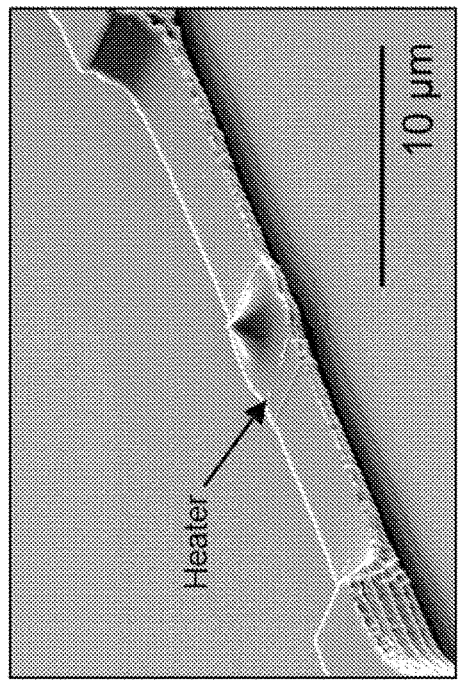
FIG. 35. Scanning electron micrographs of a nano-scale electron emitter. (A) The integrated heaters are made of single-crystal silicon and heated using metal interconnects. The emission tips are coated with pyroelectric thin film. (B) and (C) show cantilever-based electron emission devices with a single tip and (D) shows an electron emission device with an array of tips.
Figure 35:
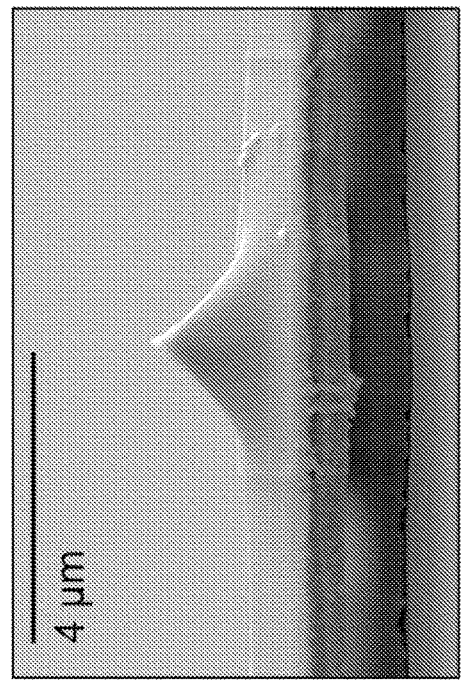
Figure 35:
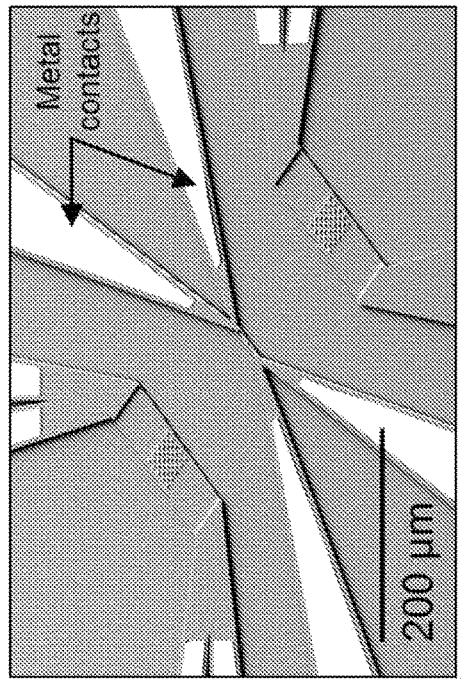
Figure 35:
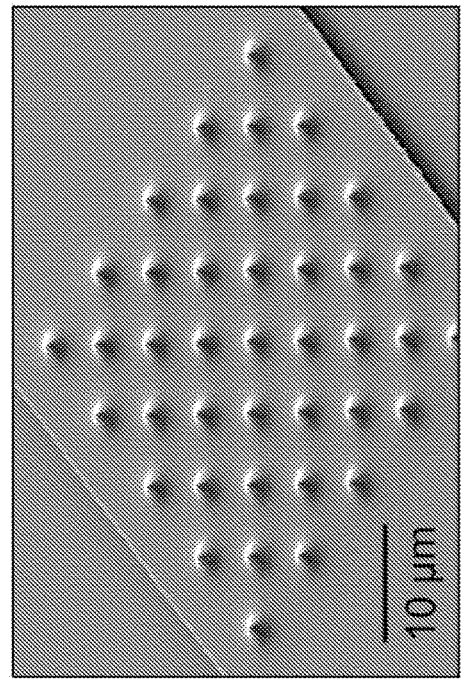

FIG. 35 shows scanning electron micrograph images of electron emission devices of the invention including (35A), (35B) and (35C) cantilever-based electron emission devices having an integrated heater component providing thermal actuation and (35D) electron emission devices comprising arrays of electron emitters. In an embodiment, the heater region is low-doped to heat through Joule heating, wherein one central heater having dimensions 3 µm×6 µm, is provided with one probe tip. In an embodiment, two larger displaced heaters have dimensions 45 µm×90 µm and an array of 41 probe tips. In some embodiment, the heater areas are released from underlying substrate to improve thermal performance. In some embodiment, the heater areas remain in contact with the underlying substrate to improve cooling performance. In some embodiment, the heaters designed for 1 kΩ resistance and provide thermal time constants on the order of 1 µs from thermal FEA modeling.

Figure 36:
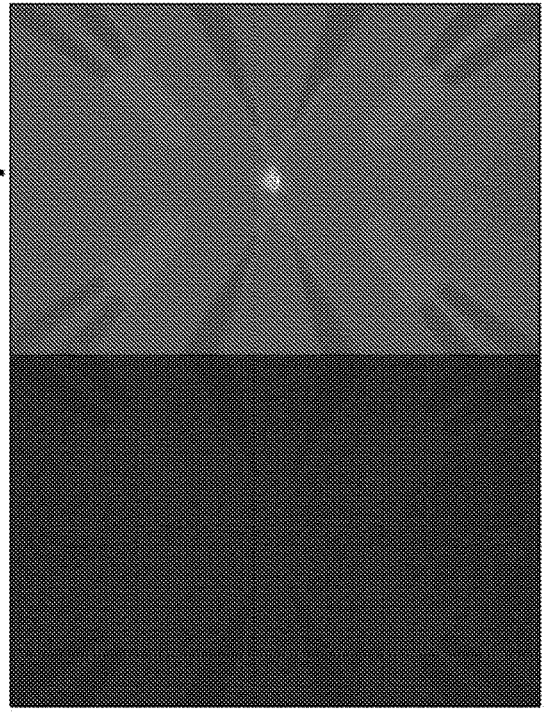
FIG. 36. (A) Graph showing thermal calibration of the heater resistance and heater temperature with applied voltage. (B) An infrared microscope image showing localized heating of the emission device during thermal actuation.
Figure 36:
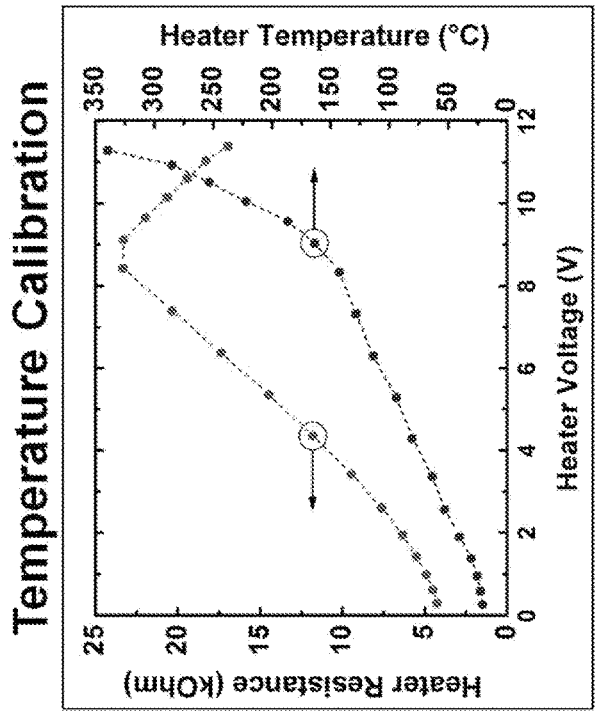

FIG. 36 is a graph showing thermal calibration of the heater resistance and heater temperature with applied voltage. (B) An infrared microscope image showing localized heating of the emission device during thermal actuation. In an embodiment, the heater temperature is calibrated using micro Raman spectroscopy, the heater resistances are 2-5 kΩ after annealing metal-silicon contact at 400° C., the heater operates in series with 1 kΩ to limit current after thermal runaway and the heater dissipates <7.6 mW power at 340° C. in steady state thermal equilibrium. Thermal isolation and a small volume with respect to surface area results in a highly localized temperature field around the heater-thermometer.

Figure 37:
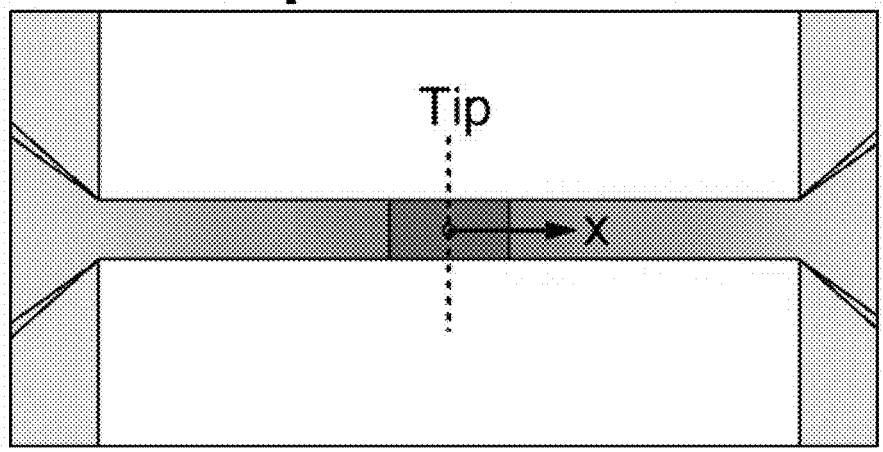
FIG. 37. Temperature profile of an embodiment of the electron emitter comprising a fixed-fixed cantilever beam with integrated heater. The schematic diagram in (A) is a top view of the beam with the emitter tip located at the center of the beam. (B) Temperature profile along the cantilever beam for various heating voltages.
Figure 37:
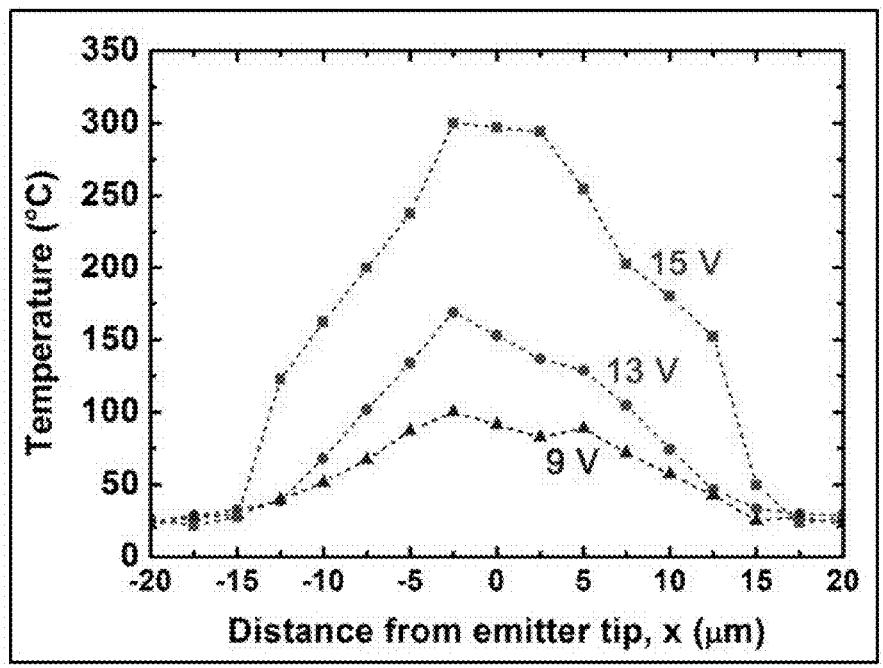

FIG. 37 provides (37A) a schematic diagram illustrating the temperature profile of an electron emission device and a plot of temperature (° C.) versus distance from the emitter tip (µm). In the emission device for these experiments, the beams are freely suspended 1 µm above substrate to improve thermal performance and an exponential drop in temperature is observed from centrally located heater. A slight asymmetry stems from misalignment of heater region to tip.

Figure 38:
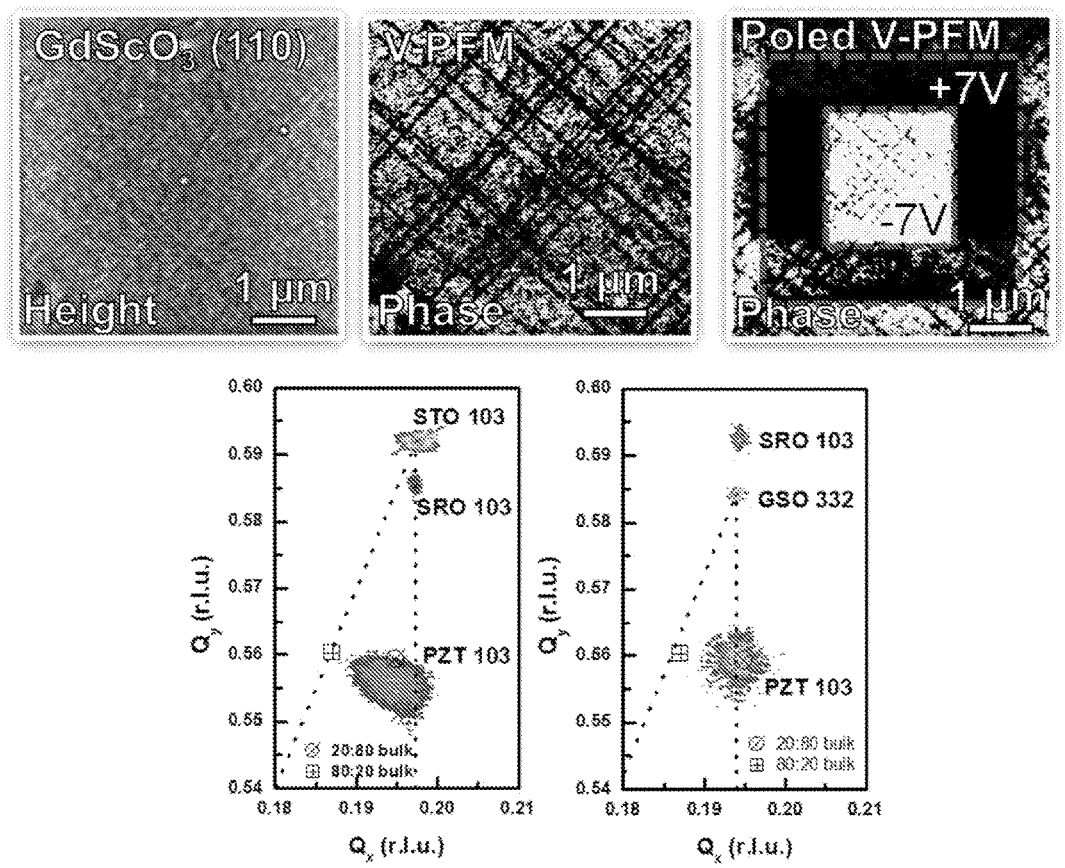
FIG. 38. provides atomic force microscopy and piezoresponse force microscopy images as well as x-ray diffraction data confirming the ability to synthesize compositionally up-graded PZT thin films including $PbZr_{0.8}Ti_{0.2}O_3 \Leftrightarrow PbZr_{0.2}Ti_{0.8}O_3/SrRuO_3/SrTiO_3(001)$ and $GdScO_3(110)$.

FIG. 38 provides atomic force microscopy and piezoresponse force microscopy images as well as x-ray diffraction data confirming the ability to synthesize compositionally up-graded PZT thin films including $PbZr_{0.8}Ti_{0.2}O_3 \Leftrightarrow PbZr_{0.2}Ti_{0.8}O_3/SrRuO_3/SrTiO_3(001)$ and $GdScO_3(110)$. These films are considered as potentially high-performance emitter materials and have been widely studied and synthesized demonstrating our ability to control and manipulate the materials of interest.

Figure 39:
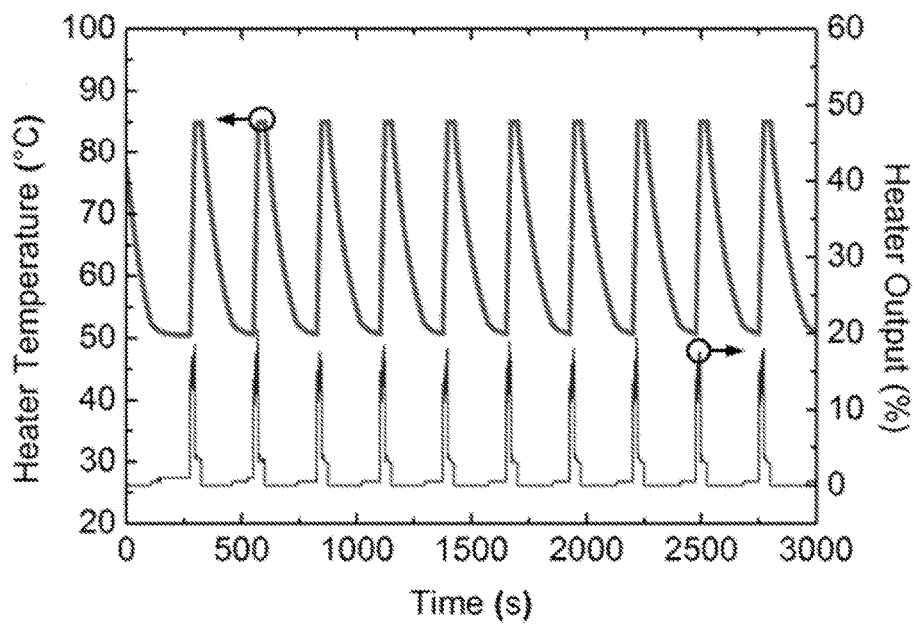
FIG. 39. (A) Graph showing the temperature of a pyroelectric crystal being heated over time. The corresponding emission current is shown in (B). The electron emission for this crystal polarization orientation occurs during heating, with an equivalent surface recharge during cooling. Electron emission corresponds to a negative current.
Figure 39:
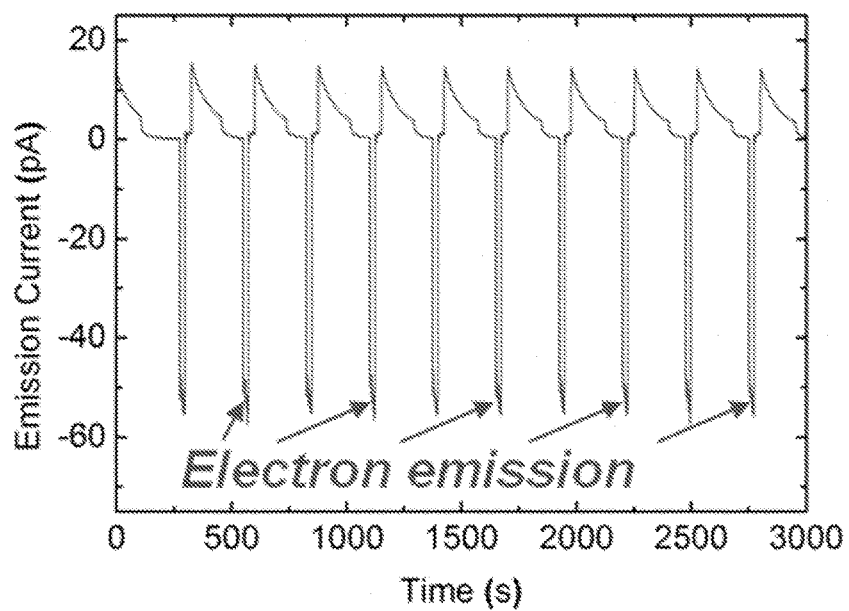

FIG. 39 shows the temperature profile of a pyroelectric crystal being heated over time. The corresponding emission current is shown in (39B). The electron emission for this crystal polarization orientation occurs during heating, with an equivalent surface recharge during cooling. Electron emission corresponds to a negative current. The sample evaluated is a macro-scale, single-crystal $LiNbO_3$, oriented "DOWN". The "DOWN" orientation indicates electron emission during heating, positive current during cooling. The experimental conditions include: no external electric field; a heating rate of 100° C./min using an external heater, and a chamber pressure of $2.0E^{-6}$ Torr. As shown in FIG. 39, the emission magnitude does not change over time.

Figure 40:
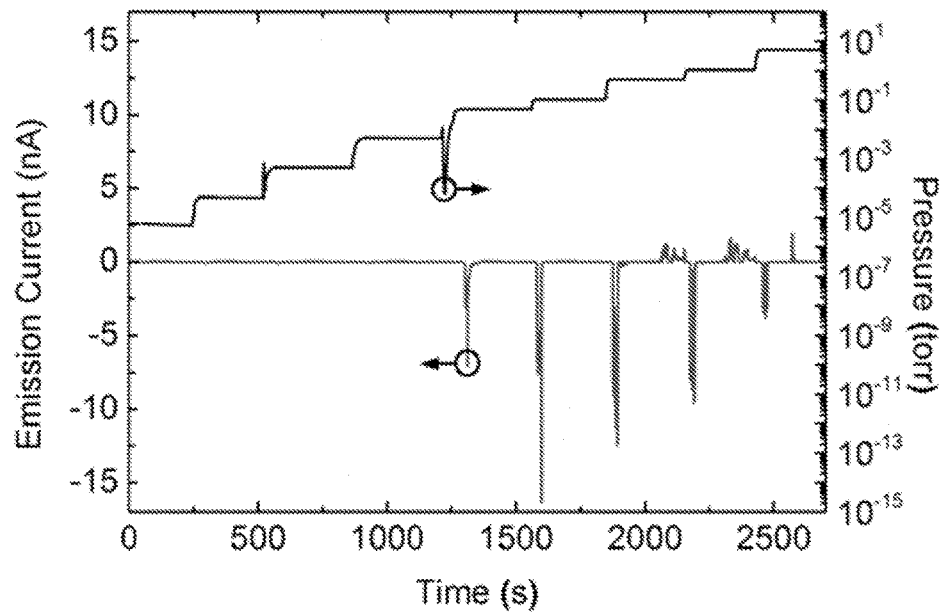
FIG. 40. (A) Emission current as a function of vacuum chamber pressure, from $5 \times 10^{-6}$–50 Torr. (B) Emission current for this embodiment is a maximum at a 500 mTorr.
Figure 40:
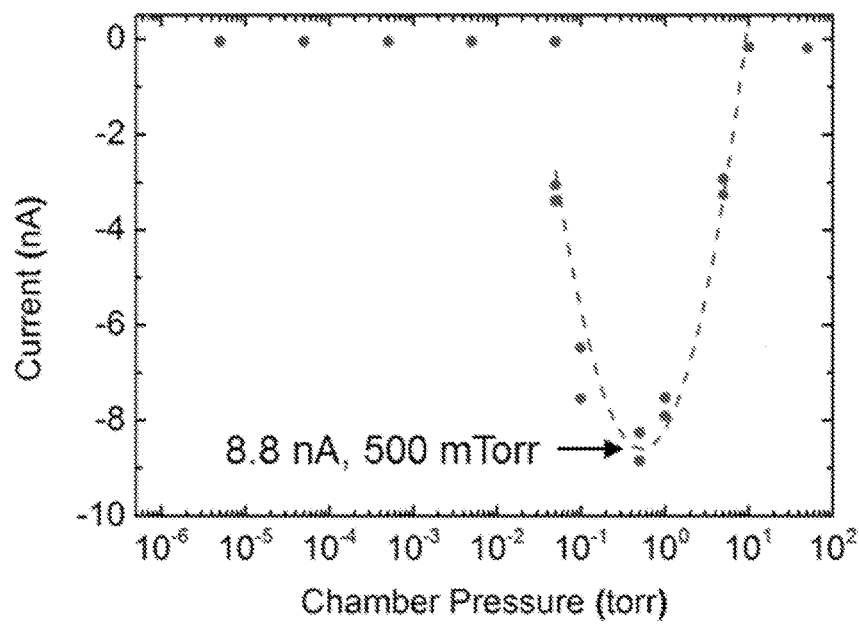

FIG. 40 plots emission current as a function of vacuum chamber pressure, from $5 \times 10^{-6}$-50 Torr. (40B) Emission current for this embodiment is a maximum at a 500 mTorr. The sample is a macro-scale, single-crystal $LiNbO_3$, orientation "DOWN". The "DOWN" orientation indicates electron emission during heating, positive current during cooling. The experimental conditions include: no external electric field and a heating rate of 100° C./min using an external heater. The experimentally verified electron emission occurs for pressures between 1E-7-50 Torr. The electron emission increases 2 orders of magnitude at pressures between 50-5000 mTorr. The maximum emission is 8.8 nA near ~500 mTorr. In an embodiment, vacuum pressure is in the medium vacuum regime and supplied by a single-stage pump setup.

Figure 41:
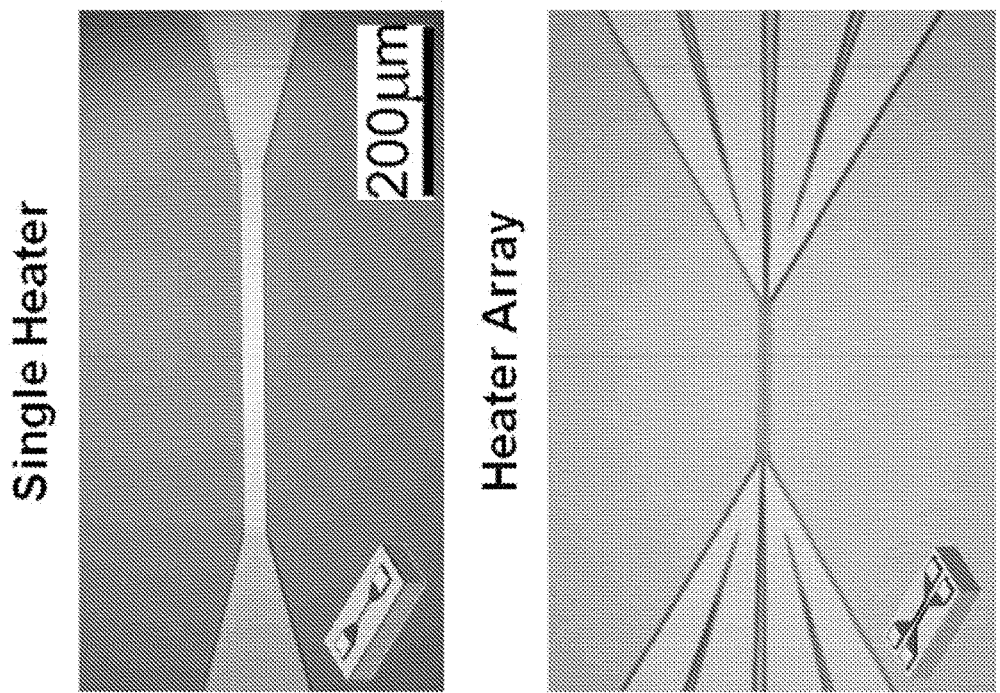
FIG. 41. Schematic diagram of an integrated heater for electron emission. The scanning electron micrographs show a single integrated heater and an array of integrated heaters.
Figure 41:
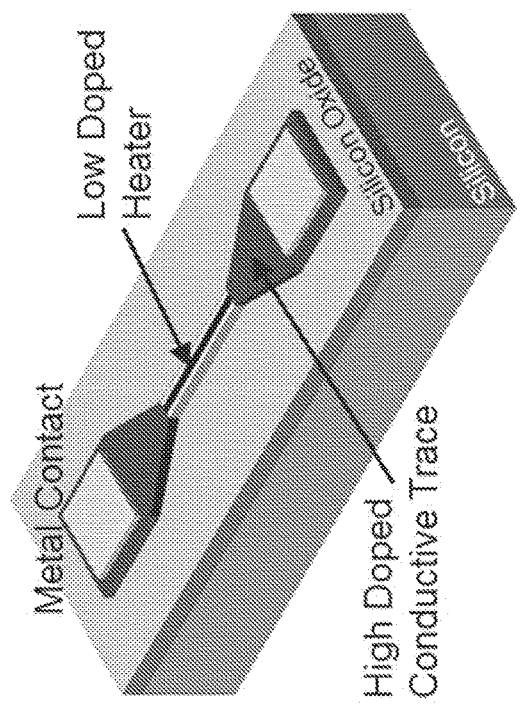

FIG. 41 provides schematic diagrams of integrated heater including a single integrated heater and an integrated heater array. The substrate is an insulating silicon oxide film on silicon substrate. The heater is an unreleased, doped silicon integrated heater that is coated with a 900 nm thin emitting film of crystalline PZT having dimensions of 500 µm×10 µm×0.5 µm. The film is highly <001> oriented PZT and has an unknown poling direction.

Figure 42:
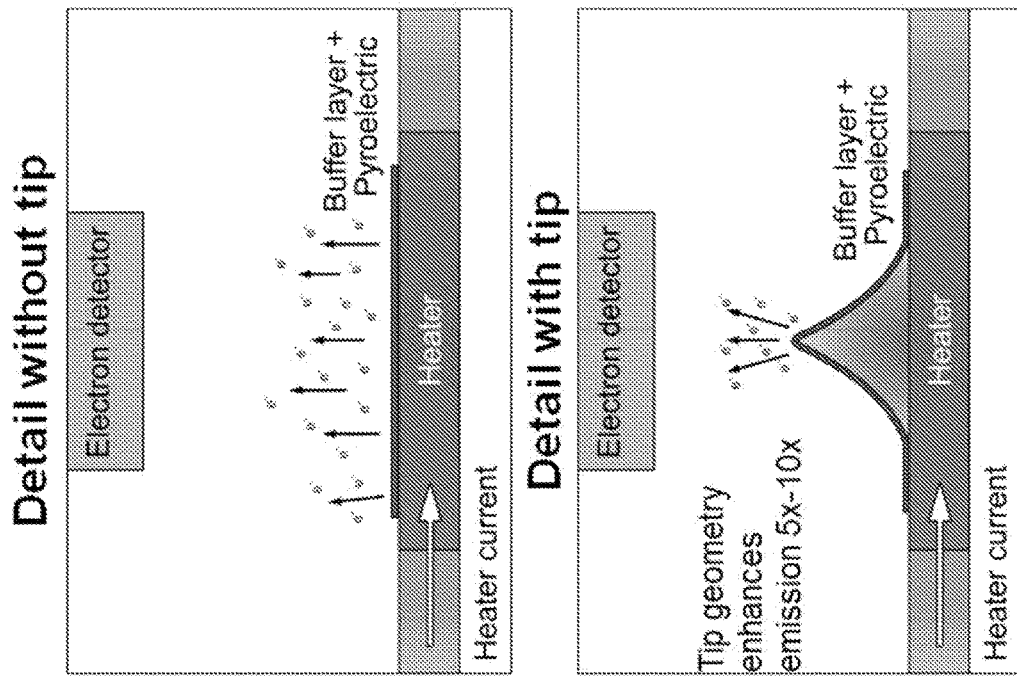
FIG. 42. Schematic diagrams of a thin film electron emitter. The thin pyroelectric film is epitaxially grown on an integrated heater using a buffer layer to decrease the crystal lattice mismatch. The heater is periodically heated, while the change in heater resistance is monitored with a sense resistor. The emitted electrons are collected in a Faraday cup and the current is detected by a current amplifier. The side view detail images depict embodiments with and without sharp tips coated in pyroelectric film. The tips increase emission through geometric concentration of electric fields.
Figure 42:
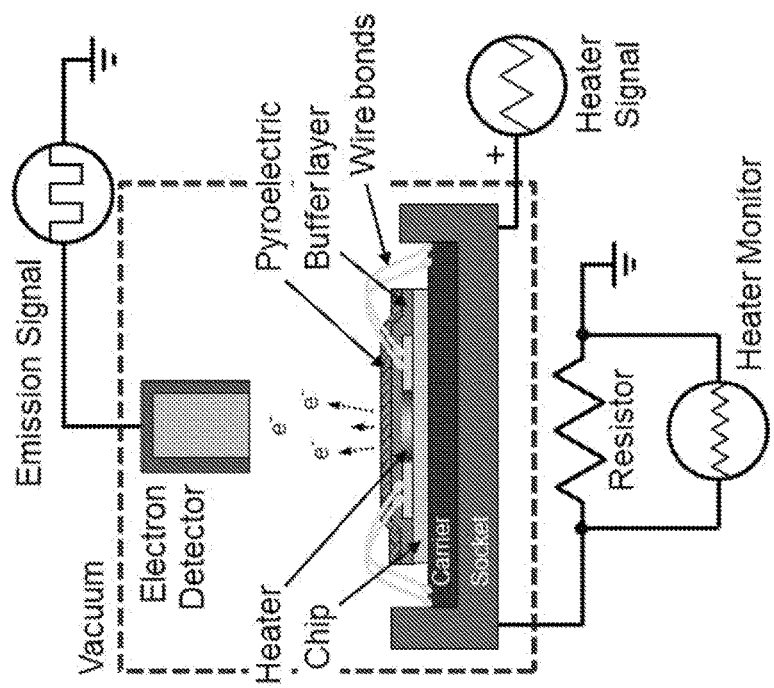

FIG. 42 shows schematic diagrams of a thin film electron emitter. The thin pyroelectric film is epitaxially grown on an integrated heater using a buffer layer to decrease the crystal lattice mismatch. The heater is periodically heated, while the change in heater resistance is monitored with a sense resistor. The heat signal used includes sine, square, sawtooth, or pulse. The emitted electrons are collected in a Faraday cup and the current is detected by a current amplifier. The side view detail images depict embodiments with and without sharp tips coated in pyroelectric film. The tips increase emission 5×-10× through geometric concentration of electric fields. The electron detector is a Faraday cup.

Figure 43:
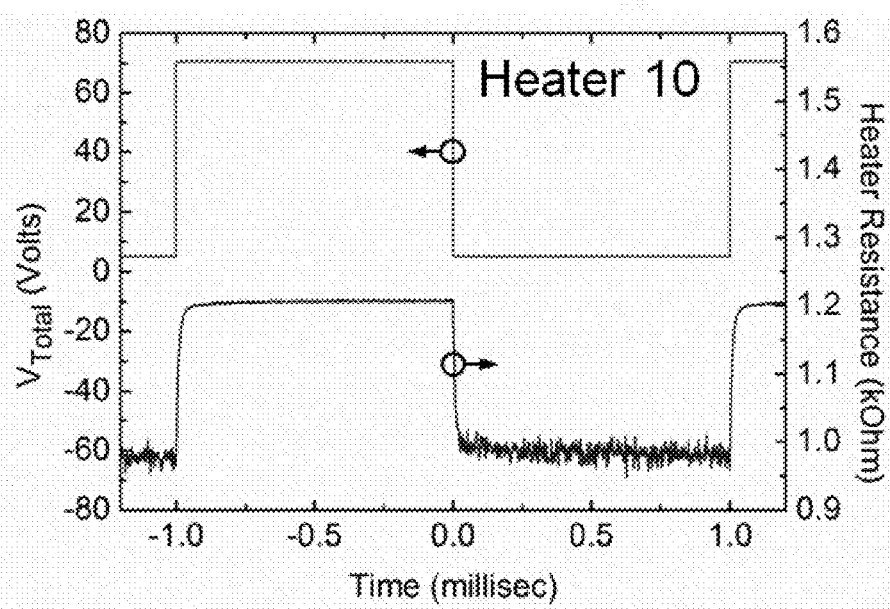
FIG. 43. (A) A plot showing square pulse heating of an integrated heater with a corresponding change in heater resistance. Heater resistance is a function of heater temperature and is thus used to calibrate the heater temperature. (B) The heating time constant decreases with applied heater voltage, but the cooling time constant stays roughly the same. The heating time constant is ~11 μsec and the cooling time constant is ~8 μsec.
Figure 43:
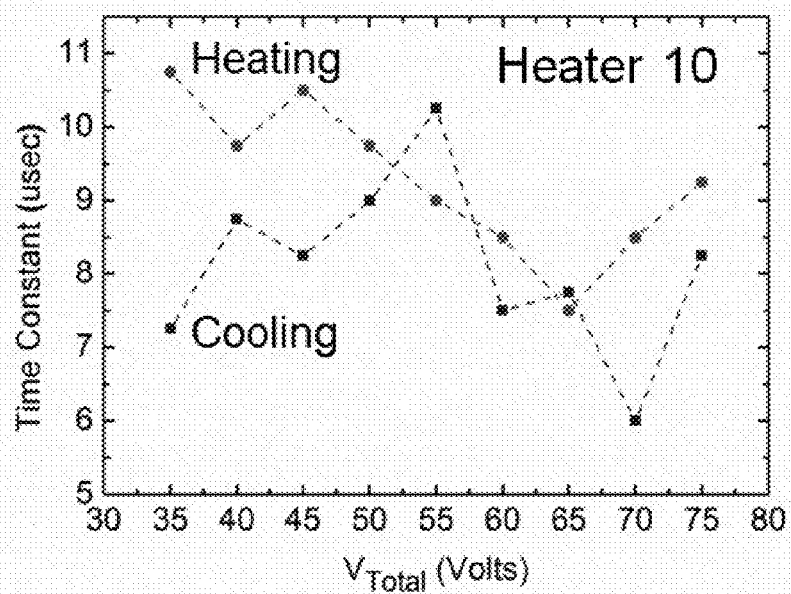

FIG. 43 is a plot showing square pulse heating of an integrated heater with a corresponding change in heater resistance. The device corresponds to unreleased, doped silicon integrated heater coated with 900 nm of crystalline PZT having a highly <001> oriented and unknown poling direction. Heater resistance is a function of heater temperature and is thus used to calibrate the heater temperature. The maximum $V_{Total}$ pulse was $75V_{Pulse}$ to reach ~150° C. (43B) The heating time constant decreases with applied heater voltage, but the cooling time constant stays roughly the same. The heating time constant is ~11 µsec and the cooling time constant is ~8 µsec. From pyroelectric emission literature, the temperature change rate is usually 0.02-0.33K/sec. Rates $>10^5$ K/sec can be achieved with integrated heaters, facilitating electron emission from thin films. The heating rate must be faster than the charge relaxation time in the pyroelectric film, which scales with film thickness.

Figure 44:
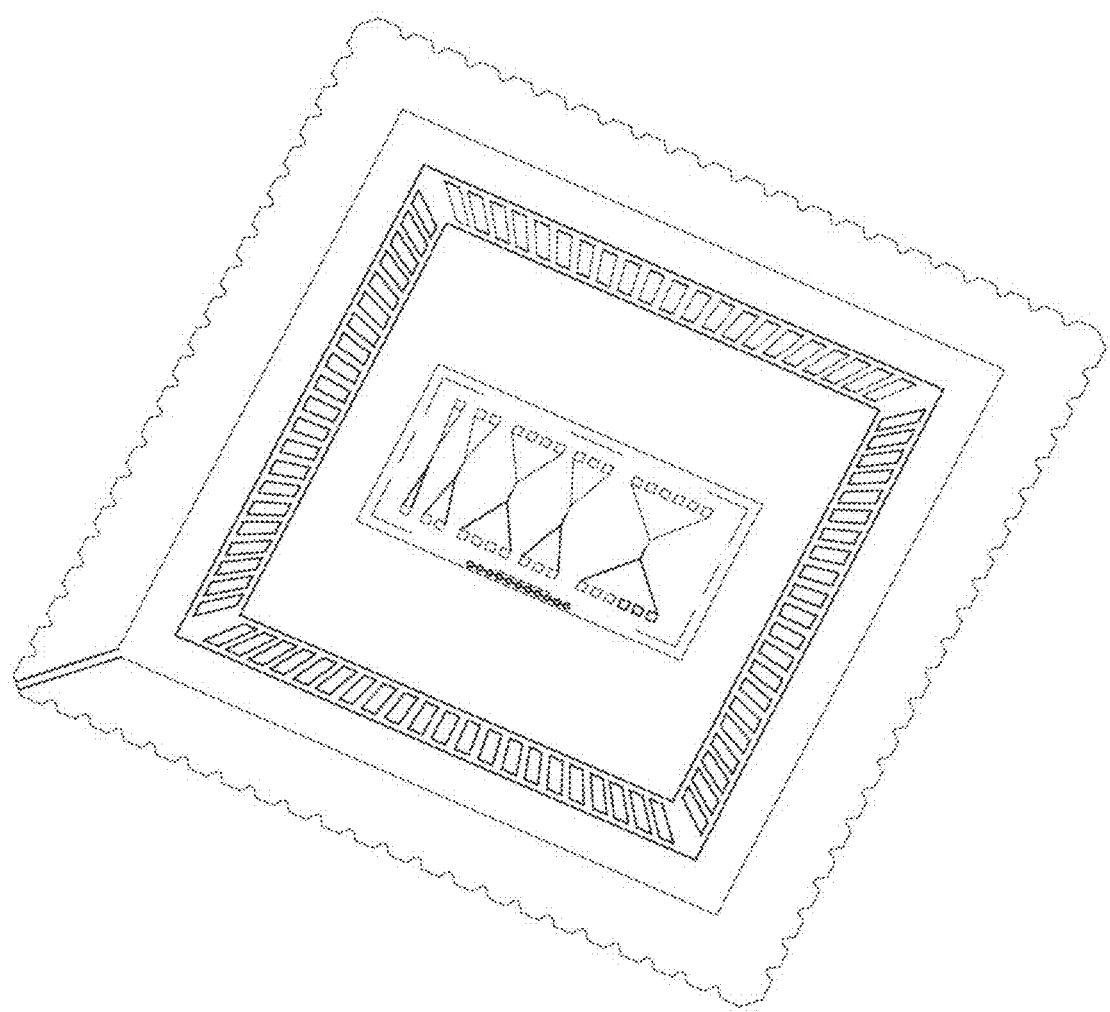
FIG. 44. An array of integrated heaters coated with a pyroelectric film, wire-bonded in a chip package and ready for electron emission.

FIG. 44 provides an image of an electron emission device. The device corresponds to unreleased, doped silicon integrated heater coated with 900 nm of crystalline PZT. The chip is wire-bonded in a chip carrier for ease of testing.

Beneficial aspects of the electron emission devices include a small footprint, low power consumption/operating voltages, parallelizable device approach. These characteristics make aspects of the present invention useful for handheld units for forward operation. The devices of certain embodiments provide flexible device integration and are capable of integration with existing technology (cell phones, iPads, etc.) for minimal infrastructure requirements. The low power consumption feature of certain embodiments allows for operation by batteries or hand crank systems. The devices of certain embodiments provides an electron source for new microscopy tools.

A benefit of the present devices and methods is that the fabrication and design approaches are scaleable from single tip (nm resolution) to >10M tips (m scale arrays). Applications of the technology include nanoscale applications, such as electron probes at AFM tips for study of microchips. Other applications include x-ray fabric wherein the approach is applicable to emitter and detector technology. In an embodiment, for example the present electron emission devices may enable "Rollable" x-ray systems and portable x-ray systems. The present systems enable two operation modes: (1) 1 sheet emitters+1 sheet detectors and (2) Integrated ½ sheet emitters+½ sheet detector. Together with software/control systems the present systems may allow rapid 3D imaging and may enable phase contrast. Other applications of the technology include electron sources such as for display systems.

REFERENCES

H. Riege, "Electron Emission from Ferroelectrics—A Review," *Nucl. Instrum. Meth. A*, vol. 340, pp. 80-89, 1994.

G. Rosenman, D. Shur, Y. E. Krasik, and A. Dunaevsky, "Electron Emission from Ferroelectrics," *J. Appl. Phys.*, vol. 88, p. 6109, 2000.

W. P. Kang, A. Wisitsora-At, J. L. Davidson, 0. K. Tan, W. G. Zhu, Q. Li, and J. F. Xu, "Electron Emission from Silicon Tips Coated with Sol-Gel $(Ba_{0.67}Sr_{0.33})TiO_3$ Ferroelectric Thin Film," *J. of Vac. Sci. and Technol. B*, vol. 19, pp. 1073-1076, 2001.

X. F. Chen, W. Zhu, H. Lu, J. S. Pan, H. J. Bian, O. K. Tan, and C. Q. Sun, "Si Field Emitter Arrays Coated with Thin Ferroelectric Films," *Ceram. Int.*, vol. 34, pp. 971-977, May 2008.

J. Lee, T. Beechem, T. L. Wright, B. A. Nelson, S. Graham, and W. P. King, "Electrical, Thermal, and Mechanical Characterization of Silicon Microcantilever Heaters," *J. Microelectromech. Syst.*, vol. 15, pp. 1644-1655, December 2006.

G. Binnig, C. F. Quate, and C. Gerber, "Atomic Force Microscope," *Phys. Rev. Lett.*, vol. 56, pp. 930-933, 1986.

G. Rosenman, D. Shur, Y. E. Krasik, A. Dunaevsky, Electron emission from ferroelectrics, *J. Appl. Phys.* 88, 6109-6161 (2000).

B. Xiao, V. Avrutin, H. Liu, U. Ozgur, H. Morkoc, C. Lu, Large pyroelectric effect in undoped epitaxial Pb(Zr, Ti)$O_3$ thin films on SrTiO$_3$ substrates, *Appl. Phys. Lett.* 93, 052913 (2008).

H. Riege, Electron emission from ferroelectrics—a review, *Nuc. Instr. Meth. Phys. Res. A* 340, 80-89 (1994).

Y. E. Krasik, K. Chirko, A. Dunaevsky, J. Z. Gleizer, A. Krokhmal, A. Sayapin, J. Felsteiner, Ferroelectric plasma sources and their applications, IEEE Trans. *Plasma Sci.* 31, 49-59 (2003).

J. H. Lee, S. W. Kang, Y.-H. Song, K. I. Cho, S. Y. Lee, Y. J. Yoo, Fabrication and characterization of silicon field emitter arrays by spin-on-glass etch back, *J. Vac. Sci. Technol. B* 16, 238-241 (1998).

K. Higa, K. Nishii, T. Asano, Gated Si field emitter array prepared by using anodization, *J. Vac. Sci. Technol. B* 16, 651-653 (1998).

J. Asano, T. Imai, M. Okuyama, Y. Hamakawa, Field-excited electron emission from ferroelectric ceramic in vacuum, *Jpn. J. Appl. Phys.* 31, 3098-3101 (1992).

O. Auciello, M. A. Ray, D. Palmer, J. Duarte, G. E. McGuire, D. Temple, Low voltage electron emission from $Pb(Zr_xTi_{1-x})O_3$-based thin film cathodes, *Appl. Phys. Lett.* 66, 2183-2185 (1995).

W. P. Kang, A. Wisitsora-at, J. L. Davidson, O. K. Tan, W. G. Zhu, Q. Li, J. F. Xu, Electron emission from silicon tips coated with sol-gel $(Ba_{0.67}Sr_{0.33})TiO_3$ ferroelectric thin film, *J. Vac. Sci. Technol. B* 19, 1073-1076 (2001).

W. P. Kang, A. Wisitsora-at, J. L. Davidson, O. K. Tan, W. G. Zhu, Q. Li, J. F. Xu, Effect of annealing temperature on the electron emission characteristics of silicon tips coated with $Ba_{0.67}S_{0.33}TiO_3$ thin film, *J. Vac. Sci. Technol. B* 21, 453-457 (2003).

H. J. Bian, X. F. Chen, J. S. Pan, C. Q. Sun, W. Zhu, Electron emission from SrTiO$_3$-coated silicon-tip arrays, *J. Vac. Sci. Technol. B* 25, 817-821 (2007).

H. J. Bian, X. F. Chen, J. S. Pan, W. Zhu, C. Q. Sun, Field emission properties of Si tip arrays coated with N-doped SrTiO$_3$ thin films at different substrate temperature, *J. Appl. Phys.* 105, 013312 (2009).

H. Lu, J. S. Pan, X. F. Chen, W. G. Zhu, Field emission of silicon emitter arrays coated with sol-gel $(Ba_{0.65}Sr_{o35})_{1-x}La_xTiO_3$ thin films, *J. Appl. Phys.* 102, 014113 (2007).

P. Chandra, P. B. Littlewood, A Landau primer for ferroelectrics in *Physics of Ferroelectrics*, Springer Topics in Applied Physics, 105, 69 (2007).

P. Chandra, P. B. Littlewood, A Landau primer for ferroelectrics in *Physics of Ferroelectrics*, Springer Topics in Applied Physics, 105, 69 (2007).

K. J. Choi, M. Biegalski, Y. L. Li, A. Sharan, J. Schubert, R. Uecker, P. Reiche, Y. B. Chen, X. Q. Pan, V. Gopalan, L.-Q. Chen, D. G. Schlom, C. B. Eom, Enhancement of ferroelectricity in strained BaTiO$_3$ thin films, *Science* 306, 1005-1009 (2004).

J. Karthik, L. W. Martin, Strain-control of pyroelectric properties in $Pb(Zr_{1-x}Ti_x)O_3$ thin films, Submitted to *Appl. Phys. Lett.*, December 2010.

R. J. Zeches, M. D. Rossell, J. X. Zhang, A. J. Hatt, Q. He, C. H. Yang, A. Kumar, C. H. Wang, A. Melville, Y.-H. Chu, J. F. Ihlefeld, R. Erni, C. Ederer, V. Gopalan, L. Q. Chen, D. G. Schlom, N. A. Spaldin, L. W. Martin, R. Ramesh, A strain-driven morphotropic phase boundary in BiFeO$_3$, Accepted to *Science Sep.* 1, 2009.

B. Rosenblum, P. Braunlich, J. P. Carrico, Thermally stimulated field emission from pyroelectric LiNbO$_3$, *App. Phys. Lett.* 25, 17-19 (1974).

G. I. Rozenman and V. I. Pechorskii. *Pis'ma Zh. Tekh. Fiz.* 6, 1531 (1980); English translation: Soy. Tech. Phys. Lett. 6, 661 (1980).

G. I. Rosenman, V. Okhapkin, Y. Chepelev, V. Shur, Electron emission during the switching of ferroelectric lead germanate, *J. Exp. Theor. Phys. Lett.* 39, 477-480 (1984).

J. Lee, T. L. Wright, T. Beecham, B. A. Nelson, S. Graham, W. P. King, Electrical, thermal, and mechanical characterization of silicon microcantilever heaters, *J. Microelectromechan. Sys.*, 15, 1644-1655 (2006).

P. Chandra, P. B. Littlewood, A Landau primer for ferroelectrics in *Physics of Ferroelectrics*, Springer Topics in Applied Physics, 105, 69 (2007).

K.-F. Hii, R. R. Vallance, S. B. Chikkamaranahalli, M. P. Menguc, A. M. Rao, Characterizing field emission from individual carbon nanotubes at small distances, *J. Vac. Sci. Technol. B* 24, 1081-1087 (2006).

E. G. Pogorelov, Y.-C. Chang, A. I. Zhbanov, Y.-G. Lee, Corrected field enhancement factor for the floating sphere model of carbon nanotube emitter, *J. Appl. Phys.* 108, 044502 (2010).

K. L. Jensen, P. g. O'Shea, D. W. Feldman, J. L. Shaw, Emittance of a field emission electron source, *J. Appl. Phys.* 107, 014903 (2010).

P. Chandra, P. B. Littlewood, A Landau primer for ferroelectrics in *Physics of Ferroelectrics*, Springer Topics in Applied Physics, 105, 69 (2007).

M. Huijben, L. W. Martin, Y.-H. Chu, M. B. Holcomb, P. Yu, G. Rijnders, D. H. A. Blank, R. Ramesh, Critical thickness and orbital ordering in ultrathin $La_{0.7}Sr_{0.3}MnO_3$ films, *Phys. Rev. B* 78, 094413 (2008).

P. Yu, J.-S. Lee, M. D. Rossell, M. Huijben, C.-H. Yang, Q. He, J. X. Zhang, S. Y. Yang, M. J. Lee, Q. M. Ramasse, R. Erni, Y.-H. Chu, D. A. Arena, C.-C. Kao, L. W. Martin, R. Ramesh, Interface ferromagnetism and orbital reconstruction in $BiFeO_3$—$La_{0.7}Sr_{0.3}MnO_3$ heterostructures, *Phys. Rev. Lett.* 105, 027201 (2010).

Y.-H. Chu, Q. Zhan, L. W. Martin, M. P. Cruz, P.-L. Yang, G. W. Pabst, F. Zavaliche, S. Y. Yang, J.-X. Zhang, L.-Q. Chen, D. G. Schlom, I.-N. Lin, T.-B. Wu, R. Ramesh, Nanoscale Domain Control in Multiferroic $BiFeO_3$ Thin Films, *Adv. Mater.* 18, 2307-2311 (2006).

Y.-H. Chu, M. P. Cruz, C. H. Yang, L. W. Martin, P.-L. Yang, J.-X. Zhang, K. Lee, P. Yu, L.-Q. Chen, R. Ramesh, Domain Control in Multiferroic $BiFeO_3$ Through Substrate Vicinality, *Adv. Mater.* 19, 2662-2666 (2007).

Y.-H. Chu, Q. He, C. H. Yang, P. Yu, L. W. Martin, P. Shafer, R. Ramesh, Nanoscale Control of Domain Architectures in $BiFeO_3$ Thin Films, *Nano Lett.* 9, 1726-1730 (2009).

R. L. Byer, C. B. Roundy, Pyroelectric coefficient direct measurement technique and application to a nsec response time detector, *Ferroelectrics* 3, 333-338 (1972).

E. J. Sharp, L. E. Garn, Use of low-frequency sinusoidal temperature waves to separate pyroelectric currents from nonpyroelectric currents. Part II: experiment, *J. Appl. Phys.* 53, 8980-8987 (1982).

D. G. Cahill, Thermal conductivity measurement from 30 to 750K: the 3ω method, *Rev. Sci. Instrum.* 61, 802 (1990).

J. D. Ivers, L. Schachter, J. A. Nation, G. S. Kerslick, R. Advani, Electron-beam diodes using ferroelectric cathodes, *J. Appl. Phys.* 73, 2667-2671 (1993).

H. Gundel, H. Riege, E. J. N. Wilson, J. Handerek, K. Zioutas, Copious electron emission from PLZT ceramics with high zirconium concentration, *Ferroelectrics* 100, 1-16 (1989); H. Gundel, J. Handerek, H. Riege, E. J. N. Wilson, Electric field-excited electron emission from PLZT-X/65/35 ceramics, *Ferroelectrics* 110, 183-192 (1990); H. Gundel, J. Handerek, H. Riege, Time-dependent electron emission from ferroelectrics by external pulsed electric fields, *J. Appl. Phys.* 69, 975-982 (1991).

D. Shur, G. Rosenman, Y. Krasik, V. D. Kugel, Plasma-assisted electron emission from $(Pb,La)(Zr,Ti)O_3$ ceramic cathodes, *J. Appl. Phys.* 79, 3669-3674 (1996); D. Shur, G. Rosenman, Y. E. Krasik, R. Advani, A high-perveance ferroelectric cathode with a narrowed electron energy spread, J. Phys. D: *Appl. Phys.* 31, 1375-1382 (1998).

A. Dunaevsky, Y. E. Krasik, J. Felsteiner, S. Dorfman, Electron/ion emission from the plasma formed on the surface of ferroelectrics. I. studies of plasma parameters without applying an extracting voltage, *J. Appl. Phys.* 85, 8464-8473 (1999).

D. N.J. Shannon, P. W. Smith, P. J. Dobson, M. J. Shaw, Dual mode electron emission from ferroelectric ceramics, *Appl. Phys. Lett.* 70, 1625-1627 (1997).

D. Shur, G. Rosenman, Y. E. Krasik, Surface discharge plasma induced by spontaneous polarization switching, *Appl. Phys. Lett.* 70, 574-576 (1996); D. Shur, G. Rosenman, Two modes of plasma-assisted electron emission from ferroelectric ceramics, *J. Phys. D: Appl. Phys.* 32, L29-L33 (1999).

M. Huijben, L. W. Martin, Y.-H. Chu, M. B. Holcomb, P. Yu, G. Rijnders, D. H. A. Blank, R. Ramesh, "Critical thickness and orbital ordering in ultrathin $La_{0.7}Sr_{0.3}MnO_3$ films," *Phys. Rev. B* 78, 094413 (2008).

P. Yu, W. Luo, J. X. Zhang, M. D. Rossell, C.-H. Yang, S. Y. Yang, Q. He, Q. M. Ramasse, R. Erni, L. W. Martin, Y. H. Chu, S. T. Pantelides, S. J. Pennycook, R. Ramesh, "Can interface electronic structure control bulk properties?" *Submitted to Nature Mater.*, December 2010.

G. W. Pabst, L. W. Martin, Y.-H. Chu, R. Ramesh, Leakage mechanisms in $BiFeO_3$ thin films, *Appl. Phys. Lett.* 90, 072902 (2007).

L. Pintilie, C. Dragoi, Y.-H. Chu, L. W. Martin, R. Ramesh, M. Alexe, Orientation-dependent potential barriers in case of epitaxial Pt—$BiFeO_3$—$SrRuO_3$ capacitors, *Appl. Phys. Lett.* 94, 232902 (2009).

D. Pantel, Y.-H. Chu, L. W. Martin, R. Ramesh, D. Hesse, M. Alexe, Switching kinetics in epitaxial $BiFeO_3$ thin films, *Appl. Phys. Lett.* 107, 084111 (2010).

R. J. Zeches, M. D. Rossell, J. X. Zhang, A. J. Hatt, Q. He, C.-H. Yang, A. Kumar, C. H. Wang, A. Melville, C. Adamo, G. Sheng, Y.-H. Chu, J. F. Ihlefeld, R. Erni, C. Ederer, V. Gopalan, L. Q. Chen, D. G. Schlom, N. A. Spaldin, L. W. Martin, R. Ramesh, "A strain-driven morphotropic phase boundary in $BiFeO_3$," *Science* 326, 977 (2009).

J. X. Zhang, B. Xiang, Q. He, J. Seidel, R. J. Zeches, P. Yu, S. Y. Yang, C. H. Wang, Y.-H. Chu, L. W. Martin, A. M. Minor, R. Ramesh, Large field-induced strains in a lead-free piezoelectric material, *Nature Nanotechnol.* 6, 98-102 (2011).

A. R. Damodaran, C.-W. Liang, Q. He, C.-Y. Peng, L. Chang, Y.-H. Chu, L. W. Martin, "Nanoscale structure and mechanism for enhanced electromechanical response of highly-strained $BiFeO_3$ thin films," *Under review Adv. Mater.*, February 2011.

Y.-H. Chu, L. W. Martin, M. B. Holcomb, M. Gajek, S.-J. Han, Q. He, N. Balke, C.-H. Yang, D. Lee, W. Hu, Q. Zhan, P.-L. Yang, A. Fraile-Rodriguez, A. Scholl, S. X. Wang, R. Ramesh, "Electric-field control of local ferromagnetism using a magnetoelectric multiferroic," *Nature Mater.* 7, 478 (2008).

L. W. Martin, Y.-H. Chu, M. B. Holcomb, M. Huijben, P. Yu, S.-J. Han, D. Lee, S. X. Wang, R. Ramesh, "Nanoscale control of exchange bias with $BiFeO_3$ thin films," *Nano Lett.* 8, 2050 (2008).

J. Seidel, L. W. Martin, Q. He, Q. Zhan, Y.-H. Chu, A. Rother, M. E. Hawkridge, P. Maksymovych, P. Yu, M. Gajek, N. Balke, S. V. Kalinin, S. Gemming, F. Wang, G. Catalan, J. F. Scott, N. A. Spaldin, J. Orenstein, R. Ramesh, "Conduction at domain walls in oxide multiferroics," *Nature Mater.* 8, 229 (2009).

S. Y. Yang, J. Seidel, S. J. Byrnes, P. Shafer, C.-H. Yang, M. D. Rossell, P. Yu, Y.-H. Chu, J. F. Scott, J. W. Ager, III, L. W. Martin, R. Ramesh, Above-bandgap voltages from ferroelectric photovoltaic devices, *Nature Nanotechnol.* 5, 143-147 (2010).

1. G. Rosenman, D. Shur, Y. E. Krasik, A. Dunaevsky, Electron emission from ferroelectrics, *J. Appl. Phys* 0.88, 6109-6161 (2000).
2. D. Shur and G. Rosenman, Figures of merit for ferroelectric electron emission cathodes, *J. Appl. Phys.* 80, 3445 (1996).
3. J. Karthik, L. W. Martin, Pyroelectric properties of polydomain epitaxial $Pb(Zr_{1-x},Ti_x)O_3$ thin films, *Phys. Rev. B* 84, 024102 (2011); J. Karthik, L. W. Martin, Effect of domain walls on the electrocaloric properties of $Pb(Zr_{1-x},Ti_x)O_3$ thin films, *Appl. Phys. Lett.* 99, 032904 (2011); B. Bhatia, J. Karthik, D. G. Cahill, L. W. Martin, W. P. King, High-temperature piezoresponse force microscopy, *Appl. Phys. Lett.* 99, 173103 (2011).
4. D. Bao, N. Wakiya, K. Shinozaki, N. Mizutani, X. Yao, Abnormal ferroelectric properties of compositionally graded $Pb(Zr,Ti)O_3$ thin films with $LaNiO_3$ bottom electrodes, *J. Appl. Phys.* 90, 506 (2001).
5. N. W. Schubring, J. V. Mantese, A. L. Micheli, A. B. Catalan, R. J. Lopez, Charge pumping and pseudopyroelectric Effect in Active Ferroelectric Relaxor-Type Films, *Phys. Rev. Lett.* 68, 1778 (1992).
6. N. Choudhury, L. Walizer, S. Lisenkov, L. Bellaiche, Geometric frustration in compositionally modulated ferroelectrics, *Nature* 470, 514 (2011).
7. S-B Mi, C-L Jia, V. Vaithyanathan, L. Houben, J. Schubert, D. G. Schlom, K. Urban, Atomic structure of the interface between $SrTiO_3$ thin films and Si (001) substrates, *Appl. Phys. Lett.* 93, 101913 (2008).
8. M. Dekkers, M. D. Nguyen, R. Steenwelle, P. M. to Riele, D. H. A. Blank, G. Rijnders, Ferroelectric properties of epitaxial $Pb(Zr,Ti)O_3$ thin films on silicon by control of crystal orientation *Appl. Phys. Lett.* 95, 012902 (2009).
9. C. Wang, D. E. Laughlin, M. H. Kryder, Epitaxial growth of lead zirconium titanate thin films on Ag buffered Si substrates using rf sputtering, *Appl. Phys. Lett.* 90, 172903 (2007).
1. G. Rosenman, D. Shur, Y. E. Krasik, A. Dunaevsky, Electron emission from ferroelectrics, *J. Appl. Phys* 0.88, 6109-6161 (2000).
2. D. Shur, G. Rosenman, Figures of merit for ferroelectric electron emission cathodes, *J. Appl. Phys.* 80, 3445 (1996).
3. R. Mahjoub, V. Anbusathaiah, S. P. Alpay, V. Nagarajan, Ferroelastic domains in bilayered ferroelectric thin films, *J. Appl. Phys.* 104, 124103 (2008).

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Many of the molecules disclosed herein contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An electron emission device comprising:
    a substrate having a receiving surface;
    a thin film comprising a pyroelectric material provided on at least a portion of said receiving surface or provided on one or more intermediate structures supported by said receiving surface; wherein said thin film comprises a crystalline material, has a thickness from 0.1 nm to 10 μm, has a first side facing said receiving surface and a second side opposite to said first side and said second side of said thin film comprises one or more probe tip relief features wherein each probe tip relief feature terminates at a distal end having lateral cross sectional dimensions greater than zero and less than or equal to 250 nm; and
    an actuator operationally coupled to said thin film for selectively modulating an applied electric field in said thin film so as to generate electron emission from an external surface of said thin film; wherein said actuator comprises an extraction electrode positioned sufficiently close to said second side of said thin film so as to establish a selected applied electric field on a surface of said thin film so as to modulate said electron emission from said external surface of said thin film.

2. The device of claim 1, wherein said external surface of said thin film is characterized by one or more relief features each independently terminating at a distal end having lateral cross sectional dimensions greater than zero and less than or equal to 50 nm.

3. The device of claim 1, wherein said substrate comprises one or more probe tips on said receiving surface, wherein each probe tip independently terminates at a distal end having lateral cross sectional dimensions less than or equal to 250 nm; wherein said thin film is provided on at least a portion of said one or more probe tips or provided on one or more intermediate structures supported by said one or more probe tips, thereby forming said relief features of said thin film.

4. The device of claim 1 further comprising an additional actuator operationally coupled to said thin film for selectively modulating a temperature in said thin film so as to generate electron emission from an external surface of said thin film; wherein said thin film is provided on one or more probe tips supported by said additional actuator.

5. The device of claim 4, wherein said additional actuator is a temperature controller in thermal communication with said thin film; wherein said temperature controller selectively modulates said temperature of said thin film so as to generate said electron emission from said external surface of said thin film.

6. The device of claim 5, wherein said temperature controller comprises a heating component, cooling component or a combination of a heating component and cooling component for selectively increasing, decreasing or both increasing and decreasing the temperature of said thin film and wherein said temperature controller provides heating or cooling of said thin film at a rate equal to or greater than $1\times10^{5\circ}$ C. $s^{-1}$ or $-1\times10^{5\circ}$ C. $s^{-1}$.

7. The device of claim 5, wherein said temperature controller comprises a heater-thermometer in thermal communication with said thin film, wherein said heater-thermometer comprises a resistive heater, a thermistor or both a resistive heater and thermistor.

8. The device of claim 1, wherein further comprising a mechanical resonator for selectively modulating said state of mechanical strain of said thin film so as to generate said electron emission from said external surface of thin film and wherein said mechanical resonator compresses, expands, bends or flexes said thin film so as to generate said electron emission from said external surface of said thin film.

9. The device of claim 8, wherein said mechanical resonator changes the state of mechanical strain of said thin film by a value selected from the range of 0.01% to 5% in a time period less than or equal to 2 milliseconds.

10. The device of claim 1, wherein said thin film comprises a single crystalline material, polycrystalline material or doped crystalline material.

11. The device of claim 1, wherein said thin film is deposited, grown or epitaxially grown directly on said receiving surface of said substrate or is deposited, grown or epitaxially grown on one or more intermediate structures supported by said receiving surface of said substrate.

12. The device of claim 2, wherein said distal end of each of said at least one probe tip relief features has a cylindrical or conical shape.

13. The device of claim 1, wherein said pyroelectric material has a pyroelectric coefficient greater than or equal to 0.000005 C/m$^2$ K.

14. The device of claim 1, wherein said pyroelectric material comprises a ferroelectric material.

15. The device of claim 1, wherein said thin film comprises:
- a perovskite or a perovskite-based compound; or
- a tungsten-bronze type oxide; or
- a pyrochlore-type compound; or
- a layered-structure oxide; or
- a barium-fluoride type compound; or
- a molybdate, a boracite, a halide, an antimony sulphide iodide compound, a potassium dihydrogen phosphate type compound, or a sulphate; or
- a polymer ferroelectric material.

16. The device of claim 1, wherein said substrate is a cantilever, a nanomechanical resonator beam or a cantilever bridge.

17. The cantilever of claim 16, wherein said additional actuator is a heater-thermometer in thermal contact with said thin film.

18. A method for generating electron emission; said method comprising the steps of:
   a. providing an electron emission device comprising: a substrate having a receiving surface; a thin film comprising a pyroelectric material provided on at least a portion of said receiving surface or provided on one or more intermediate structures supported by said receiving surface; wherein said thin film comprises a crystalline material, has a thickness from 0.1 nm to 10 µm, has a first side facing said receiving surface and a second side opposite to said first side and said second side of said thin film comprises one or more probe tip relief features wherein each probe tip relief feature terminates at a distal end having lateral cross sectional dimensions greater than zero and less than or equal to 250 nm; and an actuator operationally coupled to said thin film for selectively modulating an applied electric field said thin film so as to generate electron emission from an external surface of said thin film wherein said actuator comprises an extraction electrode positioned sufficiently close to said second side of said thin film so as to establish a selected applied electric field on a surface of said thin film so as to modulate said electron emission from said external surface of said thin film; and
   b. applying a change in applied electric field to said thin film, so as to generate said electron emission from said external surface of thin film.

19. A method for making an electron emission device; said method comprising the steps of:
   a. providing a substrate having a receiving surface;
   b. providing a thin film comprising a pyroelectric material on at least a portion of said receiving surface or provided on one or more intermediate structures supported by said receiving surface; wherein said thin film comprises a crystalline material, has a thickness from 0.1 nm to 10 µm, has a first side facing said receiving surface and a second side opposite to said first side and said second side of said thin film comprises one or more probe tip relief features wherein each probe tip relief feature terminates at a distal end having lateral cross sectional dimensions greater than zero and less than or equal to 250 nm; and
   c. operationally coupling an actuator to said thin film for selectively modulating an applied electric field in said thin film so as to generate electron emission from an external surface of said thin film, wherein said actuator comprises an extraction electrode; and
   d. providing said extraction electrode positioned sufficiently close to the second side of said thin film so as to establish a selected applied electric field on a surface of said thin film so as to modulate said electron emission from said external surface of said thin film.

20. The electron emission device of claim 1, wherein said thin film has a thickness from 0.1 nm to 100 nm.

21. The electron emission device of claim 1, wherein said pyroelectric material is $BaTiO_3$ or doped variations; $Ba_{1-x}A_xTiO_3$ or doped variations wherein A is Sr, Ce, La, Dy, Y, Sc, Nd, Sm, Bi, or Ca; $BaTi_{1-x}B_xO_3$ or doped variations wherein B is Fe, Nb, Co, Cr, Zr, or Mn; $Ba(B'_xB''_{1-x})O_3$ or doped variations wherein each of B' and B" is independently Cu, W, Ta, Nb, Bi, V, Mo, or Zr; $BiFeO_3$ or doped variations, $Bi_{1-x}A_xFeO_3$ or doped variations wherein A is Sr, Ce, La, Dy, Y, Sc, Nd, Sm, Bi, or Ca, $BiTi_{1-x}B_xO_3$ or doped variations wherein B is Ti, Ni, Nb, Co, Cr, Zr, or Mn; $BiCoO_3$ or doped variations; $BiCrO_3$ or doped variations; $BiMnO_3$ or doped variations; $BiNiO_3$ or doped variations; $BiTiO_3$ or doped variations; $CdTiO_3$ or doped variations; $CsGeCl_3$; $KTaO_3$; $KIO_3$; $KTiO_3$ or doped variations; $KNbO_3$ or doped variations; $KTaO_3$ or doped variations; $LiNbO_3$ or doped variations; $LiTaO_3$ or doped variations; $NaNbO_3$ or doped variations; $PbTiO_3$ or doped variations; $PbZr_{1-x}Ti_xO_3$; $PbA_xTiO_3$ or doped variations wherein A is Sr, Ce, La, Dy, Y, Sc, Nd, Sm, Bi, or Ca; $PbTi_{1-x}B_xO_3$ or doped variations wherein B is Fe, Nb, Co, Cr, Zr, or Mn; $Pb(B'_xB''_{1-x})O_3$ wherein each of B' and B" is independently Co, W, Sc, Nb, Fe, Ta, Mg, Nb, Cd, or Cu or doped variations including Li-doped variations; $Pb(B'_{1-x},Nb_x)O_3$ wherein B' is Mg, Zn, Co, Ni, or Cd; $Pb(B'_{1-x-y}B''_xB'''_y)O_3$ wherein each of B', B", and B''' is independently Li, Fe, W, Co, In, Y, Tb, Yb, Ho, Gd, Pr, La, Sm, Na, Ho, Zr, Cd, Nb, Sc, Mn, Ni, Co, Cr, or Fe; $PbFeO_3$ or doped variations; $PbZrO_3$ or doped variations; $PbVO_3$ or doped variations; $SrTiO_3$ or doped variations; $AgNbO_3$; $AgTaO_3$; $ACrO_3$ wherein A is Dy, Ho, Yb, Lu, Pr, or Y; or $AMnO_3$, wherein A is Y, Er, Ho, Tb, Tm, Yb, Lu, or Dy; wherein x is greater than or equal to 0 and less than 1 and wherein y is greater than or equal to 0 and less than or equal to 1; or
   $PbNb_2O_6$; $PbTa_2O_6$; or $K_2BiNb_5O_{15}$; or
   $Pb_2BiTaO_6$ or $Pb_2BiNbO_6$; or
   $Bi_2WO_6$; $SrBi_2Nb_2O_9$; $Bi_4Ti_3O_{12}$; $SrBi_4Ti_4O_{15}$; or $Sr_{1-x}Bi_{2+2x/3}Ta_2O_9$, wherein x is greater than 0 and less than 1; or
   $BaMgF_4$ or $BaNiF_4$; or
   $KH_2PO_4$ or $(NH_4)_2SO_4$; or
   poly(vinylidene fluoride-trifluoroethylene)-based [P(VDF-TrFE)] or P(VDF-TrFE-CFE) (CFE: chlorofluoroethylene) polymer, copolymers or terpolymers $Ba_{1-x}Sr_xTiO_3$ or $PbZr_xTi_{1-x}O_3$, wherein x is greater than or equal to 0 and less than 1; or
   $PbZr_{0.2}Ti_{0.8}O_3$, $Ba_{0.67}Sr_{0.33}TiO_3$, $SrTiO_3$, N-doped $SrTiO_3$ or $(Ba_{0.65}Sr_{0.35})_{1-x}La_xTiO_3$ wherein x is greater than or equal to 0 and less than 1.

22. The device of claim 1, wherein said pyroelectric material is $PbZr_xTi_{1-x}O_3$, wherein x is from 0.20 to 0.80.

23. The device of claim 22, wherein said $PbZr_xTi_{1-x}O_3$ has an (001) orientation.

24. The device of claim 1 wherein said extraction electrode is separated from said thin film.

* * * * *